United States Patent
Ashton et al.

(10) Patent No.: US 12,534,367 B2
(45) Date of Patent: Jan. 27, 2026

(54) SYSTEMS AND METHODS FOR LOCAL GENERATION AND/OR CONSUMPTION OF HYDROGEN GAS

(71) Applicant: Modern Hydrogen, Inc., Bothell, WA (US)

(72) Inventors: Justin B. Ashton, Menlo Park, CA (US); Roelof E. Groenewald, Bothell, WA (US); Kevin J. Hughes, Knoxville, TN (US); William Kokonaski, Edmonds, WA (US); Max N. Mankin, Seattle, WA (US); Tony S. Pan, Bothell, WA (US); Levi D. Rodriguez, Calabasas, CA (US); Lowell L. Wood, Bellevue, WA (US); John J. Lorr, Monroe, WA (US); Amit Goyal, Mill Creek, WA (US); Guido Radaelli, Pleasant Hill, CA (US); Vikram Seshadri, Bothell, WA (US); MJ Mahdi, Bothell, WA (US); Matthew Ballard, Montgomery, TX (US); Stephen Harris, Seattle, WA (US); Alex Pearse, Bothell, WA (US)

(73) Assignee: Modern Hydrogen, Inc., Bothell, WA (US)

( * ) Notice: Subject to any disclaimer, the term of this patent is extended or adjusted under 35 U.S.C. 154(b) by 627 days.

(21) Appl. No.: 17/710,810

(22) Filed: Mar. 31, 2022

(65) Prior Publication Data
US 2022/0315424 A1 Oct. 6, 2022

Related U.S. Application Data

(60) Provisional application No. 63/281,566, filed on Nov. 19, 2021, provisional application No. 63/169,806, filed on Apr. 1, 2021.

(51) Int. Cl.
C01B 3/36 (2006.01)
B01D 46/00 (2022.01)

(52) U.S. Cl.
CPC .......... C01B 3/363 (2013.01); B01D 46/0032 (2013.01); B01D 2256/16 (2013.01); C01B 2203/1241 (2013.01)

(58) Field of Classification Search
CPC .......... C01B 3/363; C01B 2203/1241; C01B 2203/0272; C01B 2203/04;
(Continued)

(56) References Cited

U.S. PATENT DOCUMENTS

| 3,460,524 A | 8/1969 | Lazaridis |
| 4,797,091 A | 1/1989 | Neumann |

(Continued)

FOREIGN PATENT DOCUMENTS

| CN | 1617830 A * | 5/2005 | .............. C01B 3/32 |
| CN | 106854127 A | 6/2017 | |

(Continued)

OTHER PUBLICATIONS

International Search Report and Written Opinion for International Patent Application No. PCT/US2022/022935, Applicant: Modern Electronc, Inc., mailed Jul. 29, 2022, 16 pages.

(Continued)

*Primary Examiner* — Kaity V Chandler
(74) *Attorney, Agent, or Firm* — Fredrikson & Byron, P.A.

(57) ABSTRACT

Systems for producing hydrogen gas for local distribution, consumption, and/or storage, and related devices and methods are disclosed herein. A representative system includes a pyrolysis reactor system that can be coupled to a supply of reaction material that includes a hydrocarbon. The pyrolysis reactor system includes one or more combustion compo- (Continued)

nents positioned to transfer heat to the reaction material to convert the hydrocarbon into an output that includes hydrogen gas and carbon particulates. The pyrolysis reactor system also includes a carbon separation system positioned to separate the hydrogen gas the carbon particulates in the output. In various embodiments, the system also includes components to locally consume the filtered hydrogen gas, such as a power generator, heating appliance, and/or a combined heat and power device.

21 Claims, 27 Drawing Sheets

(58) Field of Classification Search
CPC ...... C01B 2203/049; C01B 2203/0822; C01B 2203/0833; C01B 3/50; C01B 3/24; B01D 46/0032; B01D 2256/16
See application file for complete search history.

(56) References Cited

U.S. PATENT DOCUMENTS

| | | | |
|---|---|---|---|
| 4,884,555 A | 12/1989 | Huang | |
| 5,101,633 A | 4/1992 | Keller et al. | |
| 5,407,347 A | 4/1995 | Bortz | |
| 5,470,224 A | 11/1995 | Bortz | |
| 5,589,599 A | 12/1996 | Mcmullen et al. | |
| 5,797,356 A | 8/1998 | Khizh | |
| 6,036,480 A | 3/2000 | Hughes et al. | |
| 6,929,668 B2 * | 8/2005 | Millet | B01D 53/225 423/418 |
| 7,007,477 B2 | 3/2006 | Widener | |
| 7,537,623 B2 | 5/2009 | Etievant et al. | |
| 8,312,722 B2 | 11/2012 | York et al. | |
| 9,212,058 B2 | 12/2015 | De Graffenried, Sr. | |
| 9,406,957 B2 | 8/2016 | Jackson | |
| 10,787,362 B2 | 9/2020 | De Graffenried, Sr. | |
| 11,826,749 B2 | 11/2023 | Pannala et al. | |
| 11,897,768 B2 | 2/2024 | Radaelli et al. | |
| 2002/0007594 A1 | 1/2002 | Muradov | |
| 2008/0147241 A1 | 6/2008 | Tsangaris et al. | |
| 2009/0060805 A1 * | 3/2009 | Muradov | B01J 8/12 422/600 |
| 2009/0214987 A1 * | 8/2009 | Yamasaki | C01B 3/26 431/4 |
| 2009/0260286 A1 | 10/2009 | Sasauchi et al. | |
| 2010/0035103 A1 | 2/2010 | Jackson | |
| 2010/0040510 A1 * | 2/2010 | Randhava | C10J 3/523 422/232 |
| 2010/0043291 A1 | 2/2010 | Ljunggren | |
| 2010/0175639 A1 | 7/2010 | Al-Dawood et al. | |
| 2013/0213256 A1 | 8/2013 | McAlister | |
| 2014/0148519 A1 * | 5/2014 | Drnevich | C10K 1/003 518/700 |
| 2014/0264175 A1 * | 9/2014 | Perry | C01B 3/384 422/162 |
| 2016/0208290 A1 * | 7/2016 | Foody | C01B 3/48 |
| 2017/0159930 A1 | 6/2017 | Lin et al. | |
| 2020/0294779 A1 | 9/2020 | Ashton et al. | |
| 2021/0380407 A1 | 12/2021 | Ashton et al. | |
| 2022/0387952 A1 | 12/2022 | Groenewald et al. | |
| 2023/0003381 A1 | 1/2023 | Mueller-Hagedorn et al. | |
| 2024/0217815 A1 | 7/2024 | Ashton et al. | |

FOREIGN PATENT DOCUMENTS

| | | |
|---|---|---|
| CN | 209508163 U | 10/2019 |
| CN | 112390227 A | 2/2021 |
| JP | 2002543033 A | 12/2002 |
| JP | 2019200996 A | 11/2019 |
| WO | WO-9958614 | 11/1999 |
| WO | 02057395 A1 | 7/2002 |
| WO | WO-2010127961 | 11/2011 |
| WO | WO-2019226416 | 11/2019 |
| WO | WO-2021102521 | 6/2021 |
| WO | WO-2021247768 | 12/2021 |

OTHER PUBLICATIONS

Lohse-Busch et al., "Technology Assessment of a Fuel Cell Vehicle: 2017 Toyota Mirai", Argonne National Laboratory, Report# ANL/ESD-18/12, Jun. 2018, pp. 80.

* cited by examiner

| | User Case | RESIDENTIAL | | COMMERCIAL | DISTRICT | | DATA-CENTERS |
|---|---|---|---|---|---|---|---|
| | | Single Unit | Aptm't Complex | Industrial/Office/Campus/Airport/Hospital/Mall | Co-Gen | Tri-Gen | Datacenter |
| Power | Design Capacity | 10,000 kWh/y | 250,000 kWh/y | 12 kWh/sqft/year | 40,000,000 kWh/y | 10 MW | 25 MW |
| | Demand Curve | Discontinuous | Discontinuous | Daily Cycle | Continuous | Continuous | Continuous |
| Heating | Design Capacity | 100,000 Btu/h | 2.5 MMBtu/h | 25 Btu/h/sqft | 10,000kW | 10 MW | -- |
| | Demand Curve | Seasonal | Seasonal | Seasonal | Seasonal | Seasonal | -- |
| Cooling | Design Capacity | 2000 kWh/Y | 50,000 kWH/y | 3kWh/sqft/y | | 10 MW | 25 MW |
| | Demand Curve | Seasonal | Seasonal | N/A | -- | Seasonal | Continuous |
| Natural gas requirements | Autothermal, TMD only | 140 MMBtu/y | 5,250 MMBtu/y | 70,000 MMBtu/y | N/A | N/A | N/A |
| | RTP, TMD only | 145 MMBtu/y | 4,875 MMBtu/y | 9,500 MMBtu/y | N/A | N/A | N/A |
| | Autothermal, TMD and Cogen | 168 MMBtu/y | 6,300 MMBtu/y | 136,189 MMBtu/y | 578,051 MMBtu/y | 1,156,102 MMBtu/y | 3,143,151 MMBtu/y |
| | RTP, TMD and Cogen | 164 MMBtu/y | 5,350 MMBtu/y | 18,483 MMBtu/y | 616,092 MMBtu/y | 1,232,184 MMBtu/y | 3,350,000 MMBtu/y |

TMD: Thermal Methane Decomposition
Btu/h: British thermal units per hour
MMBtu/y: Million British thermal units per year
kWh/sqft/year: Kilowatt hour per square foot per year
kWh/year: Kilowatt hour per year
MW: Megawatt
Cogen: Heating, Cooling, and/or Power Generation
N/A: Not Available

*FIG. 23*

SYSTEMS AND METHODS FOR LOCAL GENERATION AND/OR CONSUMPTION OF HYDROGEN GAS

CROSS-REFERENCE TO RELATED APPLICATIONS

This application claims priority to U.S. Provisional Patent Application No. 63/281,566, filed on Nov. 19, 2021, and U.S. Provisional Patent Application No. 63/169,806, filed on Apr. 1, 2021, the entireties of which are incorporated herein by reference.

TECHNICAL FIELD

The present technology is generally related to systems for locally generating hydrogen gas from hydrocarbon fuels. In particular, the present technology relates to small-scale (e.g., residential scale, light commercial scale, and datacenter scale) pyrolysis reactor systems for generating, and consuming hydrogen gas from natural gas and methane.

BACKGROUND

Hydrogen is typically generated by large scale reactors operating at high temperatures in an industrial setting. The hydrogen produced is then transported for eventual use in fuel cells and/or other industrial processes, such as producing certain ammonia-based fertilizers and/or other applications. Recently, the use of hydrogen gas as a thermal energy source for heating and electricity has garnered interest as an attractive steppingstone between current fossil-fuel-based power generation and fully renewable energy systems because combusting hydrogen gas does not release any greenhouse gases or other harmful chemicals. However, combusting hydrogen gas releases less heat than natural gas on a per mol basis, therefore requiring efficient systems for production.

Some methods for producing hydrogen include steam methane reforming (SMR), gasification, plasma-driven dissociation, thermal dissociation, and pyrolysis of gases such as methane with the use of catalytic molten metals or salts. Recent advances in catalytic methane pyrolysis have led to the development of novel combinations of molten metals and salts which enable high conversion rates of methane (more than 50%) at moderate temperatures (less than 1100° C.) using bubble column reactors in which conversion takes place at the heterogenous interface between the molten column fluid and rising bubbles of methane. These systems are promising developments towards enabling hydrogen production without the concurrent release of greenhouse gases, since carbon is naturally sequestered in solid form during the pyrolysis reaction. To date, these methods have only been applied in industrial scale applications, which typically involves continuously operated, large reactors for industrial hydrogen production at lower cost and/or lower carbon footprint than previous SMR processes.

BRIEF DESCRIPTION OF THE DRAWINGS

FIG. 23 is a table illustrating the power, heating, cooling, and natural gas demand and usage for various representative applications in accordance with some embodiments of the present technology.

Figure 1:
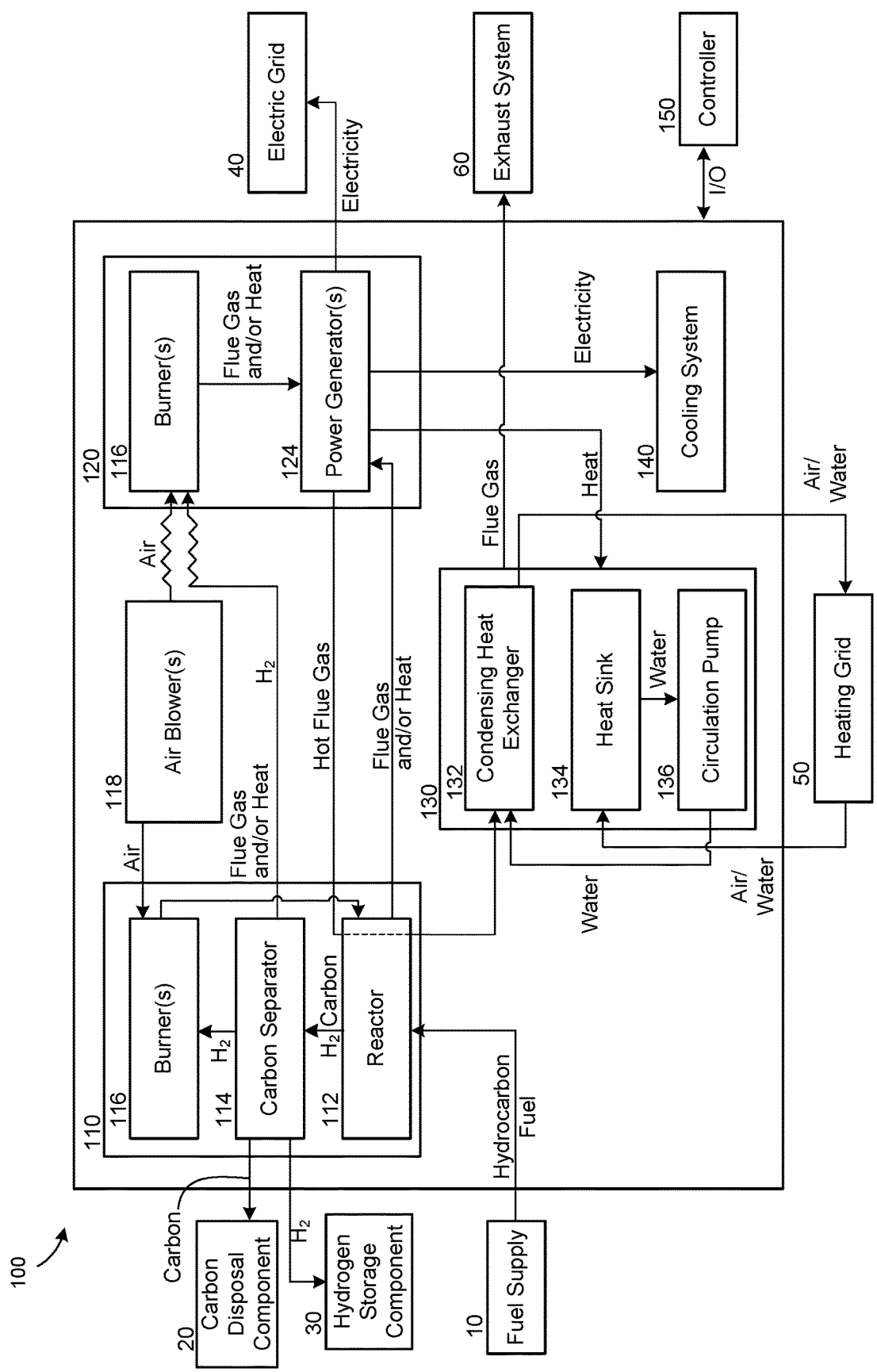
FIG. 1 is a block diagram of a system for producing hydrogen gas for local distribution, consumption, and/or storage in accordance with some embodiments of the present technology.

The Figures have not necessarily been drawn to scale. Similarly, some components and/or operations can be separated into different blocks or combined into a single block for the purpose of discussion of some implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

To enable the use of hydrogen that has been generated by an industrial reactor for residential and commercial building uses would require the replacement of all existing natural gas pipelines with hydrogen-compatible materials. This wholesale replacement of gas pipelines may be prohibitively expensive for widespread adoption. However, residential heating using fossil fuels is one of the largest contributors to global greenhouse gas emissions. Accordingly, a switch to hydrogen combustion in residential heating appliances would provide enormous environmental benefits. Hydrogen can also be converted directly to electricity using fuel cells or other devices, or indirectly via heat-to-electricity converters and heat engines at the building level. The use of hydrogen to generate electricity locally (e.g., in the same building, within the same neighborhood, within a single appliance and/or housing, within a space previously designated for a traditional appliance, and/or for local combined heat and power generation), could further reduce reliance on carbon-emitting power sources, thereby delivering further environmental benefits. Further, the generation and consumption of hydrogen without a networked hydrogen pipeline and/or other transportation system (e.g., by generating hydrogen in a local environment and transporting the hydrogen for consumption in a point-to-point system) can avoid both the significant risks associated with transporting hydrogen over long distances (e.g., distances of more than about 10 miles), and the significant infrastructure investments required to do so. For example, hydrogen transportation, especially over long distances, typically involves either pressurizing the hydrogen gas above about 300 pounds per square inch gage (psig) and/or cryogenically cooling the hydrogen gas into liquid hydrogen. For example, in hydrogen gas pipelines, the hydrogen gas is pressurized between 300 psig and 1,500 psig, thereby requiring durable, high pressure-rated pipelines. In another example, hydrogen gas can be pressurized to about 2,800 psig for transportation within large tanks (e.g., for transportation on tube trailers), requiring considerable safety precautions around the hydrogen tanks.

Systems for producing hydrogen gas for local distribution, consumption, and/or storage, and related devices and methods are disclosed herein. In some embodiments, a representative system includes an input line connectable to a supply of reaction material that includes a hydrocarbon, and a reactor in fluid communication with the input line. The reactor includes one or more flow channels positioned to transfer heat to the reaction material to convert the hydrocarbon into an output (e.g., an output product stream) that includes hydrogen gas, carbon particulates, and heat (as well as other gases, such as leftover reaction material). The system also includes a carbon separation system operably coupled to the reactor to separate the hydrogen gas the carbon particulates in the output. In various embodiments, the system also includes components to locally consume the filtered hydrogen gas (e.g., without transporting the hydrogen through a long-distance, networked pipeline (e.g., more than about 100; more than about 10 miles; or, most preferably, more than about 3 miles), without pressurizing the hydrogen above 100 psig, without cooling the hydrogen into a fluid, and/or the like). For example, the system can include one or more burners that burn the hydrogen gas and one or more thermal pathways coupled between the burners and the reactor that transfer heat from the burners to the reactor. To transfer heat, in one example, the thermal pathways can direct hot flue gas from the burners over and/or through the reactor.

The system can also include one or more power generators operably coupled to the reactor and/or the burners. The power generators receive hydrogen and/or heat to generate electricity. The electricity can be used to power various components of the system and/or be directed into an electric grid. In turn, the electric grid can power a single-family residence, a multifamily residence, a commercial building, and/or any other suitable space. In some embodiments, more electricity is produced than consumed for near point use (e.g., at the building level). In some such embodiments, the excess electricity is exported to an external electrical power grid. In some such embodiments, the excess electricity is stored in a secondary fuel cell for later consumption at the building scale. The overall system can also include a circulation system operably coupled to the reactor, the burners, and/or the power generators via thermal pathways. The circulation system receives excess heat from other components in the system and circulates the heat in a heating grid and/or hot water grid for a single-family residence, a multifamily residence, a commercial building, and/or any other suitable space.

As disclosed herein, the system is scaled down to residential, neighborhood, or single commercial building levels to generate hydrogen near the point of use, thereby avoiding the need for infrastructure overhauls to enable a hydrogen or mixed hydrogen/natural gas grid. That is, the disclosed system designs enable partial or complete decarbonization of residential heating and/or electricity demands without any changes to the natural gas grid, since hydrogen is generated from natural gas in situ and also consumed in situ. However, pyrolysis reactors at a small scale also raise numerous challenges. To meet those challenges, various embodiments disclosed herein include features that adapt the pyrolysis reactors for small-scale applications and/or applying integration with residential heating systems.

In some embodiments, the system includes features to address incomplete conversion of a hydrocarbon fuel (e.g., natural gas) to hydrogen gas and carbon through the pyrolysis reaction. For example, the product of the reaction, with no further purification, can contain unconverted natural gas mixed with the hydrogen gas and carbon. In some such embodiments, the solid carbon is separated from the product stream, then the hydrogen and hydrocarbon gas mixture is used as fuel for power generation, for heat generation, for combined heat and power (CHP) generation, and/or as a fuel to further reactions in the reactor. Additionally, or alternatively, the hydrogen gas can be separated from the unconverted fuel, then the unconverted fuel can be recycled. For example, any unconverted fuel can be condensed into a liquid hydrocarbon product and/or a solid hydrocarbon product (e.g., a wax) that is then used as a fuel (e.g., burned to maintain the reactor, exported, burned in a residential heating appliance, and/or the like). The liquid and/or solid hydrocarbon byproduct can be a fuel and/or chemical with high physical and energy density that is easier to transport compared to gaseous natural gas and/or gaseous hydrogen. In some embodiments, the unconverted fuel is converted into the liquid and/or solid hydrocarbon product intermittently, thereby generating a product that can be used as a binding agent for the solid carbon byproduct from the main reaction.

In some embodiments, the system includes one or more ways to collect the solid carbon byproduct from the pyrolysis reaction. The solid carbon can then be used externally in various applications such as: a soil amendment material for water and nutrient retention, road construction, building construction, waterproofing material, carbon black, activated carbon; graphitic carbon; an additive for polymer and metal composites; a binder and/or filler material; a catalyst support agent; a refractory material; in carbon-carbon brakes; a thermal paste for inks and/or coatings; as a replacement for metallurgical coke in iron steel manufacturing; and/or various other suitable external uses. Additionally, or alternatively, the solid carbon can also be recycled to be used in an autothermal reactor system to act as a catalyst or nucleation site to aid a pyrolysis reaction of a hydrocarbon fuel. In some embodiments, the solid carbon byproduct is segregated into various grades, then subjected to chemical or physical functionalization for various intended applications.

In various embodiments, the system can include one or more features to separate the solid carbon byproduct from hydrogen gases and/or other resulting gases. The carbon separation features can be mechanical and/or non-mechanical (e.g., fluidic, electromagnetic, chemical, and/or the like, sometimes referred to collectively herein as the non-mechanical carbon separation features). Further, in various embodiments, the carbon separation features can operate on periodic and/or continuous bases. In various embodiments, the mechanical carbon separation features include (but are not limited to): a screen or sieve (with or without vibration); a mechanical plunger or other actuatable physical pushing mechanism; a screw-type extruder; a belt or bucket conveyor that can be coated with a catalyst and/or adhesive, and/or can be chemically treated to bind to the carbon during removal; a lock hopper; a rotary kiln; and/or a knife or other physical barrier on a moving part (e.g., a moving conveyor belt). In various embodiments, one or more fluidic carbon separation features include (but are not limited to): a gas injection stream across a filter and/or at predetermined angles; sedimentation or storage tanks; baghouse filters; cyclone separators; electrostatic precipitators; liquid columns as a bubbler; and/or vacuum pumps. In various embodiments, electromagnetic and/or chemical carbon separation features include (but are not limited to): electromagnetic fields (e.g., applying a magnetic field to interact with the pyrolytic carbon); sonication or sound energy removal systems; lasers; radiofrequency-based physical drivers; secondary chemical reactions (e.g., oxidizing the carbon); bombardment using ultraviolet light to cause secondary reactions and/or separation from gas flow; and/or using a plasma to functionalize the carbon particulates (e.g., using $O_2$, $N_2$, S, and/or any other suitable compound).

For ease of reference, the systems and components thereof are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the system and components therein can be moved to, and used in, different spatial orientations without changing the structure and/or function of the disclosed embodiments of the present technology.

Further, although primarily discussed herein as a system for breaking natural gas down into hydrogen gas for local consumption, one of skill in the art will understand that the scope of the present technology is not so limited. For example, the pyrolysis reactors described herein can also be used to break down any other suitable hydrocarbons. Accordingly, the scope of the present technology is not confined to any particular subset of embodiments.

As used herein, local generation and consumption typically refers to the consumption of hydrogen gas without transporting the hydrogen more than about 10 miles, and without compressing the hydrogen above about 100 psig. In some embodiments, (e.g., when hydrogen is generated at a scale for consumption within a single family home, multi-family home, commercial building, and/or a datacenter) local generation and consumption typically refers to the consumption of hydrogen gas without transporting the hydrogen more than 3 miles, and without compressing the hydrogen above about 100 psig. However, in some embodiments, discussed in more detail below, the hydrogen gas can be directed into a natural gas pipeline to supplement downstream consumption of the natural gas with hydrogen gas. In such embodiments, the local generation and consumption typically refers to the consumption of hydrogen gas without transporting the hydrogen more than about 100 miles.

DESCRIPTION OF THE FIGURES

FIG. 1 is a block diagram of a system 100 that can produce and/or utilize (e.g., distribute, consume, and/or store) hydrogen gas at a localized scale in accordance with some embodiments of the present technology. In some embodiments, producing and utilizing the hydrogen gas in the system 100 occurs within a single residential home. For example, the system 100 can be implemented as a single appliance positioned in a space previously occupied by conventional natural gas furnaces or burners and/or can act as a direct replacement for these conventional appliances. In another example, the system 100 can take the term of multiple devices and/or appliances operably connected to each other. Further, in some embodiments, the system 100 produces and utilizes the hydrogen gas at other localized scales. For example, as discussed in more detail below, the system 100 can produce and utilize the hydrogen gas for a single room, a single residential home, a multifamily home, an apartment building, a residential neighborhood, a public building (e.g., a single store, government building, hospital, school, or any other suitable space), a commercial building (e.g., an office building), a datacenter, and/or any other suitable space. Because the system 100 produces and utilizes hydrogen gas locally, the system 100 can be implemented to replace and/or supplement existing uses of hydrocarbon fuels (e.g., natural gas, methane, and other hydrocarbons), as well as replace and/or supplement existing sources of electricity, without any overhaul in infrastructure.

In the illustrated embodiment, the overall system 100 includes a reactor system 110, one or more air blowers 118, an electric generation system 120, an optional heating system 130, and an optional cooling system 140. The reactor system 110 includes a reactor 112 operably coupled to a fuel supply 10 and a carbon separator 114 operably coupled to the reactor 112. The reactant from the fuel supply 10 includes a hydrocarbon that can be decomposed by the reactor system 110. Examples of suitable reactants include natural gas or methane, gasoline, jet fuel, propane, kerosene, diesel, and/or any other suitable hydrocarbon fuel. In a specific, non-limiting example, the fuel supply 10 can be (or be operably connected to) a gas meter connected to a natural gas line (e.g., the gas meter coupling a single family home, multifamily home, an apartment building, a public building, a commercial building, and/or a datacenter to a main line supply) to provide natural gas and/or pure methane to the reactor system 110. As discussed in more detail below, the reactor 112 receives the reactant and decomposes the hydrocarbon into an output that includes, among other things, hydrogen gas and carbon particulates, then directs the output to and/or through the carbon separator 114. The carbon separator 114 removes the carbon particulates from the output (e.g., hydrogen gas and/or other gases, such as unreacted hydrocarbon), thereby producing an output gas that is predominantly hydrogen gas. Because the gases in the output are predominantly hydrogen, in addition to various byproduct gases discussed in more detail below, the output gases are sometimes referred to herein with reference only to the hydrogen gas. The carbon separator 114 can then collect and direct the carbon particulates to a carbon disposal component 20 (e.g., an emptiable bin, allowing the carbon to be disposed of, used for various purposes (e.g., as a nucleation site for further decompositions of the reactant), and/or resold for various uses), while the hydrogen gas can be utilized within the reactor system 110 and/or elsewhere in the overall system 100. For example, in the illustrated embodiment, the reactor system 110 also includes one or more burner(s) 116 operably coupled to one or more air blowers 118 to combust the hydrogen gas. A thermal pathway between the burner(s) 116 and the reactor 112 can communicate the heat generated by combusting the hydrogen gas. For example, the thermal pathway can direct the hot flue gas around and/or through the reactor 112. The reactor 112 receives the heat from the combusting hydrogen gas and uses the heat to decompose further amounts of the reactant. In another example, one or more of the burner(s) 116 can be operably coupled to the reactor 112 such that the combustion flame(s) can directly heat the reactant within the reactor 112.

Additionally, or alternatively, the reactor system 110 can direct the hydrogen gas to the electric generation system 120 (where it is consumed), the heating system 130 (where it is consumed), and/or a hydrogen storage component 30 for distribution and/or later consumption. For example, the hydrogen storage component 30 can be drawn on for combustion fuel to reheat the reactor 112 after periods of non-use. In another example, the hydrogen storage component 30 can be fluidly coupled to an external gas pipeline (e.g., a natural gas pipeline) to inject some (or all) of the hydrogen gas generated by the reactor system 110 into the gas pipeline. In a specific, non-limiting example, the reactor system 110 can be located in a gate station in a natural gas distribution network. The reactor system 110 can withdraw natural gas to generate the hydrogen gas, then direct the hydrogen gas (and any unreacted natural gas) back into the network. In this example, the hydrogen gas can help offset the carbon emissions from downstream systems (e.g., heating systems, power generation systems, and the like) that are coupled to the natural gas pipeline.

In a specific, non-limiting example, the reactor 112 can be a molten salt reactor that contains about 10 kilograms (kg) of KCl, the amount of energy to heat the reactor 112 from room temperature to an operating temperature of about 1000° C. is roughly 11,000 kilojoules (kJ). This energy can be generated by combusting about 860 standard liters of hydrogen gas, assuming relatively complete utilization of the heat. In another example, hydrogen storage can be used to decouple generating the hydrogen from consuming the hydrogen. That is, the stored hydrogen can supplement and/or replace the stream of produced hydrogen during periods of high demand. In another example, stored hydrogen can also be redistributed into a hydrogen grid. The hydrogen grid can be used to charge fuel cells (e.g., fuel cells used later by the system 100, used in automobiles, and/or any other suitable fuel cell), and/or redistribute hydrogen to neighboring apartments, homes, and/or buildings with higher energy demand with minimal additions in infrastructure.

Non-limiting examples of the materials that can be used to store hydrogen include typical gas storage tanks and solid materials such as zeolite, Pd, H3N:BH3, and/or any of the solid materials set out in Table 1 below.

TABLE 1

| Material | $P_{abs}$, $T_{abs}$ | Storage capacity (wt. %) | Vol. needed to hold 2300 standard liters of $H_2$ (L) |
| --- | --- | --- | --- |
| 60 wt % Mg—Ni | 2 bar, 250 C. | 4 | 1.95 |
| MgH$_2$-5 wt % V | 2 bar, 300 C. | 5 | 2.2 |
| MgH$_2$-0.2 mol % Cr2O3 | 2 bar, 300 C. | 5 | 1.431 |
| MgH$_2$-37 wt % benzene | 0.66 bar, 180 C. | ~1 wt % in 0.5 hr | 15.7 |
| ZrMnNi | ~2 bar, 30 C. | ~0.3 wt % | 9.1 |
| La0.27Mg0.23Ni3.5 | 1 bar, 25 C. | ~1 wt % | 2.6 |
| TiMn$_{1.5}$ | 7 bar, 30 C. | 1.86 | 1.79 |
| Li$_3$N | 1 bar, 255 C. | 10 wt % | 3.7 |

As further illustrated in FIG. 1, the electric generation system 120 also includes one or more burners 116 operably coupled to the air blower(s) 118 to burn the hydrogen gas, and one or more power generators 124 operably coupled to the burner(s) 116 and/or the output from the reactor 112 (e.g., hot gases, hydrogen gas, and/or heat through a physical transfer medium such as a heat transfer fluid). The power generator(s) 124 use the flue gas the burner(s) 116, the heat from the burner(s) 116, and/or the output from the reactor 112 to generate electricity. In various embodiments, the power generator(s) 124 can include a thermionic converter, a thermophotovoltaic system, an alkali metal thermal energy converter (AMTEC), a fuel cell, an internal combustion engine, a turbine or microturbines, a thermoelectric generator, a steam turbine, and/or a Stirling engine. In various embodiments, the electrical output from the electric generation system 120 can be between about 0.01 kilowatts (kW) and about 50 kW, between about 0.05 kW and about 5 kW, between about 0.1 kW and about 1 kW, or about 0.5 kW. The electric generation system 120 can then direct the generated electricity into an electric grid 40 for local consumption, local storage, and/or distribution. For example, the electric grid 40 can include a secondary cell that stores a portion of the generated electricity and various electronic appliances in a residential home that consume a portion of the generated electricity. As described above, in some embodiments, more electricity is produced than is consumed in near point use (e.g., locally). In some such embodiments, the excess electricity is exported to the electric grid 40 and/or stored in secondary fuels for later consumption.

As further illustrated in FIG. 1, the electric generation system 120 can direct the excess hot flue gas and/or heat to the reactor system 110 and/or to the heating system 130. The reactor system 110 can use the non-converted heat and flue gas to help heat the reactor to decompose further hydrocarbons into the hydrogen gas. The reactor system 110 can then direct excess and/or parasitically lost heat to the heating system 130 (e.g., through the flow of hot gases and/or hot fluids, and/or through a physical transfer medium such as a heat transfer fluid or other suitable heat transfer medium).

In the illustrated embodiment, the heating system 130 includes a condensing heat exchanger 132 operably coupled to the reactor system 110, a heat sink 134 operably coupled to the electric generation system 120, and a circulation pump 136 operably coupled to the condensing heat exchanger 132 and the heat sink 134. The condensing heat exchanger 132 receives the excess and/or parasitically lost heat from the reactor system 110. The condensing heat exchanger 132 then recycles the heat (e.g., in a boiler, furnace, and/or a similar appliance) to circulate heat into a heating grid 50. For example, the condensing heat exchanger 132 can use the excess heat from the reactor 112 to supply hot water for an apartment building. The heat sink 134 receives the excess and/or parasitically lost heat from the electric generation system 120. The circulation pump 136 then circulates a fluid (e.g., water, air, or another suitable heat transfer fluid) over the heat sink 134 and the condensing heat exchanger 132 to communicate heat from the heat sink 134 to the condensing heat exchanger 132 for additional recycling into the heating grid 50.

In some embodiments, the electric generation system 120 and the heating system 130 can be integrated into combined heat and power unit. In a specific, non-limiting example, the electric generation system 120 can receive the hydrogen gas from the output of the reactor system and combust the hydrogen gas in the burners 116. The heat can then be transferred into a first heat exchanger in the power generator 124 (e.g., a hot side heat exchanger) and flow through an electric generation component towards a second heat exchanger (e.g., a cold-side heat exchanger). The second heat exchanger in the power generator 124 can be thermally coupled (e.g., in thermal contact with) a third heat exchanger that is coupled to and/or integrated with the heating system 130 (e.g., thermally coupled to the heat sink 134) to transfer excess heat (e.g., heat that is not converted into electricity) into the heating system 130. Additionally, or alternatively, flue gases from the burners 116 can be directed into the heating system 130 downstream from the first heat exchanger in the power generator 124 to receive excess heat that is not absorbed into the first heat exchanger. In a specific, non-limiting example, the heating system 130 can be a residential furnace and the power generator 124 can be a thermionic converter that is positioned within the footprint of the residential furnace. In another example, the electric generation system 120 can use a combustion engine and/or a gas turbine to generate electricity. In this example, the power generator 124 can be thermally coupled to the heating system 130 to transfer excess heat into the heating system 130 (e.g., by directing flue gases from the combustion into contact with and/or into the heating system 130; directing steam and/or water into contact with and/or into the heating system 130; and the like). Additional details on a suitable combined heat and power device are provided later with respect to FIG. 31.

As further illustrated in FIG. 1, after the components of the system 100 have extracted heat from the flue gas for various uses, the system 100 can direct the flue gas to an exhaust system 60. In some embodiments, the system 100 replaces the hydrocarbons in the reactant entirely with the hydrogen gas product from the reactor system 110. Accordingly, in these embodiments, the flue gas includes only water vapor, oxygen gas, and/or any other molecules present in the air from the air blower(s) 118 (e.g., nitrogen gas). That is, the flue gas does not include new carbon dioxide molecules that would ordinarily result from burning the hydrocarbons. In some embodiments, the exhaust system 60 utilizes the existing ventilation systems in the space that the system 100 is implemented in (e.g., an existing ventilation system to direct carbon dioxide away from a furnace).

As further illustrated in FIG. 1, the electric generation system 120 can direct heat and/or electricity into the cooling system 140. The cooling system 140 utilizes the heat and/or electricity circulate cold air. In various embodiments, the cooling system 140 can include an absorption chiller, a compression air conditioner, and/or a heat pump. In some embodiments, the cooling system 140 is operably coupled directly the reactor system 110 to receive hydrogen gas and/or heat (not shown). In such embodiments, the cooling system 140 utilizes the hydrogen gas and/or heat to drive a cooling system, such as any of the systems described above. Further, in some embodiments, the cooling system 140 can be integrated with and/or into the heating system 130.

In some embodiments, the reactor system 110 and/or the electric generation system 120 can direct heat and/or electricity to a heating component and/or a cooling component without circulating energy. For example, the heating component (e.g., the condensing heat exchanger 132) can receive heat from the reactor 112, transfer the heat into a fluid (e.g., water, air, or another suitable fluid), and direct the heated fluid into the heating grid 50 without receiving a fluid back. In a specific example, the heating component can receive heat from the reactor 112, transfer the heat into water from an outside supply, and direct the hot water into a residential space. The used hot water then drains into a sewage and/or greywater disposal system rather than circulating back into the heating system 130. In another specific example, the cooling component can receive heat and/or electricity from the power generator 124, use the heat and/or electricity to drive a cold air generator, and direct the cold air into a residential space. The cold air can then dissipate in the residential space while the cooling component can pull new air for cooling from an outside source.

In various embodiments, the reactor system 110, the electric generation system 120, the heating system 130, and/or the cooling system 140 can include one or more sensors (not shown) to collect data associated with the components of the system. For example, the sensors can measure a weight or optical characteristic of the solid carbon produced by the reactor system 110. The data from these sensors can then be used to generate a report on the amount of carbon removed from the reactant, allowing users to access carbon credits or carbon reduction payments (e.g., from state, federal, and/or commercial carbon markets). The data can also be used to alert the user that the carbon disposal component 20 is full (or close to full), prompting the user to empty the carbon disposal component 20.

In some embodiments, the sensors can measure electrical characteristics at the reactor 112 (e.g. conductivity, frequency-dependent conductivity, electrical impedance spectroscopy, and/or any other suitable characteristics). In some embodiments, the sensors can perform ultrasound measurements to determine reactant flow through the reactor 112 and/or a build-up of carbon within the reactor 112. In some embodiments, gas flow rate sensors can determine a ratio of reactant (e.g., methane) to a product (e.g., hydrogen) flowing out of the reactor 112. In such embodiments, the ratio can indicate the extent of the pyrolysis reaction occurring within the reactor 112. In some embodiments, thermocouples or other temperature sensors measure the temperature of the reactor 112, the flue gas from the burner(s) 116, the power generator(s) 124, the condensing heat exchanger 132, and/or any other suitable component of the system 100. In some embodiments, hydrogen gas sensors (e.g., sensors that pass a current through palladium wires) monitor the reactant conversion and/or hydrogen production rate.

In some embodiments, the system 100 includes a controller 150 operably coupled via input/output (110) links to the sensors and various components of the system. Based on any of the measurements discussed above, the controller 150 can adjust the operation of the system 100. For example, the controller 150 can adjust the input flow of reactant and/or the operating temperature of the reactor 112 based on the ratio of reactant to hydrogen gas measured coming out of the reactor 112 (e.g., to increase/decrease the amount of hydrogen in the ratio). In some embodiments, the controller 150 contains a memory storing past conditions and hydrogen consumption, as well as a predictive analytics component. Based on any of the measurements discussed above and data from the memory, the predictive analytics component can determine an adjustment for the operation of any of the components in the system 100 and the controller 150 can complete the adjustment. For example, the predictive analytics can determine periods of high and low hydrogen demand and the controller 150 can toggle the reactor 112 on and off (e.g., by starting and stopping the input of the reactant) according to the determined periods.

As discussed above, the system 100 is scaled to produce and utilize the hydrogen gas for a single room, a single residential home, a multifamily home, an apartment building, a residential neighborhood, a public building (e.g., a single store, government building, hospital, school, or any other suitable space), a commercial building (e.g., an office building), a datacenter, or any other suitable space. The scale can be quantified in terms of typical reactant consumption rates. For example, using methane as the reactant, typical scales include a natural gas flowrate range of from about 500 standard cubic centimeters per minute (sccm) to about 37,500 sccm for a single family residence (e.g., a standalone house or single unit in a multifamily building); from about 150,000 sccm to about 3,750,000 sccm for a typical multi-family building with a centralized system 100; from about 2,000,000 sccm to about 10,000,000 sccm for a large multifamily building (e.g., a large apartment building with a centralized system 100); from about 150,000 sccm to about 3,750,000 sccm for a neighborhood with a centralized system 100; from about 4,000,000 sccm to about 12,000,000 sccm for a commercial building; and from; and from about 100,000,000 sccm to about 200,000,000 sccm for a datacenter. In another quantification example, using methane as the reactant, typical scales include a natural gas consumption rate of from about 10 million British thermal units per year (MMBtu/year) to about 164 MMBtu/year for a single family residence (or about from about 15981 Btu/hr to about 18721 Btu/hr); from about 4875 MMBtu/year to about 6300 MMBtu/year for a small multi-family building; from about 9500 MMBtu/year to about 136,189 MMBtu/year for a commercial building (e.g., an industrial site, and office, a campus, an airport, a hospital, a mall, and/or any other suitable commercial building) with a centralized system 100; from about 453,963 MMBtu/year to about 1,232,184 MMBtu/year for a larger multi-family building and/or a neighborhood; and from about 2,468,421 MMBtu/year to about 3,350,000 MMBtu/year for data centers with high power and cooling demands.

FIG. 23 contains a table with additional examples of the scales for various applications, as well as the power consumed by specific components of the system 100 at the different scales. As illustrated, the table shows the power, heating, cooling, and natural gas required for different embodiments of the system 100 (FIG. 1), as well as the approximate scales for each embodiment in terms of demand and usage. The illustrated scales include: residential, commercial, district, and data center usage and the associated needs for power, heat, and cooling. Accordingly, the table of FIG. 23 provides context to differentiate the needs and system requirements for these embodiments in contrast to the much larger scales used in industrial generation of hydrogen. It will be understood, however, that the values in the table of FIG. 23 are illustrative as examples only, and that the intention is not to limit the technology to the particular examples that are illustrated.

Returning to FIG. 1, in any of the applications discussed above, the system 100 can include multiple reactors 112 to meet the consumption demands of the space in which the system 100 is deployed. For example, using methane as the reactant, a single reactor can have a $CH_4$ consumption rate of from about 500 sccm to about 172,853,881 sccm, or from about 10 MMBtu/year to about 3,350,000 MMBtu/year. This range is significantly below a typical output for industrialized pyrolysis reactors, even when multiple reactors 112 are used in conjunction. To enable the reactor 112 to operate efficiently at the scales required for localized consumption, especially at the residential level, the reactor includes features to address a number of shortcomings.

First, the carbon produced by the pyrolysis reaction in typical embodiments is removed from the reactor 112 and separated from the product stream while balancing safety, efficiency, and convenience concerns. For example, the carbon can be removed from the reactor 112 in a way that provides separation between a user and the relatively high temperature components of the reactor 112. Further, the carbon needs to be separated by a system that does not require overly frequent (e.g., hourly, daily, weekly, etc.) upkeep, or a user may be unwilling to adopt the reactor. In another example, the carbon can be separated by a system that does not consume too much power, or the efficiency of the system 100 may fall below a usable level. Accordingly, in various embodiments, the reactor system 110 can include mechanical and/or non-mechanical features that help remove efficiently remove carbon from the reactor.

Second, because of the cyclical and/or uneven demand for heat and electricity in a residential and/or single building setting, the output of the reactor 112 may need to be frequently modulated. In some embodiments, the target modulation scale is on the order of minutes to hours. Further, in some embodiments, the modulation includes periods when no hydrogen gas is demanded (e.g., when a residence is unoccupied during a work day) and when hydrogen gas is demanded at a rate higher than it can be produced by the reactor (e.g., during peak power consumption times).

Third, the reactor 112 may be subject to space constraints, for example when the reactor is retrofitted into an existing appliance space (e.g., a furnace space). Accordingly, the reactor 112 can include features that adapt it to the space constraints so to operate efficiently despite the space constraints. Relatedly, the system 100 and/or the reactor 112 can include features that help to reduce and/or minimize parasitic heat loss, thereby increasing (or maximizing) energy efficiency from the reactor 112. For example, as discussed above, the reactor 112 can be coupled to the heating system 130 to recycle parasitic heat loss in the heating system 130. Concerns regarding the efficiency of the system 100 and/or the reactor 112 can be especially important in residential scale reactors, since they can have a relatively high surface area to volume ratio relative to industrial scale columns, and therefore can have more parasitic heat loss. In addition, the reactor 112 can include monitoring and control schemes that are unique to the residential scale and/or localized consumption of the hydrogen gas product.

Fourth, the decomposition reaction within the reactor 112 may not run to completion and/or various secondary reactions can take place within the reactor 112. Purely by way of example, secondary reactions can include reactions between a natural gas reactant and ambient $CO_2$ and/or between a natural gas reactant and ambient $H_2O$ that each generate a carbon monoxide byproduct. In another example, a portion of the natural gas reactant can combust with ambient oxygen to generate a carbon dioxide byproduct. Accordingly, in some embodiments, the system 100 can include various features to filter product gases to isolate the $H_2$ gases and/or at least partially capture carbon emissions (e.g., CO, $CO_2$, unreacted $CH_4$, ambient $N_2$, and the like).

Additional details on the features the system 100 and/or the reactor system 110 include to meet these challenges are discussed with respect to FIGS. 3-20 and 24-30 below.

Figure 2:
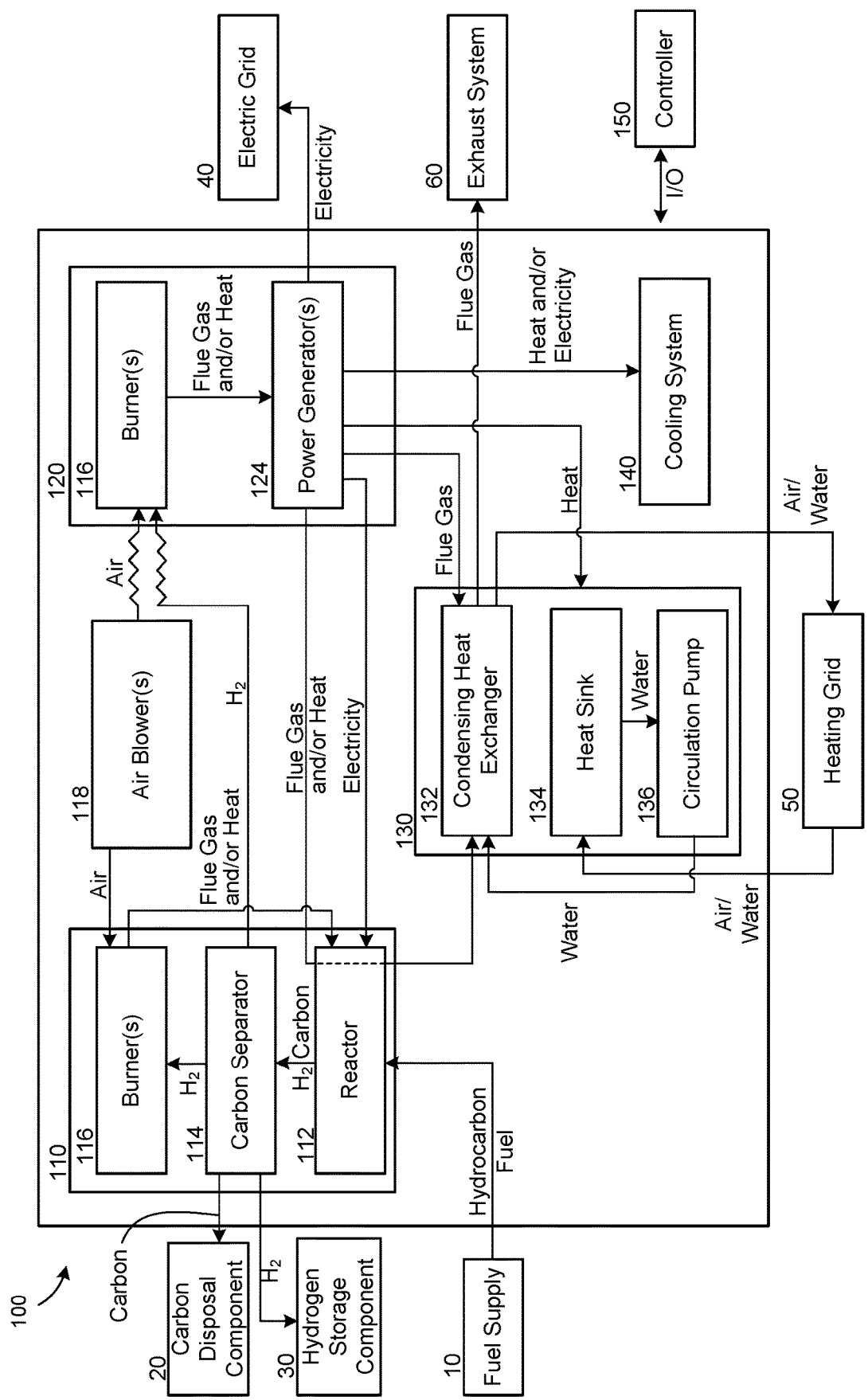
FIG. 2 is a block diagram of a system for producing hydrogen gas for local distribution, consumption, and/or storage in accordance with further embodiments of the present technology.

FIG. 2 is a block diagram of a system 100 for producing hydrogen gas for local distribution, consumption, and/or storage in accordance with further embodiments of the present technology. The system 100 illustrated in FIG. 2 is generally similar to the system 100 described above with respect to FIG. 1. For example, as illustrated, the system 100 includes a reactor system 110 operably coupled to a fuel supply 10, an electric generation system 120 operably coupled to the reactor system 110, and a heating system 130 operably coupled to the reactor system 110 and the electric generation system 120. However, in the illustrated embodiment, the outputs from the power generator(s) 124 are modified. For example, as illustrated, electricity from the power generator(s) 124 can be sent to the reactor system 110 to power one or more components of therein. For example, the electricity can power heat generators (e.g., resistive coils coupled to the reactor, input valves, output valves, the carbon separator 114, and/or any other suitable component. In the illustrated embodiment, hot flue gas from the power generator(s) 124 is sent directly to the condensing heat exchanger 132 to deliver heat into the heating system 130.

Figure 3:
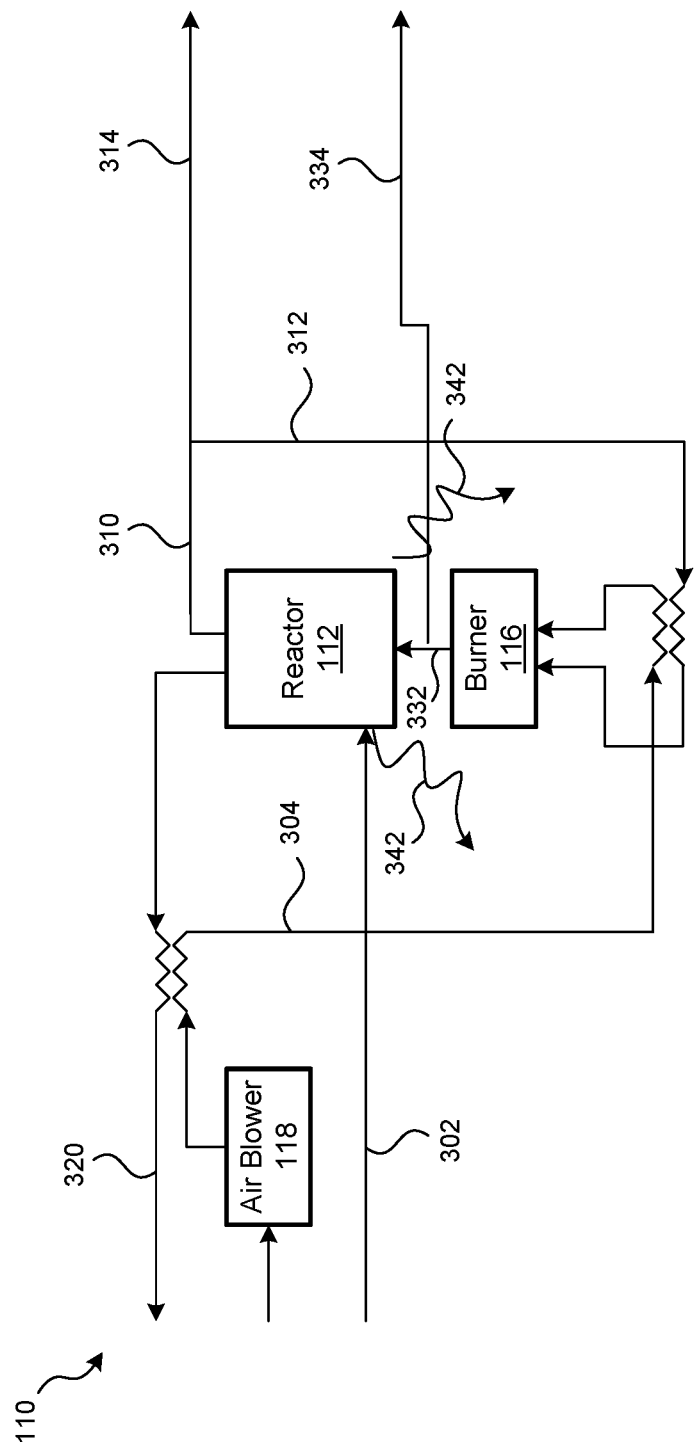
FIG. 3 is a block diagram of reactor system for producing hydrogen gas in accordance with some embodiments of the present technology.

FIG. 3 is a schematic diagram of the flow of materials through the reactor system 110 in accordance with some embodiments of the present technology. As illustrated, a reactant enters the reactor along an input path 302. As described above, the reactant can be natural gas and/or pure methane. Accordingly, the input path 302 can be connected to existing gas lines to supply the reactant to the reactor 112. The reactor 112 controllably heats the reactant beyond an enthalpy point, which represents the minimum energy for any amount of the pyrolysis reaction to occur (e.g., the reactor 112 provides at least an initiation energy). As a result, the reactor 112 causes a pyrolysis reaction that breaks hydrocarbons in the reactant into hydrogen gas and carbon. For example, for a methane reactor, the pyrolysis reaction is:

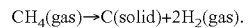

$$CH_4(gas) \rightarrow C(solid) + 2H_2(gas).$$

Further, for $CH_4$, the enthalpy point is about 75 kJ per mol of $CH_4$, which causes the $CH_4$ to heat to about 650° C. In some embodiments, to ensure the pyrolysis reaction fully occurs for relatively short residence times (e.g., on the order of seconds), the reactor 112 controllably heats the reactant above about 1300° C. In some embodiments, the reactor 112 is or includes a heated column containing a molten material such as molten metal, molten salt, and/or a combination thereof. The hot liquid can include pure materials or a mixture of multiple materials. In such embodiments, the reactant is delivered into the reactor 112 under the surface of the liquid, for example by a subsurface delivery tube or a porous sparger. The reactor includes a component to cause the reactant to separate into bubbles that are carried to the top of the heated column by their buoyancy. As the bubbles rise, the hot liquid delivers heat to the reactant to cause the pyrolysis reaction described above. In some embodiments, the reactor 112 includes one or more heat storage device, which can have a reaction chamber in accordance with some embodiments discussed below. Each reaction chamber includes insulating a heat exchange material and one or more flow paths for the reactant through the heat exchange material. The heat exchange material can be selected based on the material's relatively low thermal conductivity, relatively low thermal coefficient of expansion, and/or relatively high thermal stability. In various embodiments, the heat exchange material can include cordierite, mullite, alpha alumina, and/or combinations thereof. As the reactant flows through the flow paths, the heat exchange material delivers heat to the reactant to cause the pyrolysis reaction described above.

As further illustrated in FIG. 3, the output from the reactor 112 is split into a hydrogen path 310 and a carbon path 320 corresponding to the two products from the pyrolysis reaction. Hydrogen gas is directed into the hydrogen path 310 while carbon particulates are directed to the carbon path 320. As discussed above, the hydrogen in the hydrogen path 310 can be directed back into the reactor system 110 and/or elsewhere in the system 100 (FIG. 1). Meanwhile, the carbon path 320 can be directed to a disposal system (e.g. the carbon disposal component 20 discussed with respect to FIG. 1) and/or a collection system. As illustrated, the carbon path 320 can be in fluid communication with the air blower 118 to help ensure the carbon particulates travel all the way to the carbon disposal component 30 (FIG. 1), rather than clogging an outlet from the reactor 112. In some embodiments, the split is accomplished by a carbon separator (not shown) that is separate from and in fluid communication with the reactor 112. In some embodiments, for example as discussed in more detail below with respect to FIGS. 6-8 and 24-30, the split is accomplished by a carbon separator (not shown) at least partially integrated into the reactor 112.

In the illustrated embodiment, the reactor system 110 further splits the hydrogen path 310 of hydrogen gas into first and second hydrogen paths 312, 314. A portion of the hydrogen gas is directed towards the burner 116 in the first hydrogen path 312. The burner 116 mixes and combusts the hydrogen gas in the first hydrogen path 312 with air from the air blower 118 in an air input path 304 to provide heat to the reactor 112 along heat path 332. The heat compensates for parasitic heat loss (e.g., along heat paths 342) from the reactor 112 and supplies the energy necessary to heat the reactant beyond the enthalpy point to cause the pyrolysis reaction. Meanwhile, a portion of the hydrogen gas is directed out of the reactor system 110 along the second hydrogen path 314 for any of the purposes described above with respect to FIG. 1. That is, the hydrogen gas directed out of the reactor system 110 along the second hydrogen path 314 can be used to generate heat and/or electricity within the system 100, can be stored for later use, and/or can be put into further distribution. For example, in a neighborhood or multi-family scale device, the hydrogen gas exiting the reactor system 110 along the second hydrogen path 314 can be delivered to individual homes or units through a pipe system for local consumption.

As further illustrated in FIG. 3, the flue gas from the burner 116 exits the reactor system through a flue path 334 after heating the reactor 112. In some embodiments, the flue path 334 is directed to other systems for consumption (e.g., to the electric generation system 120 and/or the heating system 130 discussed above with respect to FIG. 1). In some embodiments, the flue path 334 is directed to an exit to be emitted (e.g., into the exhaust system 60 discussed above with respect to FIG. 1).

Figure 12:
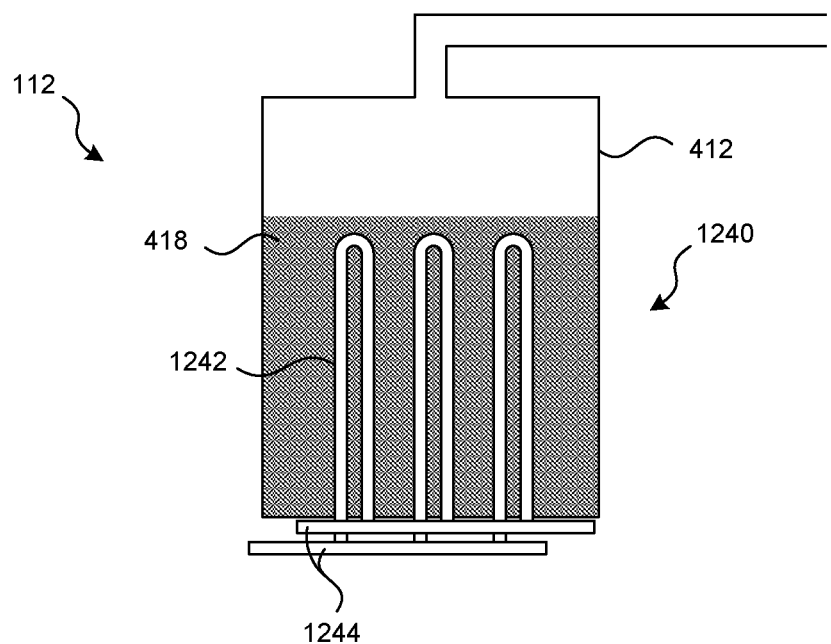
Figure 13:
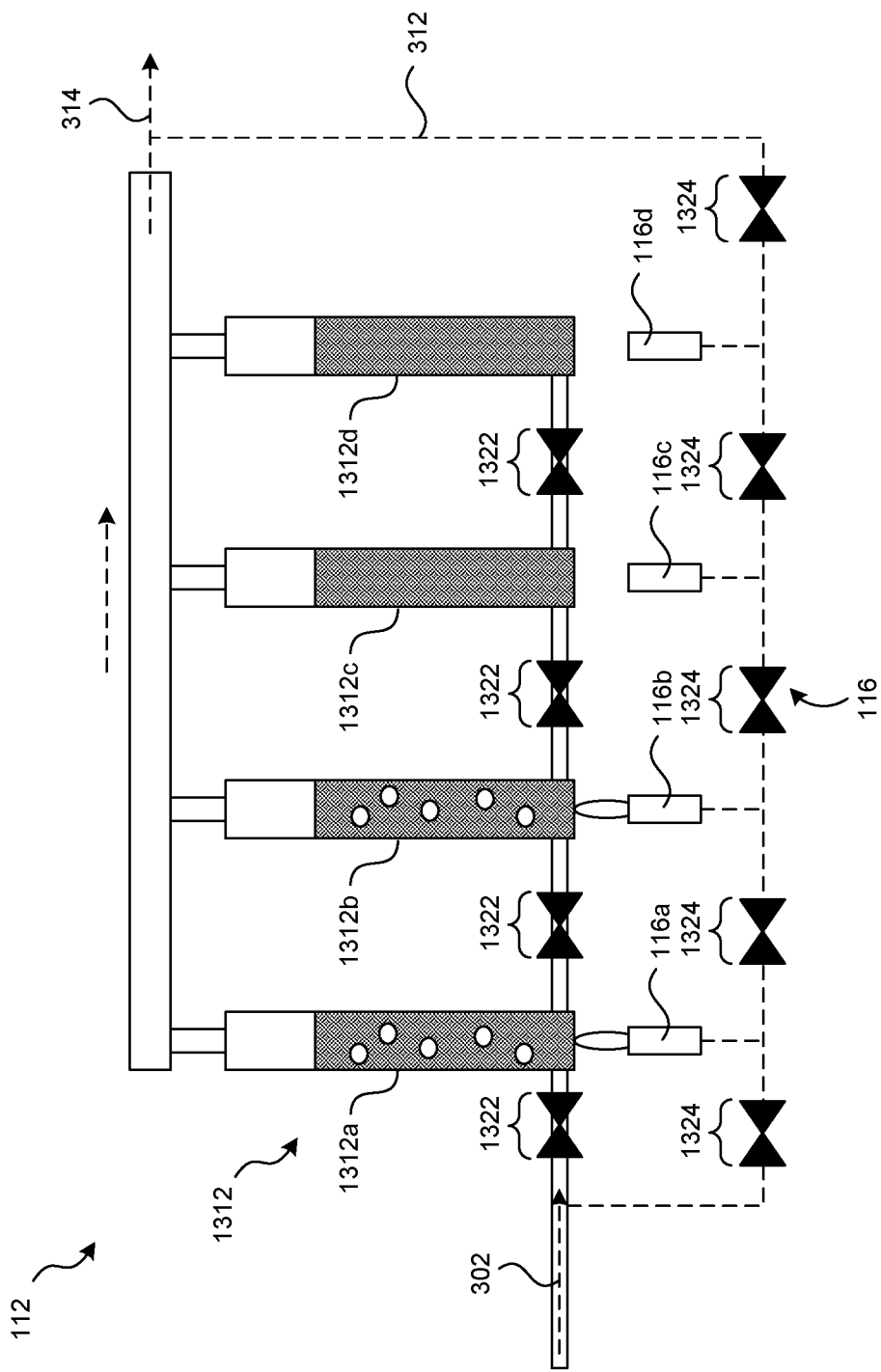
FIG. 13 is a schematic diagram of a reactor system divided into multiple reaction chambers in accordance with various embodiments of the present technology.
Figure 14:
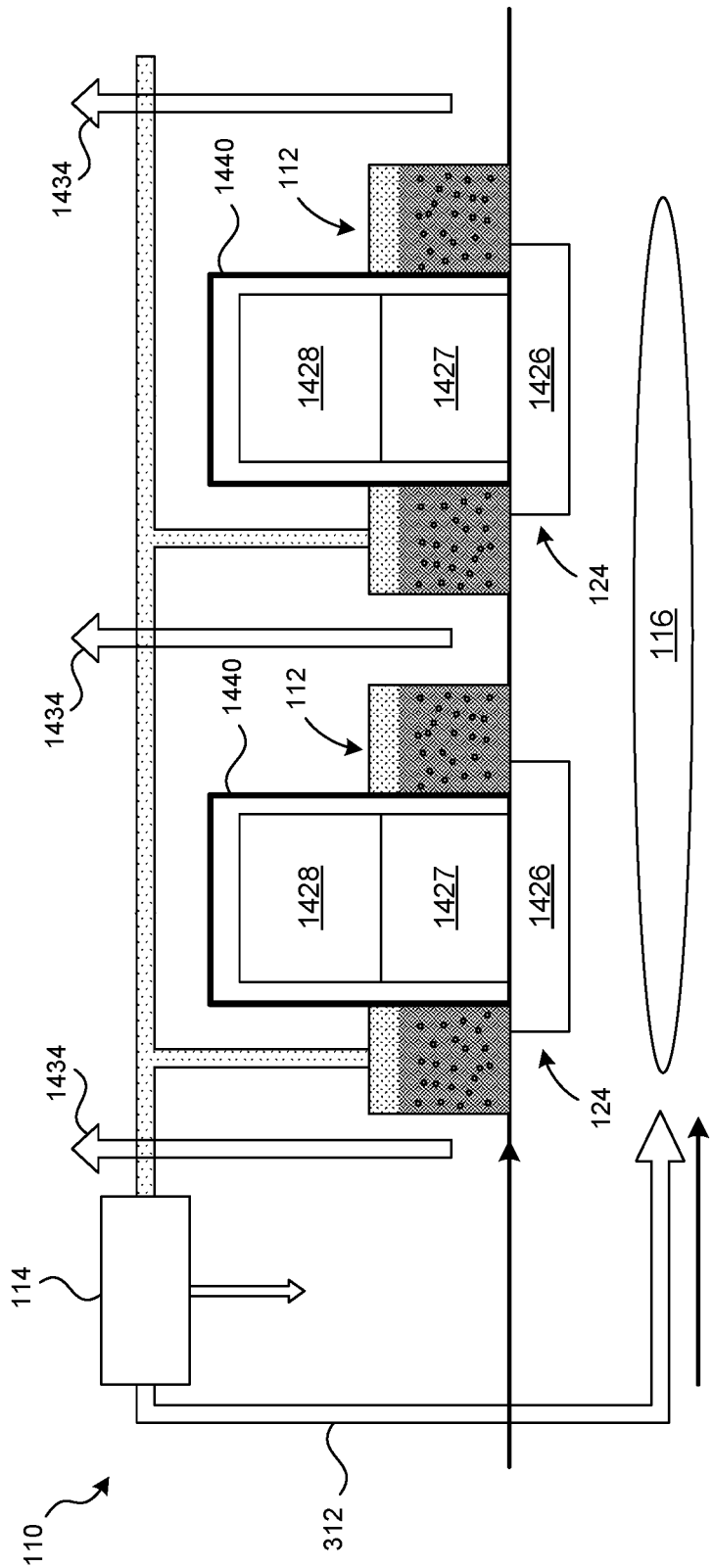
FIG. 14 is a schematic diagram of a reactor system coupled to an electrical power generation system in accordance with some embodiments of the present technology.

In the following discussion, FIGS. 4-15 illustrate features of the system as applied to a molten material embodiment of the reactor 112, FIGS. 16-21 illustrate features of the system as applied to a regenerative reaction chamber embodiment of the reactor 112, and FIGS. 24-30 illustrate features of the system as applied to an autothermal reaction chamber embodiment of the reactor 112. However, one of skill in the art will understand that the features are not necessarily limited to the embodiments in which they are discussed. For example, the arrangement of the reactor 112 in parallel with the power generators 124 discussed below with respect to FIG. 14 is not limited to the molten material embodiment of the reactor 112. Accordingly, the scope of the disclosed technology is not confined to any subset of embodiments discussed below.

Figure 4:
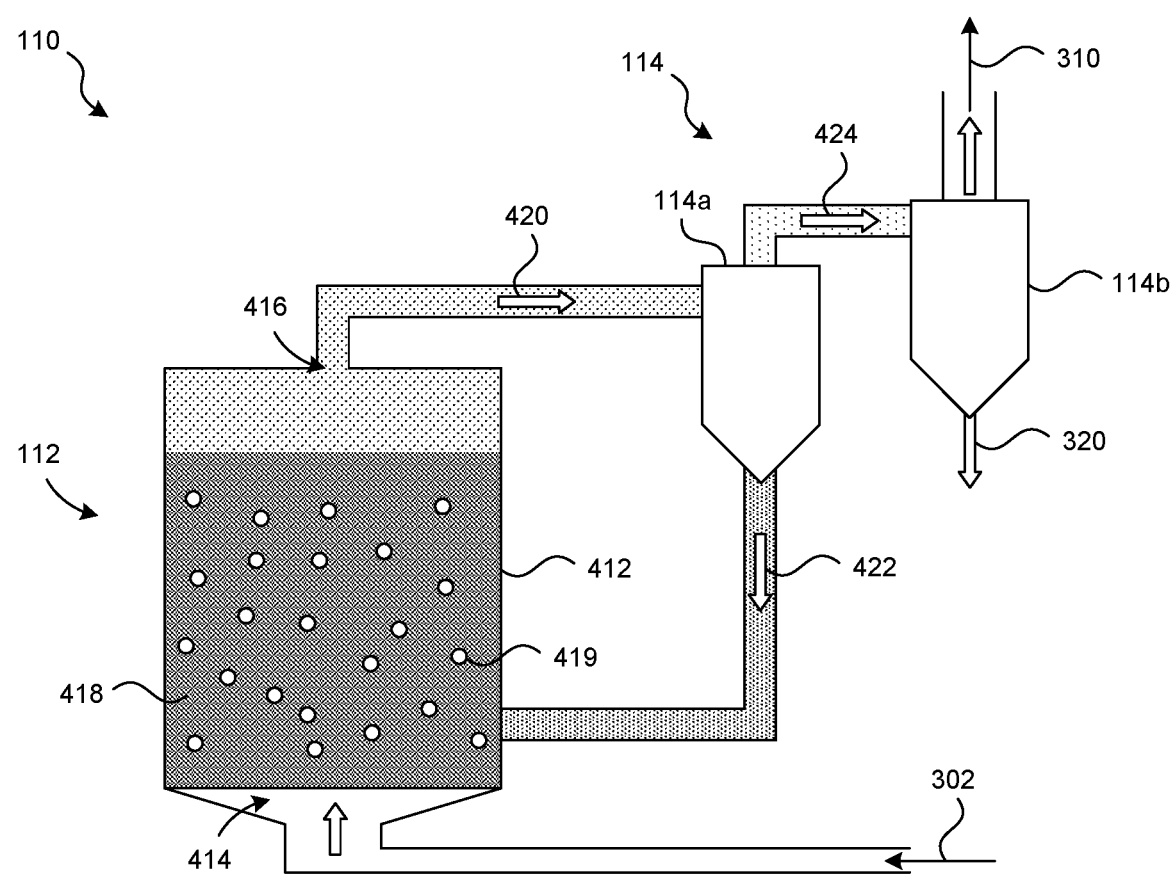
FIG. 4 is a schematic diagram of a reactor system coupled to a carbon separator in accordance with some embodiments of the present technology.

FIG. 4 is a schematic diagram of a reactor system 110 configured in accordance with some embodiments of the present technology. In the illustrated embodiment, the reactor 112 includes a main body 412 with a first end 414 and a second end 416. The portion of the reactor 112 towards first end 414 is in fluid communication with a reactant source (e.g., fuel supply 10 (FIG. 1)) and delivers the reactant in the input path 302 to the main body 412. The main body 412 includes a molten material 418 that controllably delivers heat to bubbles 419 of the reactants flowing from the first end 414 towards the second end 416. The heat from molten material 418 causes the pyrolysis reaction to occur within the main body 412. The resulting carbon particulates and hydrogen gas exit the main body 412 toward the second end 416 along a first exit path 420. In some embodiments, some of all of the carbon particulates are not carried out of the main body 412 by the flow of the hydrogen gas along the first exit path 420. Accordingly, in some embodiments, such as those discussed in more detail below with respect to FIGS. 6-10, the main body 412 can include an integrated carbon separator that separates some (or all) of the carbon from the hydrogen gas and the molten metal within the main body 412. In some embodiments, for example as discussed in more detail below with respect to FIG. 5, the main body 412 can include features that increase the amount of carbon carried out of the reactor 112 along the first exit path 420.

The first exit path 420 delivers the carbon particulates and hydrogen gas to one or more carbon separators 114 (two shown, referred to individually as a first carbon separator 114a and a second carbon separator 114b). The carbon separators 114 can remove particles in series based on their size and/or composition. For example, the first carbon separator 114a removes relatively large carbon particulates and/or carbon particulates that are contaminated with molten metal (e.g., carrying some molten metal), while the second carbon separator 114b can remove smaller particles to further refine the output stream of hydrogen gas. In the illustrated embodiment, the first carbon separator 114a removes contaminated particles from the first exit path 420. The first carbon separator 114a then directs the contaminated particles back to the main body 412 along a reentrance path 422 and directs the filtered output towards the second carbon separator 114b along a second exit path 424. In turn, the second carbon separator 114b can remove non-contaminated carbon particulates from the output in the second exit path 424. The second carbon separator 114b can then direct filtered hydrogen gas outwards along the hydrogen path 310 and the solid carbon outwards along the carbon path 320.

The main body 412 can be made from a material with a melting point above the operating temperature for the reactor 112. For example, in one embodiment, the main body 412 can be made from quartz. Further, as discussed above, the molten material 418 can include a suitable molten metal, molten salt, and/or a combination thereof. The molten material 418 can consist of pure materials (e.g., a single molten metal) or a mixture of multiple materials (e.g., multiple molten metals).

As discussed above, one obstacle for efficient operation of the reactor 112 is efficiently and safely removing carbon from the reactor 112 and/or from hydrogen gas in the output stream of the reactor. FIGS. 5-10 are schematic diagrams of reactors 112 of the type shown in FIG. 4, with features for removing carbon from the reactor 112 and/or the output in accordance with various embodiments of the present technology.

Figure 5:
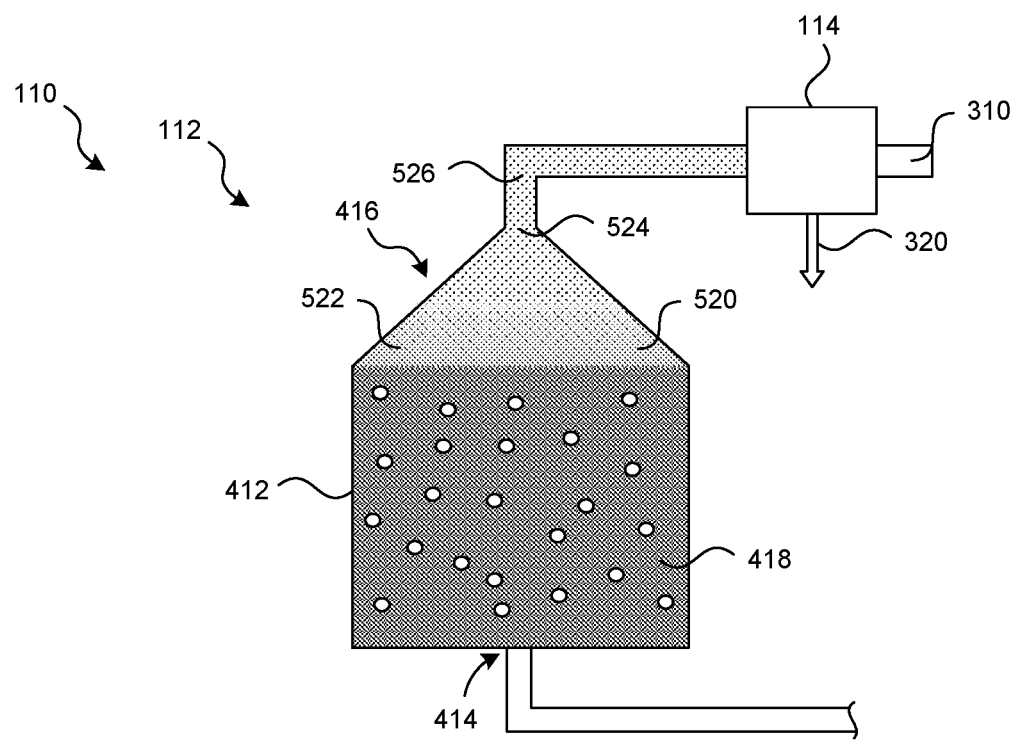
FIG. 5 is a schematic diagram of a reactor system with features to encourage a carbon particulate flow out of the reactor system in accordance with some embodiments of the present technology.

FIG. 5 is a schematic diagram of a reactor system 110 with features that encourage the flow of carbon particulates out of the reactor 112 in accordance with some embodiments of the present technology. Like the reactor 112 discussed above with respect to FIG. 4, the illustrated reactor includes the main body 412 extending from the first end 414 to the second end 416 and containing the molten material 418. The first end 414 is in fluid communication with a reactant source, while the second end 416 is in fluid communication with other components of the reactor system 110. In the illustrated embodiment, the main body 412 of the reactor 112 includes a conical component 520 that accelerates the flow of fluids out of the second end 416 of the reactor 112 to help carry carbon particulates away. For example, the diameter of the main body 412 is relatively wide. Accordingly, in the main body 412, the reactant can have a low superficial velocity that allows the pyrolysis reaction to fully occur. In a first region 522 of the conical component 520, the conical component 520 has a diameter that generally matches the main body to transition the output of the reactor into the conical component 520. In the second region 524 the diameter becomes progressively narrower, thereby causing an increase in the output's superficial gas velocity. In the third region 526 near the second end 416, the diameter is even more narrow. As a result, in the third region 526, the output's superficial gas velocity can carry lighter carbon particulates (e.g., carbon with less or no metal contamination) out of the reactor 112 and towards the carbon separator 114. In the illustrated embodiment, the reactor system 110 includes a single carbon separator 114 that directs filtered hydrogen gas from the output into the hydrogen path 310 and carbon particulates from the output into the carbon path 320.

FIGS. 6-10 are schematic diagrams of reactors 112 of the type shown in FIG. 4 that include an integrated carbon separator 114 in accordance with various embodiments of the present technology. For example, like the reactor 112 discussed above with respect to FIG. 4, the reactors 112 illustrated in FIGS. 6-10 each include the main body 412 extending from the first end 414 to the second end 416. The first end 414 is in fluid communication with a reactant source, while the second end 416 is in fluid communication with other components of the reactor system 110. As discussed above, in some embodiments, the flow of the output does not carry all (or any) of the carbon particulates out of the reactor 112. In such embodiments, the reactor 112 can include one or more of the integrated carbon separators 114 discussed below to avoid large carbon build ups within the reactor 112.

Figure 6:
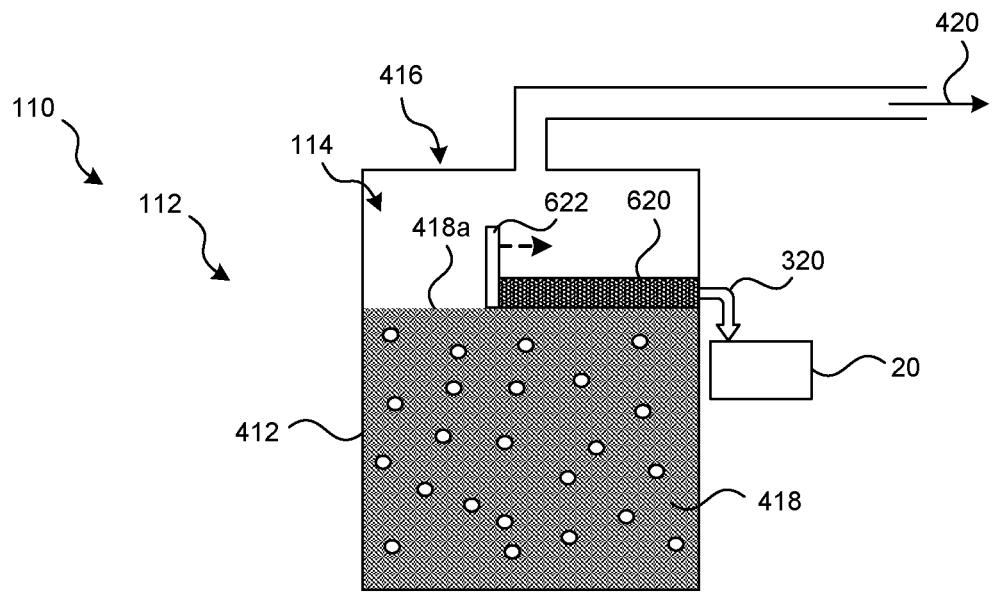
FIGS. 6-10 are schematic diagrams of reactor systems with an integrated carbon separator configured in accordance with various embodiments of the present technology.
Figure 7:
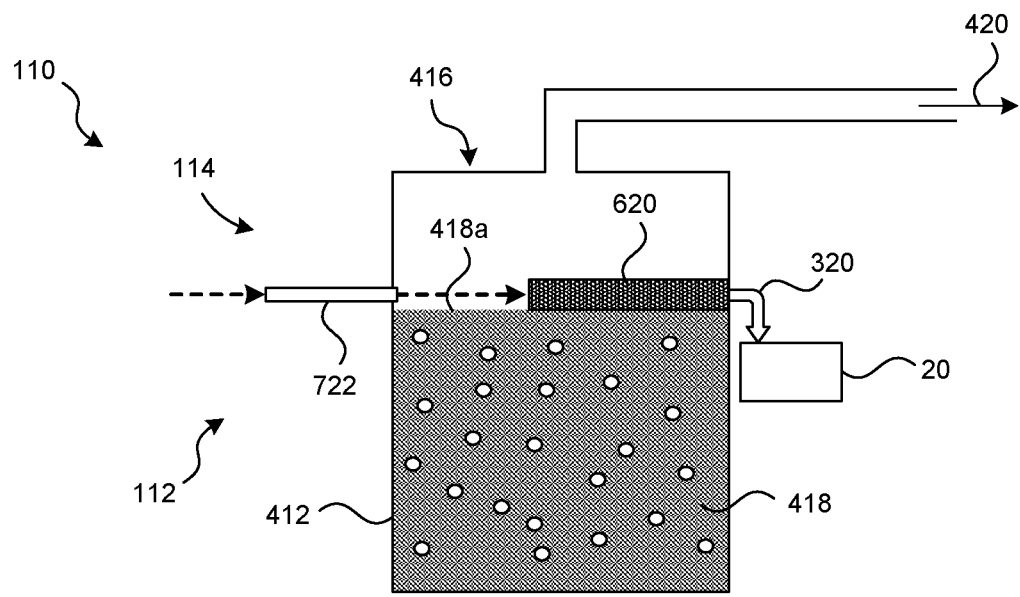
Figure 10:
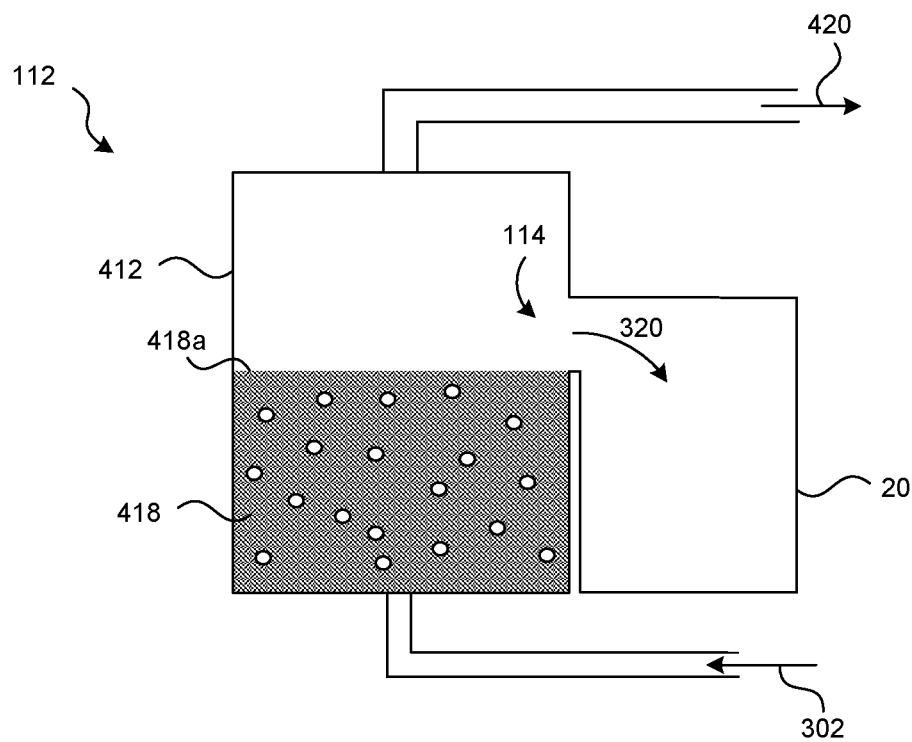

In some embodiments, as illustrated in FIGS. 6, 7 and 10, the carbon particulates concentrate on an upper surface 418a of the molten material 418. For example, in some embodiments, the flow of the reactant through the main body 412 is sufficient to propel carbon particulates through the molten material 418, but insufficient to carry the carbon particulates above the metal material. Accordingly, the reactor 112 can include a carbon separator 114 that skims the upper surface 418a of the molten material 418 to remove carbon from the reactor 112.

For example, as illustrated in FIG. 6, the carbon separator 114 can include a mechanical skimming component 622 that skims the upper surface 418a to push a carbon build-up 620 out of the reactor 112 and into the carbon path 320 towards the carbon disposal component 20. Alternatively, or additionally, the carbon separator 114 can include a fluid skimming component 722, as illustrated with respect to FIG. 7. The fluid skimming component 722 can direct a fluid (e.g., air or any other suitable fluid) across the upper surface 418a of the molten material 418 to push the carbon build-up 620 out of the reactor 112 and into the carbon path 320 towards the carbon disposal component 20. In some embodiments, the mechanical skimming component 622 (FIG. 6) and/or the fluid skimming component 722 (FIG. 7) periodically skim the upper surface 418a. For example, the mechanical skimming component 622 and/or the fluid skimming component 722 can skim the upper surface 418a while the reactor 112 is otherwise inactive (e.g., between periods of hydrogen gas consumption). In some embodiments, the mechanical skimming component 622 and/or the fluid skimming component 722 continuously skim the upper surface 418a. In some embodiments, the mechanical skimming component 622 and/or the fluid skimming component 722 continuously skim the upper surface 418a only during specific (e.g., recurring, ideal) periods. For example, the mechanical skimming component 622 and/or the fluid skimming component 722 can continuously skim the upper surface 418a while the reactor 112 is active to keep the upper surface 418a clear, and reduce skimming the upper surface 418a while the reactor 112 is inactive to improve the efficiency of the reactor system 110 (FIG. 1).

Additionally, or alternatively, the reactor 112 can include a passive carbon separator 114 that allows carbon from the upper surface 418a of the molten material 418 to fall out of the reactor 112 and/or into the carbon disposal component 20, for example as illustrated in FIG. 10. In some such embodiments, such as the embodiment illustrated in FIG. 10, the main body 412 of the reactor 112 can include a passive carbon separator 114. In the illustrated embodiment, the carbon separator 114 includes an opening in the main body 412 of the reactor that allows carbon collecting on the upper surface 418a of the molten material 418 to fall out of the reactor 112 and into the carbon path 320 towards the carbon disposal component 20. One benefit of a passive carbon separator 114 is an increase in efficiency for the system 100 (FIG. 1) since little (or no) energy is required to remove the carbon from the reactor 112. However, the passive carbon separator 114 can also lower the efficiency of the reactor 112 if too much heat can escape through the passive carbon separator 114.

Figure 8:
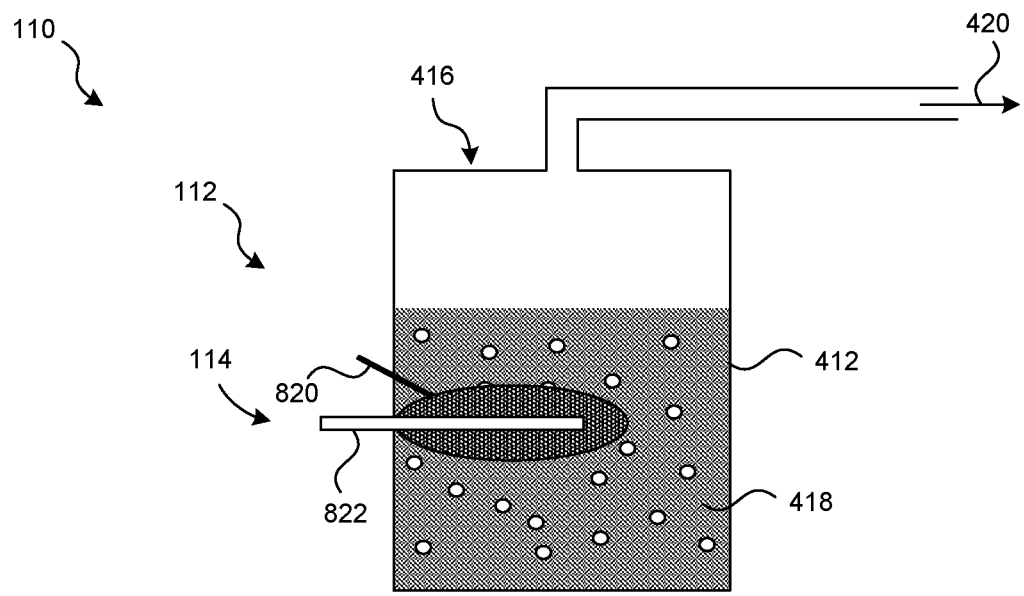

In some embodiments, as shown in FIG. 8, the carbon particulates concentrate around a carbon build-up 820 within the molten material 418. For example, in some embodiments, the carbon build-up 820 forms around the point that the reactant reaches the enthalpy point and the pyrolysis reaction occurs. That is, after the pyrolysis reaction, some of the carbon particulates can stop moving through while the hydrogen gas and/or other carbon particulates continue through the molten material 418. Accordingly, in some embodiments, the reactor 112 includes a carbon separator 114 that collects carbon at a precipitation component 822 within the molten material 418 for periodic and/or continual removal. In such embodiments, the precipitation component 822 helps control precipitation of the carbon out of the output and collects the carbon within the molten material 418.

Figure 9:
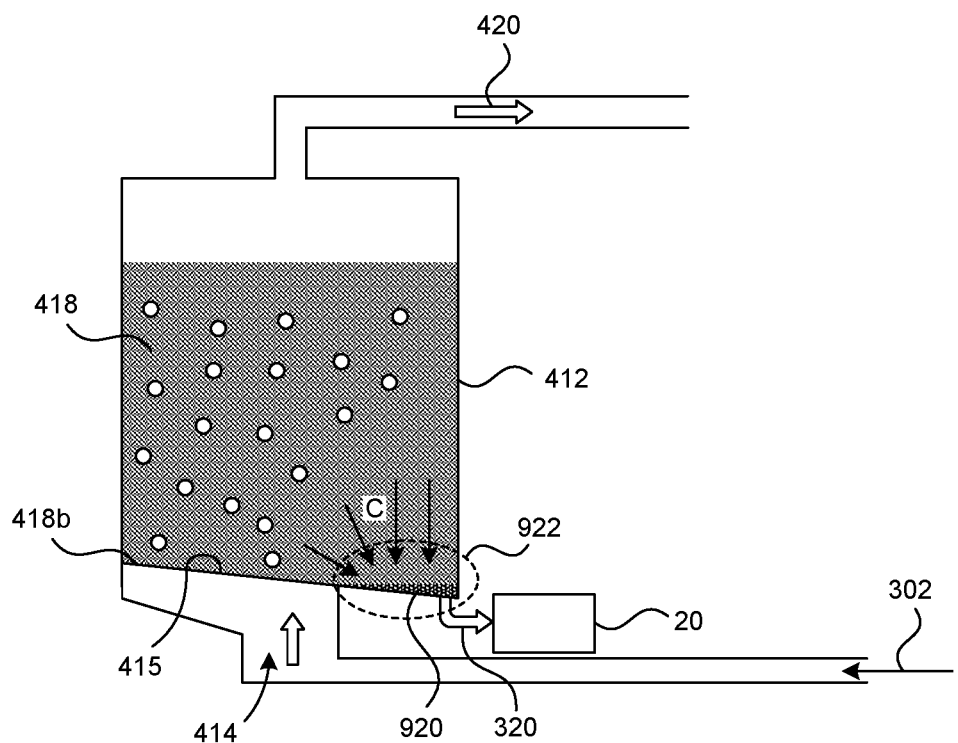

In some embodiments, as shown in FIG. 9, the carbon particulates concentrate around a lower surface 418b of the molten material 418 and near the first end 414 of the reactor 112. For example, in some embodiments, some carbon resulting from the pyrolysis reactor is denser than the hot molten material 418 and therefore sinks towards the first end 414 of the main body 412. Accordingly, in some embodiments, the first end 414 of the main body 412 can include a surface 415 that slopes towards a portion 922 of the carbon separator 114 at a lowermost point of the main body 412. At the lowermost point, the portion 922 of the carbon separator 114 can collect a carbon build-up 920 from the main body 412 and direct the carbon particulates into the carbon path 320 towards the carbon disposal component 20. In some embodiments, the density of the molten material 418 is modulated relative to that of carbon by selectively adding one or more catalytically inactive components to the molten material 418 and/or by adjusting the temperature molten material 418. In such embodiments, the density of the molten material 418 is reduced, causing the carbon in the molten material 418 to sink towards the portion 922 of the carbon separator 114 for collection and removal.

As discussed above, another obstacle for efficient operation of the reactor 112 is adapting the reactor to cyclical and/or uneven demand curves for hydrogen and/or power. Accordingly, in some embodiments, the reactor 112 can include features to address the uneven demand curves typical of a residential scale reactor. For example, for cyclical demand curves having periods when no (or little) hydrogen or energy is needed, the reactor 112 can include features that allow the reactor 112 to cool and quickly reheat to match demand. Alternatively, or additionally, the reactor 112 can include features that generate a small amount of heat to counterbalance parasitic heat loss during periods when no (or little) hydrogen or energy is produced so that there the reheating period is shorter when demand increases. Additional details of representative solutions are described below with respect to FIGS. 11-13.

Figure 11:
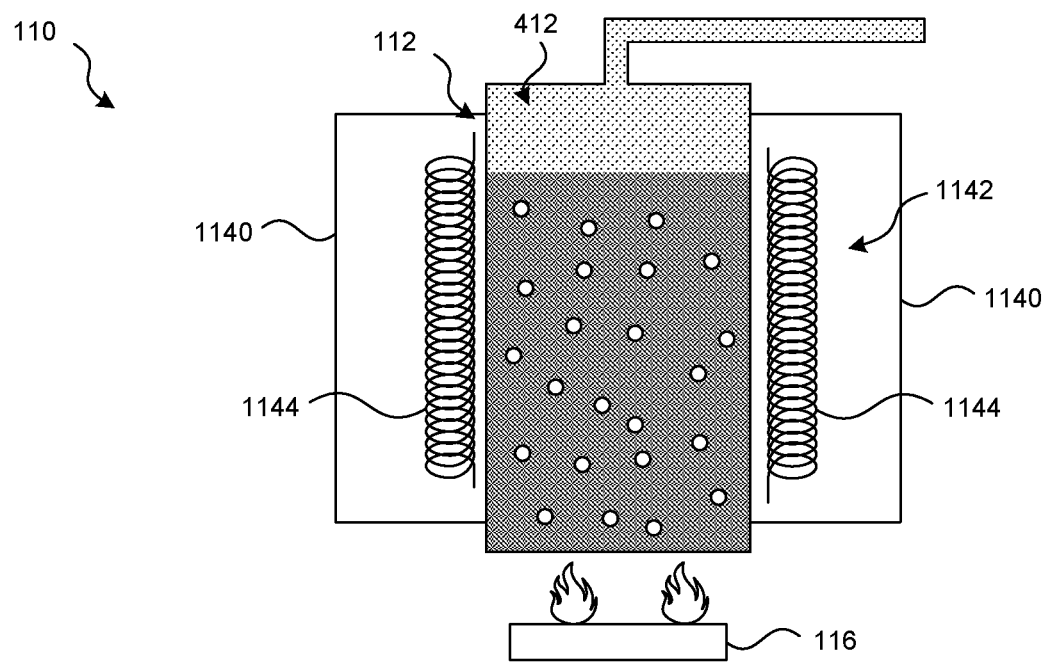
FIGS. 11 and 12 are schematic diagrams of reactor systems having integrated heating features in accordance with various embodiments of the present technology.

FIGS. 11 and 12 are schematic diagrams of reactor systems 110 that include quick-heating features integrated into the reactor 112 in accordance with various embodiments of the present technology. As illustrated with respect to FIG. 11, the main body 412 of the reactor 112 can be enclosed by a chamber 1140. The chamber 1140 includes a space 1142 and one or more electrical heaters 1144 (two shown). During periods of low demand, the space 1142 can be evacuated to reduce parasitic heat loss (e.g., creating at least a partial vacuum). In some embodiments, the internal surface of the chamber 1140 is reflective to further reduce parasitic heat loss. When demand begins to rise, the space 1142 can be filled (e.g., with air) and the electrical heaters 1144 can deliver heat around the main body 412 while the burner 116 delivers heat into the main body 412 to quickly reheat the reactor 112. In some embodiments, the electrical heaters 1144 deliver heat around the main body 412 during periods of low demand to further reduce the parasitic heat loss. Further, in some embodiments, the chamber 1140 includes a power generator (e.g., a thermoelectric generator) that captures a portion of the parasitic heat loss. In some such embodiments, the captured parasitic heat loss is then used to power the electrical heaters 1144 to reheat the reactor.

As illustrated in FIG. 12, the reactor can include a reheating system 1240 integrated into the main body 412 of the reactor 112. In the illustrated embodiment, the reheating system 1240 includes heating coils 1242 embedded within the molten material 418 and connected to supply lines 1244 outside of the main body 412. The heating coils 1242 can be electrical (resistive or inductive) and/or fluid coils (e.g., containing hot gases, such as flue gas from a burner). By integrating the reheating system 1240 with the main body 412 of the reactor 112, the reheating system 1240 can quickly deliver heat to the center of the reactor, which may otherwise be slower to reheat. For example, when the temperature of the main body 412 falls below the melting point of the molten material 418, some of the material may solidify to prevent the flow of gas and/or material through the main body 412 during reheating. Accordingly, heating the center of the main body 412 requires conduction from the external surfaces of the main body 412. By delivering heat to the center of the main body 412 at the same time, the reheating system 1240 can accelerate the rate at which the reactor 112 is reheated. Further, in some embodiments, heating coils 1242 can also supply heat to the main body 412 during periods of low demand to counter the effect of parasitic heat loss.

It will be understood that, in some embodiments, the reactor system 110 can include both the chamber 1140 discussed above with respect to FIG. 11 and the reheating system 1240 discussed above with respect to FIG. 12 to accelerate the reheating process. Further, in various embodiments, the reactor system 110 can include an oversized burner to deliver a high amount of heating power to the reactor 112 during the reheating process; a porous media burner, such as a sparger, embedded in the main body 412 to flow a hot gas through the main body 412 during the reheating process; a system to run exothermic reactions inside the reactor 112; and/or various other suitable features to accelerate the reheating process. In embodiments having an oversized burner, the oversized burner can use a typical fuel gas (e.g., natural gas), hydrogen gas from a hydrogen storage component 30 (FIG. 1), and/or a mixture of the two. In embodiments having a porous media burner, the media burner can combust a fuel gas (e.g., natural gas, hydrogen, and/or a mixture of the two) during the reheating process, then deliver the reactant to the main body 412 after the reactor 112 reaches the operating temperature.

In some embodiments, the reactor 112 can additionally, or alternatively utilize a cascade approach to adapt the reheating process for a quick partial start-up. For example, the reactor 112 can include multiple reaction chambers arranged in series or parallel configurations. Each chamber can be sized to reheat quickly and have a net positive output after parasitic effects are accounted for during operation. Also, burner output can be modulated significantly, and the burner(s) can use a mixture of $CH_4$ and $H_2$ stream. FIG. 13 is a schematic diagram of an example of the reactor 112 divided into multiple reaction chambers 1312a-d in accordance with some embodiments of the present technology.

In the illustrated embodiment, the reactor 112 includes four reaction chambers (referred to individually as first-fourth reaction chambers 1312a-d) in fluid communication with the input path 302. A series of first valves 1322 control the flow of the reactant to each of the reaction chambers 1312, and a second series of valves 1324 control the flow of the reactant and/or the output from the reactor 112 to a series of burners 116 (referred to individually as first-fourth burners 116a-d). Each of the burners 116a-d individually corresponds to one of the reaction chambers 1312a-d. When demand first increases, the first reaction chamber 1312a can be reheated by the first burner 116a. During this initial period, the first burner 116a can combust the reactant (e.g., natural gas) and/or hydrogen stored from previous operation of the reactor 112 to reheat the first reaction chamber 1312a. Once the first reaction chamber 1312a is at the operating temperature, the reactant can be passed through the first reaction chamber 1312a to begin generating hydrogen gas.

A portion of the hydrogen gas can then be directed along the second hydrogen path 314 to meet the increasing demand while a portion of the hydrogen gas can be sent along the first hydrogen path 312 to begin reheating the second reaction chamber 1312b and/or to maintain the temperature of the first reaction chamber 1312a. In some embodiments, the first burner 116b can combust a combination of hydrogen gas from the first reaction chamber 1312a and the reactant to reheat the second reaction chamber 1312b. Once the second reaction chamber 1312b is at the operating temperature, the reactant can be passed through the second reaction chamber 1312b to increase the amount of hydrogen gas generated by the reactor 112. The reheating process can then continue for the third and fourth reaction chambers 1312c, 1312d.

As more of the reaction chambers 1312 reach the operating temperature and the reactor 112 generates more hydrogen gas, the burners 116a-d shift the composition of the gases they combust. In some embodiments, the burners 116a-d stop combusting the reactant all together before, or as, the fourth reaction chamber 1312d reaches the operating temperature. Similarly, as more of the reaction chambers 1312 reach the operating temperature and the reactor 112 generates more hydrogen gas, the amount of the hydrogen gas diverted into the second hydrogen path 314 to be delivered outside of the reactor 112 can increase.

In some embodiments, the reactor 112 can include one or more thermal insulators (e.g., the chamber 1140 discussed above with respect to FIG. 11 and/or a mechanical actuator (not shown). The mechanical actuator can move the thermal insulator from one reaction chamber 1312 to the next during the reheating process. Once applied to one reaction chamber 1312, the thermal insulators can reduce the parasitic heat losses from the reaction chambers 1312 to accelerate the reheating process. Once an individual reaction chamber 1312*a-d* is at the operating temperature, the thermal insulator(s) can be removed, and the parasitic heat losses can be captured elsewhere in the system 100 (FIG. 1). In some embodiments, the thermal insulators can remain over the reaction chambers 1312 even after they reach the operating temperature.

In some embodiments, the reactor 112 turns off one or more of the reaction chambers 1312 as the demand for hydrogen gas and/or electricity decreases. For example, for periods of lower demand, the reactor 112 can operate the first and second reaction chambers 1312*a*, 1312*b* and allow the third and fourth reaction chambers 1312*c*, 1312*d* to cool. In some embodiments, each of the reaction chambers 1312*a-d* is thermally coupled to utilize parasitic heat loss from one reaction chamber 1312 to heat another reaction chamber 1312. For example, after the first reaction chamber 1312*a* is at the operating temperature, the parasitic heat loss from the first reaction chamber 1312*a* can be directed to the second-fourth reaction chambers 1312*b-d* to partially reheat the second-fourth reaction chambers 1312*b-d*.

In some embodiments, the reactor system 110 (FIG. 1) can avoid the reheating process by maintaining the reactor 112 near the operating temperature, even during periods of low (or no) demand. In various embodiments, the reactor 112 can operate continuously to generate hydrogen gas continuously and/or by modulating the input flow of reactant according to demand but maintaining the temperature of the reactor 112. In continuous operation embodiments, the reactor 112 uses the hydrogen gas to maintain heat according to normal operation. Excess hydrogen gas and/or power, by virtue of the low demand, can be stored or distributed in a local grid. For example, the controller 150 (FIG. 1) can directing electricity into the energy grid to offset and/or address the costs of continuously operating the reactor 112. In another example, excess energy can be stored in a secondary cell to supplement the output from the reactor 112 when demand exceeds the reactor's output capabilities.

In embodiments that modulate the input flow of the reactant, the controller 150 (FIG. 1) can be used to measure, respond to, and/or predict demand, then control the input flow to meet the demand. For example, the controller 150 can determine that demand increases every day around 5:00 PM and can increase the input flow at or near 5:00 PM to meet the demand. During periods of low (or no) operation, the temperature of the reactor 112 can be maintained by the chamber 1140 discussed above with respect to FIG. 11, the reheating system 1240 discussed above with respect to FIG. 12, and/or any other suitable component. For example, the reactor 112 can constantly operate a pilot flame or another electric heater that counterbalances the heat lost from the reactor 112. In some embodiments that modulate the input flow of the reactant, the heat lost from the reactor 112 can be at least partially recovered using a thermal storage tank in thermal communication with the reactor 112.

As discussed above with reference to FIG. 1, further potential obstacles for the reactor 112 include adapting the reactor to meet size constraints imposed some residential and commercial building applications and efficiently coupling the reactor 112 to other components of the system 100, given the size constraints. Accordingly, in some embodiments, the reactor 112 can be integrated with one or more other components of the system 100 to achieve efficiencies in the operation of the system 100. That is, the placement of components of the system 100 within a shared space can improve the efficiency and/or operating costs of the system 100.

For example, the reactor 112 can be integrated with the power generator(s) 124 and/or the heating system 130. The integrated components can share one or more heat inputs (e.g., share a single burner system) and/or directly use parasitic heat loss from one component to heat the other component. Further, the integrated components can more easily fit within the space constraints discussed above. For example, the integrated components can more easily fit within a space previously designated for another appliance, such as a traditional boiler or furnace.

The general use of compact heat-to electricity converters within residential heating appliances, such as furnaces, boilers, and hot water heaters, has been previously described in U.S. patent application Ser. No. 16/794,142 filed Mar. 12, 2019 by Ashton et. al, and incorporated herein by reference. However, several unique thermodynamic synergies are possible in the system 100 when the reactor 112 is integrated with other components of the system 100 in situ. For example, the overall exergy of the system 100 can be increased by adding a high temperature component, such as the reactor 112, directly upstream of, downstream of, and/or parallel to the power generator(s) 124. Heat not utilized by the power generator(s) 124 can be utilized by the reactor 112, or vice versa, to capture a larger fraction of the free energy content in the input reactant (e.g., in the methane input) before the heat is lost (e.g., degraded at an appliance's downstream heat exchanger). As a result, the efficiency of the integrated system 100 can exceed the efficiency of a system having the components operating separately.

In another example, the use of a hydrogen rather than natural gas in an appliance can help improve the efficiency of the heat transfer process from the flame to the power generator(s) 124. Further, hydrogen has a higher flame temperature, which also helps increase the efficiency of the power generator(s) 124 at a fixed heating demand. In addition, the availability of on-demand electricity and local electrical storage from other components in the system 100 can help enable various disclosed embodiments to address residential scale operational challenges of the reactor 112. For example, the local power generator(s) 124 can provide electrical heating to the reactor 112 (e.g., in accordance with the embodiments discussed above with respect to FIGS. 11 and 12) and/or can operate electrically driven valves or actuators of the reactor 112.

FIG. 14 is a schematic diagram of the reactor system 110 coupled to the electric generation system 120 (FIG. 1) in accordance with some embodiments of the present technology. In the illustrated embodiment, the system includes two reactors 112 and two power generators 124 that are arranged in parallel. In the illustrated embodiment, the reactors 112 are each placed adjacent the burner 116, alongside a hot end 1426 of the power generators 124. In the parallel arrangement, heat from the burner 116 is transferred directly into each of the reactors 112 as well as directly into the hot end 1426 of each of the power generators 124. The heat transferred to the reactors 112 maintains the operating temperature of the reactors 112 to cause the pyrolysis reaction, thereby generating hydrogen gas. In some embodiments, at least a portion of the hydrogen gas is separated from carbon particulates in the carbon separator 114, then sent along the first hydrogen path 312 to the burner 116. In the illustrated embodiment, the hydrogen fuel supply for the burner 116 comes entirely from the first hydrogen path 312 and is mixed with air at the burner 116 to adjust the burn temperature of the hydrogen flame. In various other embodiments, the hydrogen fuel supply can be supplemented with hydrogen from a storage tank and/or with other fuels (e.g. natural gas).

Meanwhile, the heat transferred to the power generators 124 generates a temperature difference between the hot end 1426 of the power generators 124 and a cold end 1426 of the power generators 124. In the illustrated embodiment, the cold end of the power generators 124 is positioned within a chamber 1440 and separated from the hot end 1426 by a space 1427. The chamber 1440 thermally insulates the cold end 1428 of the power generators 124 from the reactors 112, while the space 1427 helps maintain a temperature difference between the hot end 1426 of the power generators 124 from the cold end 1428. The power generators 124 can then use the temperature difference to generate electricity in accordance with any suitable mechanism. For example, in some embodiments, the power generators 124 are thermionic converters with the hot end 1426 separated from the cold end 1428 by a vacuum (or partial vacuum), or a suitable material in the space 1427. In such embodiments, the hot and cold ends 1426, 1428 can each be metal plates separated by the space 1427. When the hot end 1426 is heated to high temperatures, the heated metal's surface will emit electrons across the space 1427 to the cold end 1428, resulting in usable electrical energy. The thermionic converters can generate electricity from the heat from the burner without any moving parts in the power generators 124, thereby reducing maintenance and/or space requirements for the system 100. Heat that is not used by either the reactors 112 or the power generators 124 flows outwards along paths 1434, which can be directed to a sink and/or a heat exchanger in the heating system 130 (FIG. 1).

Figure 15:
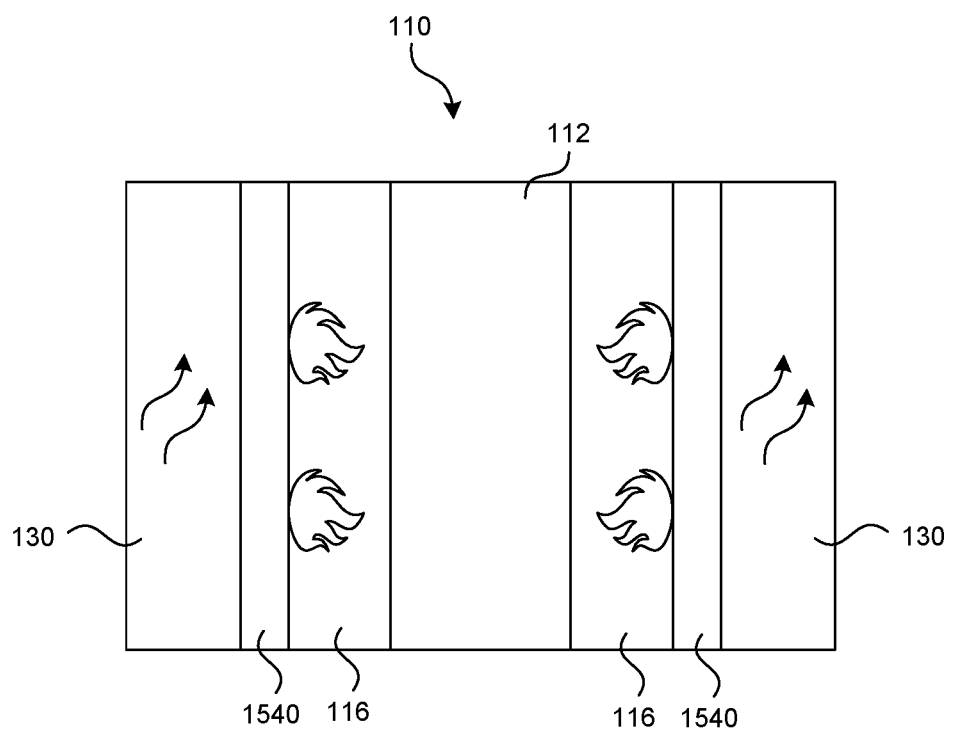
FIG. 15 is a schematic diagram of a reactor system coupled to a home heating system in accordance with some embodiments of the present technology.

FIG. 15 is a schematic diagram of the reactor system 110 coupled to the heating system 130 in accordance with some embodiments of the present technology. In the reactor system 110, the reactor 112 receives heat from one or more burners 116 disposed on either side of the reactor 112. One or more insulating walls 1540 are positioned around the burners 116. The insulating walls 1540 restrict, or prevent, heat from the burners 116 from passing in any direction other than towards the reactor 112 to maintain the operating temperature of the reactor 112. The heating system 130 is positioned around the insulation walls 1540 to capture heat that is not absorbed by the reactor 112 and/or parasitic heat loss from the reactor 112. Accordingly, heat that is not absorbed by the reactor 112 flows directly into the heating system 130. The illustrated configuration of the reactor system 110 and the heating system 130 can allow the system 100 (FIG. 1) to utilize all, or nearly all, of the heat generated by the burners 116.

In various other embodiments, the system 100 of FIG. 1 can include various other series arrangements between the components of the system 100. For example, in some embodiments, the reactor 112 and the power generator(s) 124 are arranged in series with the power generator(s) 124 positioned in close proximity to the burners 116 to directly receive heat. In some such embodiments, the reactor system 110 is positioned in between the power generator(s) 124 and a heat rejection loop for the power generator(s) 124. This series configuration is appropriate for embodiments in which the operating temperature of the power generator(s) 124 is higher than that of the reactor 112, such that the power generator(s) 124 have a higher demand for the heat from the burners 116 and enough excess heat is present to maintain the operating temperature of the reactor 112. By way of example only, some thermionic energy converters, thermophotovoltaics, and other high temperature heat engines are appropriate for this configuration. In another example, in some embodiments, the reactor 112 and the power generator(s) 124 are arranged in series, with the reactor system 110 positioned in close proximity to the burners 116 to directly receive heat. In some such embodiments, the power generator(s) 124 is positioned directly downstream to directly utilize heat emitted from the reactor system 110. This series configuration is appropriate for embodiments in which lower temperature power generator(s) 124 are utilized. By way of example only, some alkali-metal thermal-to-electric converters or Stirling engines where the heat engine is a bottoming cycle on the reactor 112 are appropriate for this configuration.

In other embodiments for which the thermodynamic synergy described above is not required, each of the components of the system 100 can be separate from the other components. Separately positioning the components can also help address the space requirements discussed above, allowing components of the system 100 to be fit into available spaces. That is, rather than requiring a space large enough for all the components of the system 100 together, the system 100 can be fit into corresponding individual spaces, and then be interconnected.

Figure 16:
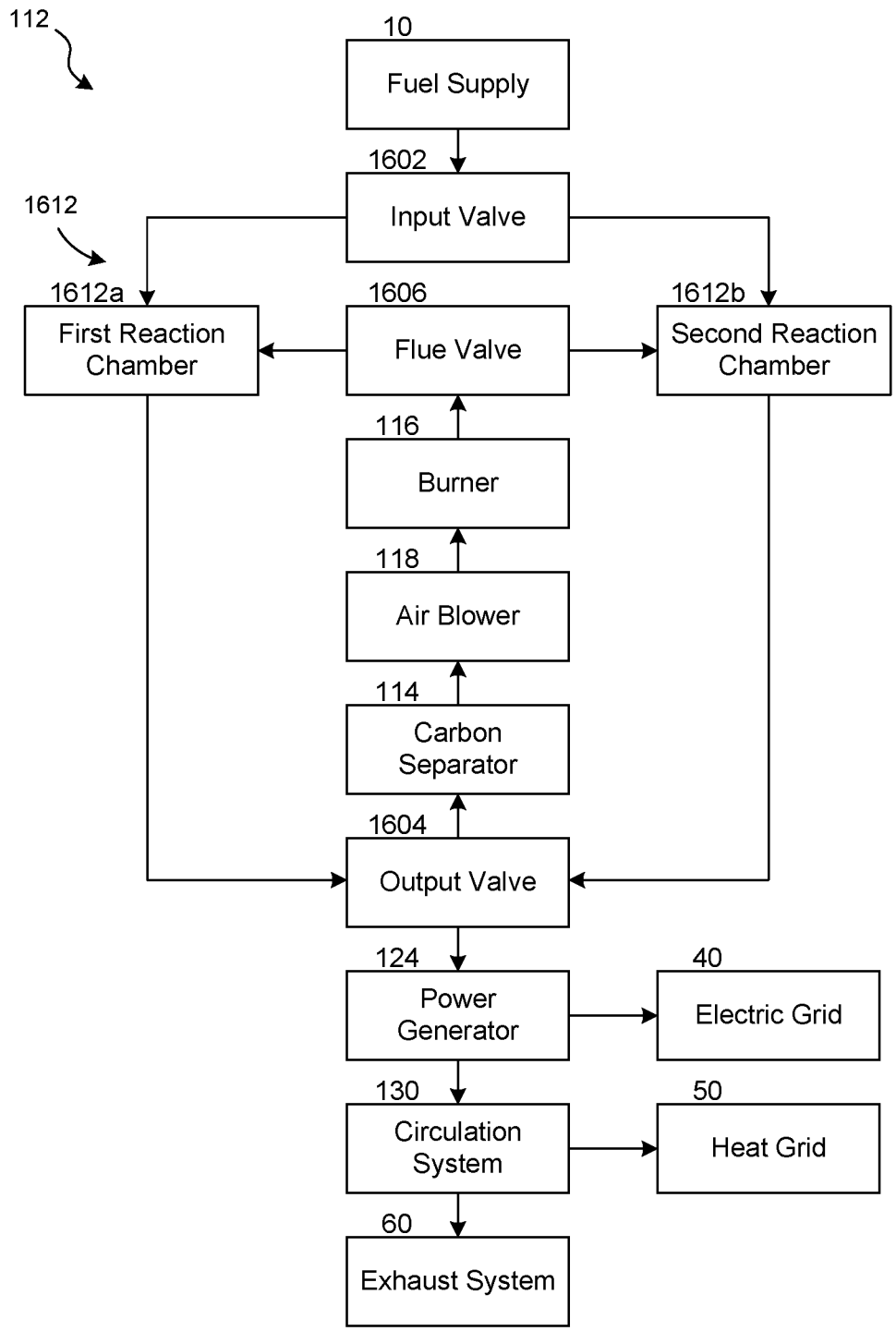
FIG. 16 is a block diagram of another reactor system for producing hydrogen gas in accordance with some embodiments of the present technology.

FIG. 16 is a block diagram of the flow of materials through a regenerative pyrolysis reactor 112 in accordance with further embodiments of the present technology. In the illustrated embodiment, the reactor 112 includes an input valve 1602 operably coupled to the fuel supply 10 (e.g., a residential gas meter connected to a natural gas line), two reaction chambers 1612 (referred to individually as first reaction chamber 1612a and second reaction chamber 1612b) operably coupled to the input valve 1602 and one or more output valves 1604 operably coupled to the reaction chambers 1612. Each of the reaction chambers 1612 can include a heat exchange material and one or more flow paths through the heat exchange material. In various embodiments, the heat exchange material can include cordierite, mullite, alpha alumina, and/or combinations thereof. Further, in some embodiments, each of the reaction chambers 1612 has a unitary and/or monolithic structure defined by the heat exchange material. As a reactant flows through one of the reaction chambers 1612, the heat exchange material heats the reactant above the enthalpy point for the pyrolysis reaction, thereby causing hydrocarbons in the reactant to break down into hydrogen gas and carbon particulates. The hydrogen gas can then be used to generate heat and/or electricity. In some embodiments, for example, the hydrogen gas is burned to preheat and/or maintain the heat of the reaction chambers 1612. In some embodiments, as discussed in more detail below, the reactor 112 operates in a cyclical manor.

For example, during a first time period, the input valve 1602 can direct a reactant into the first reaction chamber 1612a. The first reaction chamber 1612a can cause the pyrolysis reaction, thereby breaking the reactant down into carbon particulate and hydrogen gas. The output valve 1604 can then direct at least a portion of the output from the first reaction chamber 1612a towards the carbon separator 114, the air blower 118, and the burner 116. As described above, the carbon separator 114 can remove the carbon particulates from the flow of hydrogen gas, the air blower 118 can mix the hydrogen gas with oxygen, and the burner 116 can combust the hydrogen with the oxygen. A flue valve 1606 can then direct the resulting hot flue gas into and/or around the second reaction chamber 1612b to heat the second reaction chamber 1612b. In some embodiments, the hot flue gas causes carbon within the second reaction chamber 1612b to combust, further delivering heat to the second reaction chamber 1612b. The output valve 1604 can direct the hot flue gas flowing out of the second reaction chamber 1612b towards the power generator 124 and/or the heating system 130. The power generator 124 can use the hot flue gas to generate and output electricity into the electric grid 40, while the heating system 130 can use the hot flue gas to output heat into the heating grid 50. Any remaining flue gas is then emitted though the exhaust system 60.

During a second time period, the flow can be reversed through the valves 1602, 1604, and 1606 to utilize the heat transferred into the second reaction chamber 1612b to cause the pyrolysis reaction and to reheat the reaction chamber 1612a. That is, the input valve 1602 directs the reactant into the second reaction chamber 1612b, the output valve 1604 directs at least a portion of the hydrogen gas from the second reaction chamber 1612b towards the burner 116, the flue valve 1606 directs the hot flue gas into and/or around the first reaction chamber 1612a, and the output valve 1604 directs the hot flue gas from the first reaction chamber 1612a towards the power generator 124 and/or the heating system 130.

In some embodiments, the reactor 112 cycles the reaction chambers 1612 between an active stage and a preheating stage (e.g., by switching from directing the reactant in to the first reaction chamber 1612a and the second reaction chamber 1612b) after a suitable amount of time. For example, in various embodiments, the reactor 112 can cycle between the reaction chambers 1612 every minute, every two minutes, every ten minutes, every thirty minutes, or after any other suitable period. In some embodiments, the reactor 112 cycles between the reaction chambers 1612 when the temperature in the active reaction chamber (e.g., the reaction chamber causing the pyrolysis reaction) falls below a predetermined point. The predetermined point can be selected to help ensure the reactant sufficiently reacts while in the active reaction chamber. Below the predetermined point, the reactant may not react fast enough within the active reaction chamber and/or may not react at all. In various embodiments, the reactor 112 can cycle between the reaction chambers 1612 when the temperature in the active reaction chamber falls below about 1200° C.

In some embodiments, the inputs and outputs of the reaction chambers 1612 can be connected to the valves 1602, 1604, and 1606 by a piping system and the valves 1602, 1604, and 1606 can be coupled to actuators to toggle the valves 1602, 1604, and 1606 to direct the flow of fluids through the pipes. Accordingly, the reactor 112 can cycle between the reaction chambers 1612 by instructing the valves 1602, 1604, and 1606 to toggle the valves. As a result, the reactor 112 can cycle between the reaction chambers 1612 in a fast, efficient manner, depending on the time it takes the valves. In various embodiments, the reactor 112 can cycle between the reaction chambers 1612 in less than a minute, less than thirty seconds, less than ten seconds, or nearly instantaneously. In some embodiments, each of the valves 1602, 1604, and 1606 can toggle corresponding valves simultaneously. In some embodiments, one or more of the valves 1602, 1604, and 1606 can toggle corresponding valves sequentially. For example, the output valve 1604 can toggle a corresponding valve after all of the hydrogen gas from the active reaction chamber is be directed to the appropriate destination.

In some embodiments, the output valve 1604 directs a portion of the hydrogen gas from the active reaction chamber away from the reactor 112. For example, the hydrogen gas can be directed to the power generator 124 to produce electricity and/or to a hydrogen storage. In some embodiments, the stored hydrogen gas can later be used to heat one or more of the reaction chambers 1612. In some such embodiments, the use of stored hydrogen allows the reactor 112 to cool between periods of high use without requiring another source of energy (e.g., heat and/or electricity) to restart the reactor 112.

In some embodiments, the reactor 112 can include one or more additional components and/or an alternative arrangement of one or more of the components discussed above. In some embodiments, for example, the carbon separator 114 positioned can be between the reaction chambers and the output valve 1604. In some embodiments, the reactor 112 can include multiple output valves 1604, multiple carbon separators 114, and/or multiple burners 116. Further, in some embodiments, one or more of the components of the reactor 112 are combined. For example, the burner 116 can be integrated with the air blower 118 in a single component. In another example, one or more of the valves 1602, 1604, and 1606 can be combined in a single component. In some embodiments, the reactor 112 can include more than two reaction chambers 1612, such as three, four, five, ten and/or any other suitable number of reaction chambers 1612. In some such embodiments, two or more reaction chambers 1612 are active (e.g., used to heat the reactant) during operation of the reactor 112. In some such embodiments, two or more reaction chambers 1612 are preheating during operation during operation of the reactor 112.

Figure 17A:
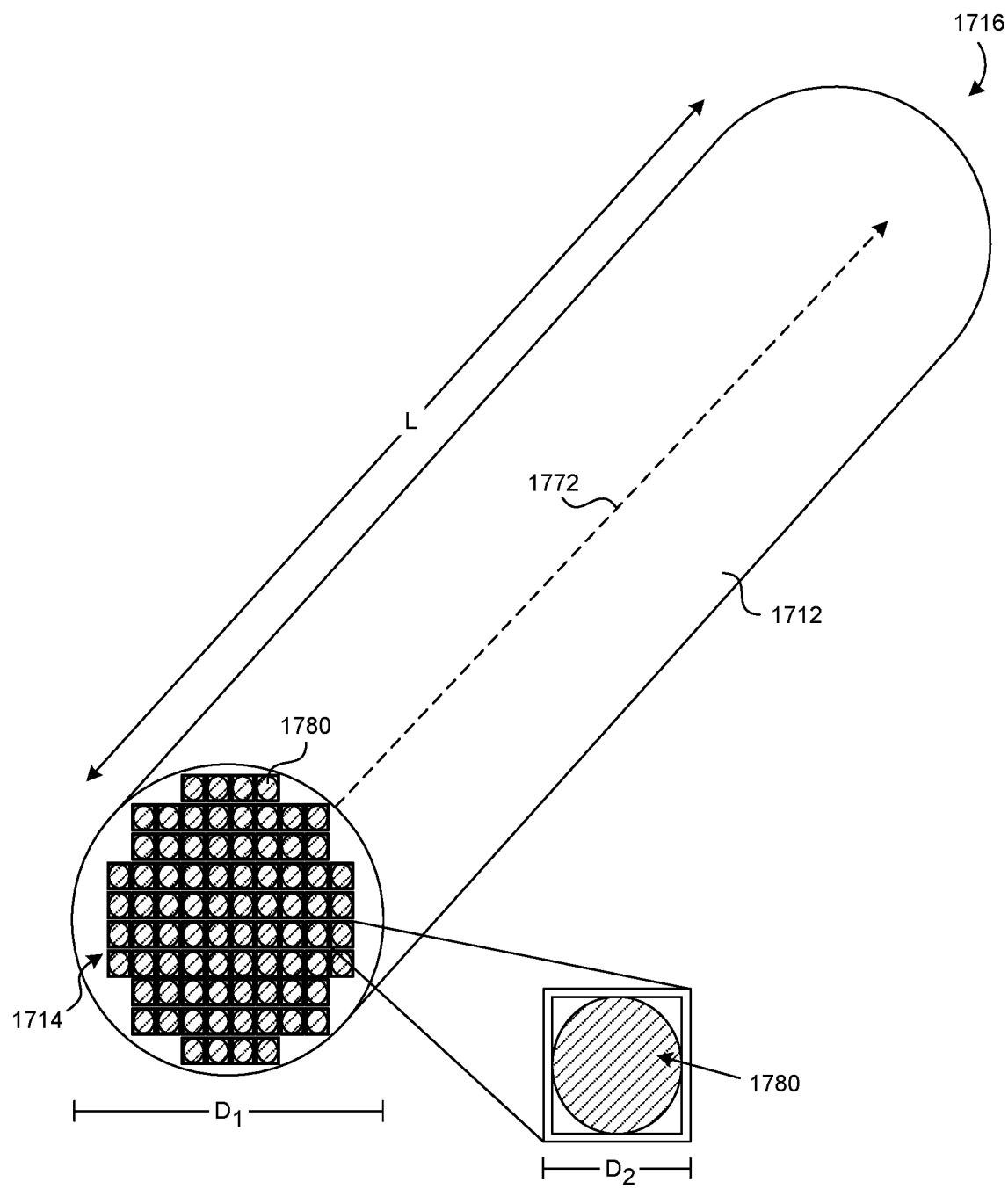
FIG. 17A is a schematic diagram of a reaction chamber for use in the reactor system of FIG. 16 in accordance with some embodiments of the present technology.

FIG. 17A is a partially schematic diagram of a reaction chamber 1712 for use in the reactor 112 of FIG. 16 in accordance with some embodiments of the present technology. In the illustrated embodiment, the reaction chamber 1712 includes multiple flow channels 1780 extending from a first end 1714 of the reaction chamber 1712 to a second end 1716 of the reaction chamber 1712 opposite the first end 1714. Together, the flow channels 1780 define a pathway 1772 through the heat exchange material of the reaction chamber 1712. Accordingly, during operation, the reactant can flow into the flow channels 1780 at the first end 1714, down the pathway 1772, and out of the flow channels 1780 at the second end 1716. The reaction chamber 1712 can transfer heat to the reactant traveling along the pathway 1772, thereby causing the pyrolysis reaction to occur.

In the illustrated embodiment, the reaction chamber 1712 has a circular tube shape. In various other embodiments, the reaction chamber 1712 can have other shapes, such as square, rectangular, hexagonal, and/or other tubular shapes, a coil or other non-axial shape, and/or any other suitable shape. Similarly, in illustrated embodiment, each of the flow channels 1780 has a circular tube shape. In various other embodiments, the flow channels 1780 reaction chamber 1712 can have other shapes, such as square, rectangular, hexagonal, and/or other tubular shapes, coils, and/or any other suitable shape. The reaction chamber 1712 can be produced by various known manufacturing techniques applied to the desired structure. For example, the reaction chamber 1712 can be produced by an additive manufacturing process (e.g., three-dimensional printing), a die process, molding process, an extrusion process, and/or any combination of the manufacturing techniques.

As illustrated in FIG. 17A, the reaction chamber 1712 has with a length L corresponding to the length of the pathway 1772 and a diameter $D_1$. As further illustrated, each of the flow channels 1780 has a diameter $D_2$. The length L, diameter $D_1$, and diameter $D_2$ can each vary based on a desired output capability for the reaction chamber 1712, size requirements for the space the reactor 112 (FIG. 16) will be integrated into, and/or preferred operating conditions for the reaction chamber 1712. Further, the dimensions can be interdependent. For example, the diameter $D_1$ can be set according to the diameter $D_2$ and a desired channel density. In another example, the length L can partly depend on the diameter $D_2$ to help ensure a reactant flowing through the flow channels 1780 reaches the enthalpy point within the reaction chamber 1712. In various example embodiments, the length L of the reaction chamber 1712 can range from about 0.5 meters (m) to about 10 m; the diameter $D_1$ of the reaction chamber 1712 can range from about 0.1 m to about 1 m; the diameter $D_2$ of the flow channels can range from about 0.01 centimeters (cm) to about 1 m; and/or the channel density can range from about 1 channel per square inch (CPI) to about 500 CPI. In one embodiment, for example, the length L of the reaction chamber 1712 is about 1 m, the diameter $D_1$ of the reaction chamber 1712 is about 1.3 cm, the diameter $D_2$ of the flow channels is about 0.635 cm, and the channel density is about 4 CPI.

Additional details on how each of the dimensions can be impacted by operational considerations is set out below. One of skill in the art will understand that the example operational conditions discussed below are examples only, and that the reactor can have various other suitable operational considerations to meet the output demands discussed above. For example, although the reaction chamber 1712 is discussed with reactant input flow rates of 1 standard liter per minute (SLPM) and 5 SLPM are discussed below, the reaction chamber 1712 can have any other suitable reactant input flow rate.

One consideration for the reaction chamber dimensions is the ability of the reaction chamber 1712 to heat the incoming reactant above a desired reaction temperature (e.g., above the enthalpy point or well-above the enthalpy point). For example, for a given heat transfer material, a given temperature of the reaction chamber, and a given Surface to Volume (S/V) ratio for the flow channel 1780 (defined by the diameter $D_2$ of the flow channel 1780), the reaction chamber 1712 transfers the heat to the incoming reactant at a rate R1. At the heat transfer rate R1, a specific induction time (e.g., the time to heat the reactant above the desired temperature) and a residence time (e.g., reaction time) is required to convert the hydrocarbons in the incoming reactant into hydrogen and carbon via the pyrolysis reaction. Accordingly, at the heat transfer rate R1, the reactant can have a total time requirement to reach a desired extent of conversion in the pyrolysis reaction (e.g., a desired percent of hydrocarbons decomposed). In turn, the length L of the reaction chamber 1712 and/or input flow rate of the reactant can be varied to satisfy the total time requirement. Additionally, or alternatively, the S/V ratio can be selected for a set length L to satisfy the total time requirement. In some embodiments, the desired operating temperature can be from about 1200° C. to about 1600° C. In some such embodiments, the residence time required to convert all, or almost all, of the hydrocarbon into hydrogen gas and carbon is on the scale of seconds, including less than one second. In one embodiment, for example, the operating temperature can vary from about 1200° C. to about 1400° C. in a reactor having an inlet flow rate of about 5 SLPM and a diameter $D_2$ of the flow channels of about 1.3 cm, resulting in an induction time of about 0.27 seconds, and a residence time of about 0.38 seconds. For a reaction chamber with a length L of about 1 m, about 90% of the reactant will be converted within the reaction chamber.

Figure 17B:
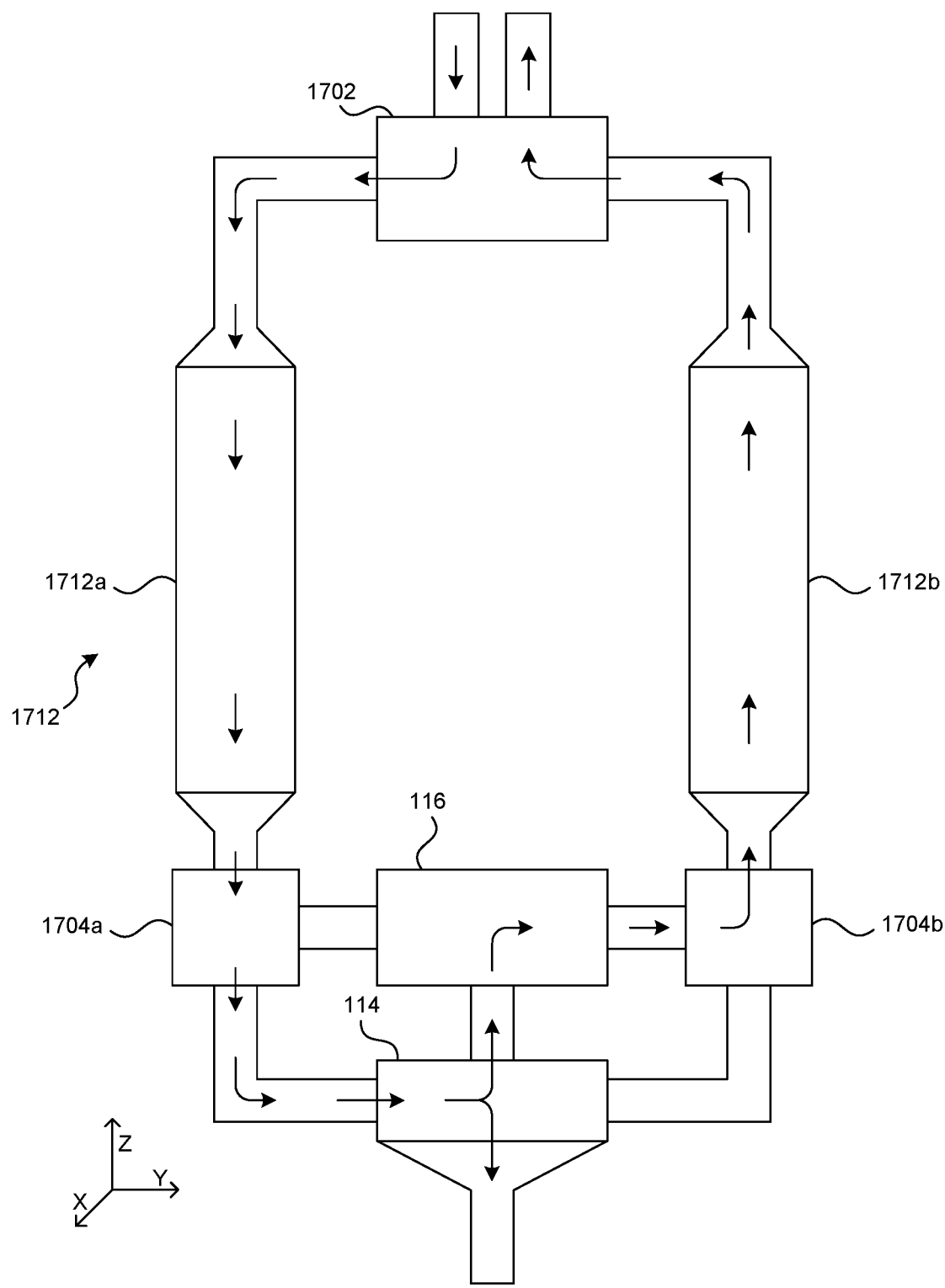
FIG. 17B is a schematic diagram the reactor system of FIG. 16 having multiple reaction chambers in accordance with some embodiments of the present technology.
Figure 18:
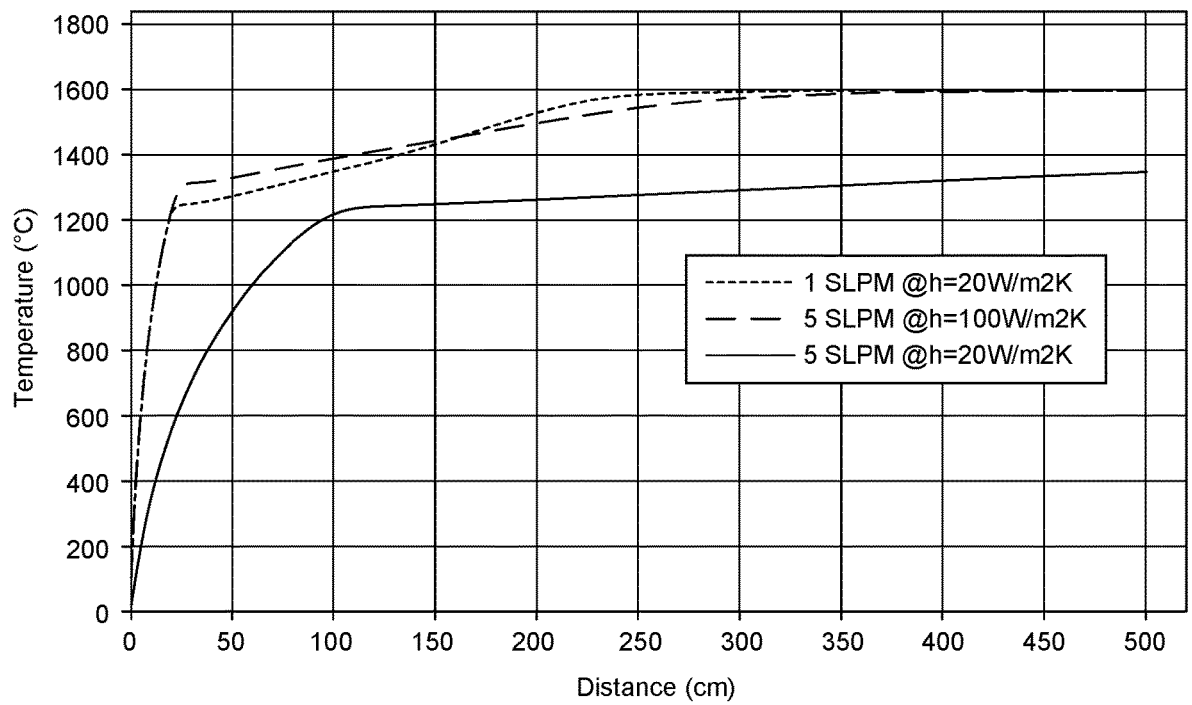
FIG. 18 illustrates a relationship between the length of a reaction chamber and the temperature of the reactant flowing through the reaction chamber for various flow rates in accordance with some embodiments of the present technology.

FIG. 18 illustrates an example of the relationship between the length of the reaction chamber 1712 (FIGS. 17A and 17B) and the temperature of the reactant flowing through the reaction chamber 1712 for various input flow rates and varying heat transfer rates. As illustrated, at a first heat transfer rate of 20 watts per meter-squared-Kelvin (W/m$_2$K) and an input flow rate of the reactant of 1 SLPM, the reactant increases in temperature by 1200° C. over a length L of about 40 cm. In contrast, at the first heat transfer rate and an input flow rate of the reactant of 5 SLPM, the reactant increases in temperature by 1200° C. over a length L of about 100 cm. In further contrast, at the input flow rate of the reactant of 5 SLPM and a second heat transfer rate of 100 W/m$_2$K, the reactant increases in temperature by 1200° C. over a length L of about 40 cm. For various embodiments, the inventors have determined that for an input flow rate of varying from about 1 SLPM to about 5 SLPM, a diameter $D_2$ of the flow channels 1780 ranging from about 0.5 cm to about 5 cm, and a desired operating temperature increase of about 1000° C., the required length L can vary from about 0.05 m to about 1.3 m.

Referring to FIGS. 17A and 17B collectively, in some embodiments, the size of the reaction chamber 1712 can be further reduced by preheating the reactant before it enters the reaction chamber 1712. For example, in some embodiments, the reactant is preheated to a temperature of about 500° C. before the reactant enters the reaction chamber 1712. In some embodiments, the reactant is preheated using the hot outputs flowing out of the active reaction chamber and/or the preheating reaction chamber. For example, an input line for the reactant can include coils that wrap around the output from the active reaction chamber to simultaneously cool the output and preheat the reactant. In another example, as discussed above with respect to FIG. 17B, the input line for the reactant can include coils that wrap around the output from the preheating reaction chamber to simultaneously cool the flue gas and preheat the reactant.

Another consideration for the dimensions of the reaction chamber is the ability of the reaction chamber 1712 to withstand continuous and/or extended operation. One limitation on such operation, is that the heat exchange materials in the reaction chamber 1712 cannot withstand relatively high pressure drops between the flow channels 1780 at high temperatures (e.g., greater than 1000° C.). Accordingly, the dimensions and the predetermined operating conditions of the reaction chamber 1712 can be selected at least in part based on the expected pressure drop across the flow channels 1780 during operation.

For example, the pressure drop across the flow channels 1780 is dependent on the gas or fluid flow of the reactant, the channel diameter $D_2$, and the channel length (e.g., the length L of the reaction chamber 1712). Accordingly, in some embodiments, the diameter $D_2$ of the flow channels 1780 and/or the length L of the reaction chamber 1712 can be selected to account for the pressure drop across the flow channels 1780. For example, the inventors have determined that for a reaction chamber 1712 with a length L of about 5 m, a flow channel diameter $D_2$ of between about 0.5 cm to about 1.5 cm, a reactant input flow rate between about 1 SLPM and about 5 SLPM, and an operational temperature of about 1500° C., the pressure drop is less than about 1 pounds per square inch (psi), which is within an acceptable range.

Further, in some embodiments, carbon material deposited on the surface walls of the flow channel 1780 (also referred to as "fouling") can partially (or fully) clog the flow channels 1780 during operation. The reduction in the flow channel diameter $D_2$ due to fouling can affect the dimensions of the reaction chamber 1712 selected to meet the pressure drop requirements. For example, carbon particulates can be produced in the reaction chamber 1712 as a result of heterogenous and/or homogenous pyrolysis reactions. Heterogenous reactions based on interactions between the reactant and the hot surface or wall of the reaction chamber 1712. In contrast, homogenous reactions occur in the gas phase of the reactant, leading to nucleation and growth of carbon particulates in the gaseous reactant. Carbon particulates produced via homogenous reactions are carried by the gas flow to the second end 1716 of the reaction chamber 1712. Once out of the reaction chamber 1712, the carbon particulates can be collected by a carbon separator, such as a series of cyclones and/or carbon filters. Carbon particulates produced via heterogenous reactions often remain within the flow chamber of the reaction chamber 1712, thereby fouling the flow channels 1780 over time. The ratio of heterogenous reactions and homogenous reactions is affected by the S/V ratio in the flow channels 1780 (determined by the diameter $D_2$ of the flow channels 1780) and the reactant's contact time with the walls of the reaction chamber 1712. Accordingly, in some embodiments, the diameter $D_2$ of the flow channels 1780 is selected to maximize the amount of the pyrolysis reaction that occurs as a homogenous reaction.

Figure 19:
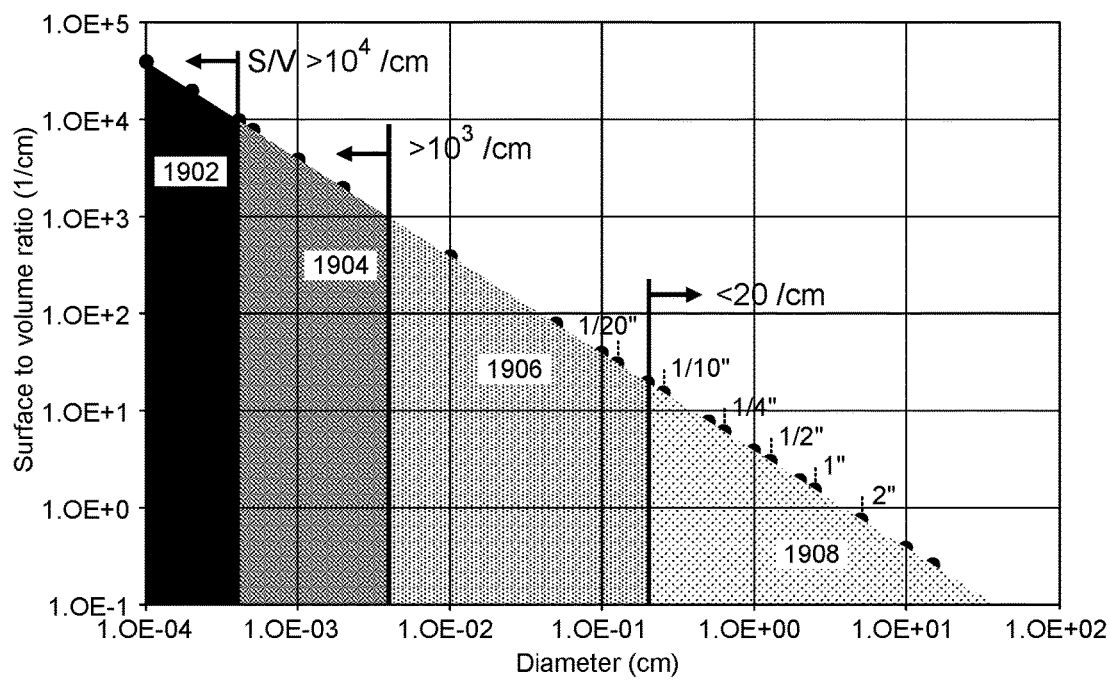
FIG. 19 illustrates an effect of the relationship between the surface to volume ratio and the diameter of a flow chamber on the reaction within a reaction chamber in accordance with some embodiments of the present technology.

FIG. 19 illustrates an effect of the relationship between the S/V ratio and the diameter $D_2$ of a flow channel 1780 on the type of reaction within the reaction chamber 1712 of FIG. 17A for a given input flow rate. In the illustrated relationship, the first region 1902 corresponds to an S/V ratio of between about 10,000/cm and about 1000/cm. In the first region 1902, the pyrolysis reaction is entirely (or almost entirely) a heterogenous reaction. The second region 1904 corresponds to an S/V ratio of between about 1000/cm and about 100/cm. In the second region 1904, the pyrolysis reaction is primarily a heterogenous reactions, with some homogenous reactions beginning to occur. The third region 1906 corresponds to an S/V ratio of between about 100/cm and about 20/cm. In the third region 1906, the pyrolysis reaction is primarily a homogenous reaction, with some remaining heterogenous reactions. The fourth region 1908 corresponds to an S/V ratio of less than about 20/cm. In the fourth region 1908, the pyrolysis reaction is entirely (or almost entirely) a homogenous reaction. Accordingly, in some embodiments, the flow channel diameter $D_2$ can be selected within the fourth region 1908, and therefore have of a diameter $D_2$ about 0.2 cm or above. In such embodiments, fouling can play a minimal role in the pressure drop between flow channels.

Figure 20:
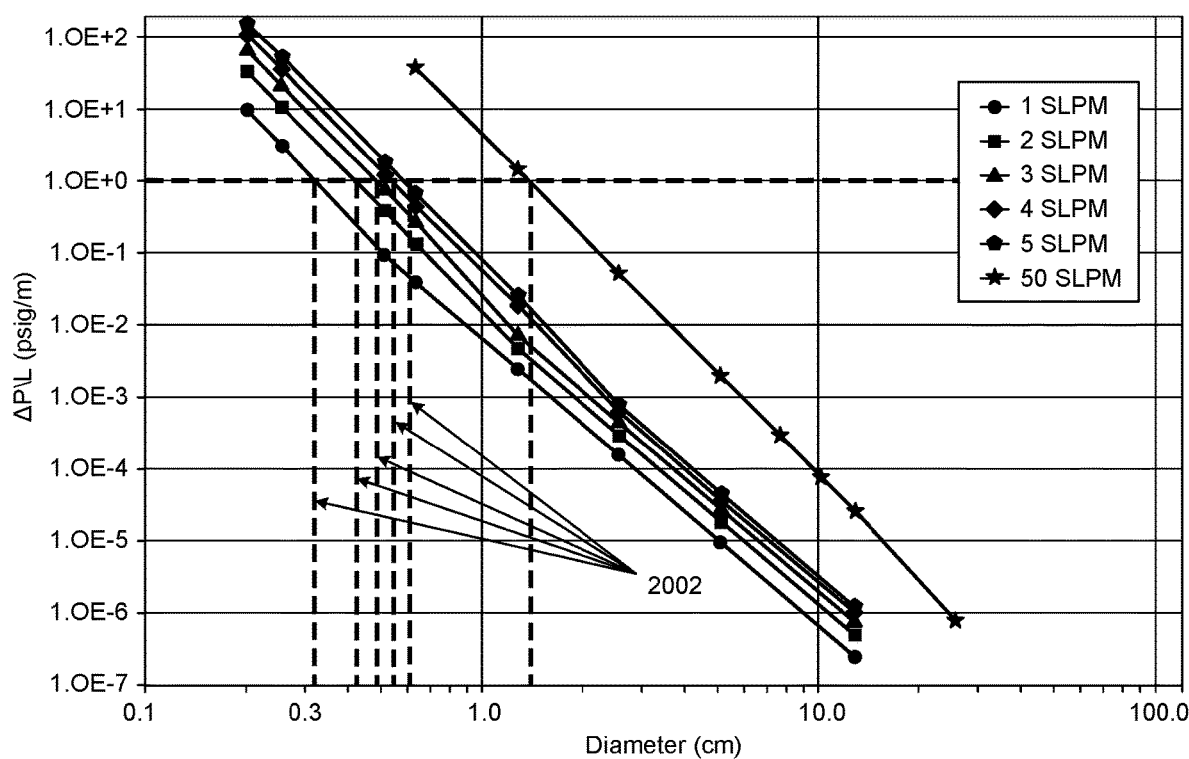
FIG. 20 illustrates representative dimensions for the reaction chamber that satisfy homogenous reaction conditions for a maximum pressure drop across the reactor in accordance with some embodiments of the present technology.

Further, the inventors have determined that the pressure drop for flow channels in the region 1908 all satisfy the pressure drop requirements discussed above (e.g., having less than 1 psig/m pressure drop). For example, FIG. 20 illustrates a relationship between the diameter $D_2$ and the pressure drop across the flow channels for various input flow rates. In FIG. 20, the minimum diameter to remain below 1 psig/m pressure drop indicated by lines 2002. For example, for an input flow rate of 1 SLPM, the minimum diameter indicated by line 2002 is about 0.3 cm. In another example, for an input flow rate of 50 SLPM, the minimum diameter indicated by line 2002 is about 1.1 cm. As indicated by each of the lines 2002, the minimum diameter for each input flow rate is above the 0.2 cm for the region 1908 discussed above with respect to FIG. 19. Accordingly, diameters that satisfy the pressure drop requirements for a 1 psig/m pressure drop will also result in almost entirely homogenous reactions, thereby avoiding pressure drop concerns from fouling.

FIG. 17B is a partially schematic diagram a reactor 112 of the type illustrated in FIG. 16 in accordance with some embodiments of the present technology. For example, in the illustrated embodiment, the reactor 112 includes the input valve 1702, the two reaction chambers 1712 (referred to individually as a first reaction chamber 1712a and a second reaction chamber 1712b), two output valves 1704 (referred to individually as a first output valve 1704a and a second output valve 1704b), the carbon separator 114 and the burner 116. In FIG. 17B, the flow of materials through the reactor 112 is indicated by arrows for a first time period, generally in the same manner discussed above with respect to FIG. 16. However, in the illustrated embodiment, the output valves 1704 have been combined with the flue valve 1606 (FIG. 16) to operate in conjunction. For example, the first output valve 1704a directs the output from the first reaction chamber 1712a into the carbon separator 114 and the burner 116, while the second output valve 1704b directs the flue gas from the burner 116 into the second reaction chamber 1712b. During a second time period, the flow of fluids through the reactor 112 is reversed. During the second time period, the second output valve 1704b directs the output from the second reaction chamber 1712b into the carbon separator 114 and the burner 116, while the first output valve 1704a directs the flue gas from the burner 116 into the first reaction chamber 1612a.

As further illustrated in FIG. 17B, the reaction chambers 1712 of the reactor 112 can be oriented in a vertical direction (e.g., along the z-axis). The vertical orientation can help avoid effects from fouling by utilizing gravity to help carry carbon particulates out of the reaction chambers 1712. The help from gravity to remove the carbon particulates can be important because the carbon particulates can change the effective fluid density and/or velocity, and therefore the fluid's ability to carry carbon out of the reactor even if the carbon is formed entirely by homogenous reactions. The inventors have determined that, for reaction chambers 1712 with a superficial gas velocity from about 1 meter per second (m/s) to about 30 m/s, an operating temperature of about 1400° C., and near 100% pyrolysis for a $CH_4$ molecule, the reaction chambers 1712 will need to be able to remove about 268 grams per cubic meter ($g/m^3$) to avoid any fouling effects. The inventors have also determined that reaction chambers 1712 with a diameter $D_2$ of the flow channels 1708 (FIG. 17A) between about 1 cm to about 5 cm and a vertical orientation, the carbon particulates will stabilize the flow of gas through the reaction chambers 1712 and will be removed from the reaction chambers 1712 by the flow of materials therethrough. Further, it is believed that for the diameter $D_2$ of the flow channels 1708 (FIG. 17A) between about 1 cm to about 5 cm, the carbon will be completely removed from the reaction chambers 1712 even for a horizontal reactant flow and/or a vertically-upward reactant flow. Further, the inventors have determined that for flow channels 1708 having a larger diameter $D_2$, the pressure drop will be lower. Accordingly, for such flow channels 1708, the inventors have determined that larger flow rates are possible while avoiding the pressure drop concern.

As further illustrated in FIG. 17B, the input valve 1702 can act as an output valve for the preheating reaction chamber (e.g., the second reaction chamber 1712b in the illustrated flow) to direct hot flue gases out of the reactor 112. In some embodiments, accordingly, the input valve 1702 can include input coils wrapped around output channels from the reaction chambers 1712 to use heat from the hot flue gas to preheat the reactant flowing into the reactor 112. Further, in some embodiments, the output line from the reactor can be positioned adjacent the input line to the reactor, also allowing the hot flue gases to preheat reactant flowing into the reactor 112.

Figure 21:
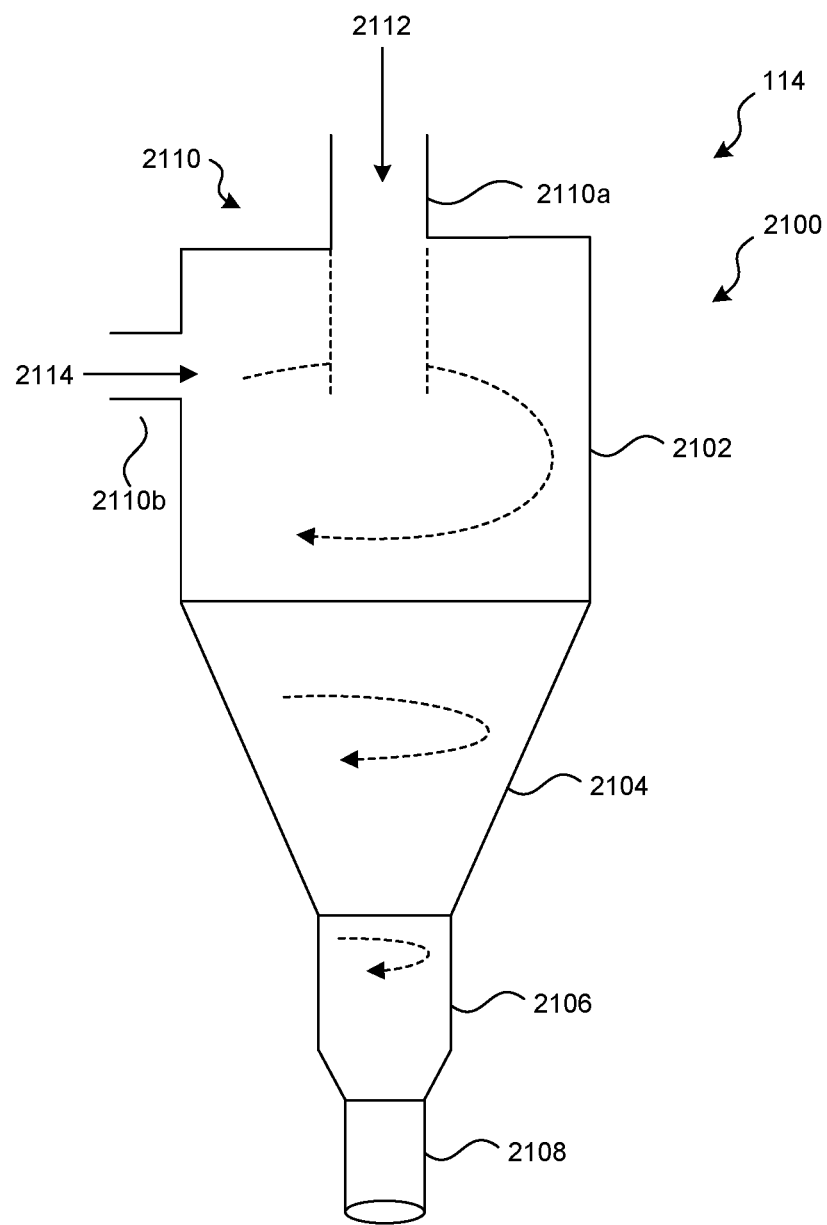
FIG. 21 is a schematic illustration of a cyclone separator for separating carbon from hydrogen gas in accordance with some embodiments of the present technology.

FIG. 21 is a schematic illustration of a cyclone separator 2100 that can be utilized in the carbon separator 114 in accordance with some embodiments of the present technology. As illustrated in FIG. 21, the cyclone separator 2100 includes a main barrel 2102 in fluid communication with inlet tubes 2110 (referred to individually as a first inlet tube 2110a and a second inlet tube 2110b), a cone section 2104 in fluid communication with the main barrel 2102, a collection section 2106 in fluid communication with the cone section 2104, and a dipleg 2108 in fluid communication with the collection section 2106.

The first inlet tube 2110a can be in fluid communication with the outlet from any of the reactors discussed above to receive a mixture that includes carbon particulates and hydrogen gas along a reactor output path 2112. The second inlet tube 2110b can be connected to a catalyst vapor source to receive a catalyst vapor along a catalyst input path 2114. As illustrated in FIG. 21, the catalyst input path 2114 impacts the reactor output path 2112 within the main barrel 2102 to generate a downward moving cyclone within the cyclone separator 2100. In turn, the cyclone imparts a centrifugal force on the mixture of carbon particulates and hydrogen gas flowing therein. Based on the impact from this force and the difference in density between the hydrogen gas and carbon particulates, the mixture separates as it travels through the cyclone separator 2100. The tapered walls of the cone section 2104 maintain the speed of the cyclone and funnel the mixture towards the collection section 2106 and the dipleg 2108. Some, or all, of the carbon particulates are captured in the collection section 2106 and sent to a carbon disposal component 20 (FIG. 1) before the dipleg 2108 routes the resulting hydrogen gas elsewhere. In some embodiments, the cyclone separator 2100 captures carbon particulates with a diameter of about 10 micrometers ($\mu m$) or above. Carbon particulates with a diameter below about 10 $\mu m$ can escape into the output from the cyclone separator 2100. Accordingly, in various embodiments, the carbon separator 114 can include a series of cyclone separators and/or other particulate capturing units, such as a wet scrubbing component, a baghouse filter, and/or an electrostatic precipitator, and/or another suitable component.

For example, the carbon separator 114 can include a baghouse filter operably coupled to the cyclone separator 2100 to capture additional carbon particulates from the mixture. Baghouse filters are a type of fabric filter air-material separator employed for particulate removal from manufacturing and other industrial operations to keep dust and solid particulates from escaping in the open environment. Baghouses utilize fabric filter bags and/or pleated filters arranged in rows and mounted vertically in a sheet metal housing. A dusty gas stream is moved by an air blower and drawn into the baghouse through a duct system. The gases in the stream then pass through the filters, while particles remain on the filter media surface, thus separating the particulates from the gases. Over time, the dust begins to build up and form a filter cake on the filter surface. Accordingly, various cleaning systems can used to remove the dust from the filters and/or the filters can be manually emptied periodically. As applied in the carbon separator 114, the baghouse filter can receive a flow of hydrogen gas and carbon particulates. While the hydrogen gas can pass through the fabric filter, the carbon particulates can be caught by the filter.

Figure 22C:
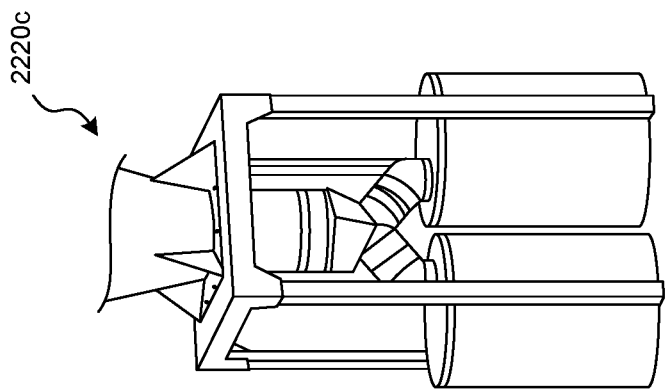
FIGS. 22A-C are partially schematic isometric views of carbon collection systems in accordance with various embodiments of the present technology.
Figure 22B:
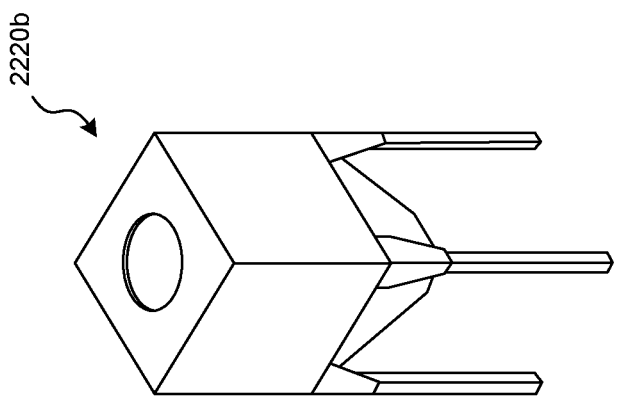
Figure 22A:
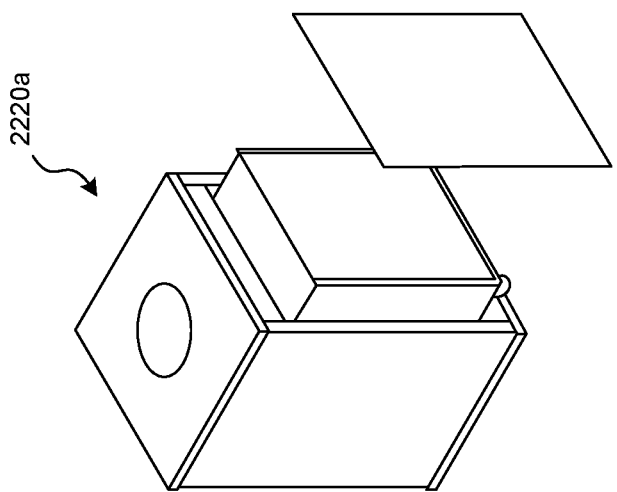

FIGS. 22A-C are partially schematic isometric views of carbon collection systems 2220A-2220C in accordance with various embodiments of the present technology. As illustrated, each of the carbon collection systems 2220A-2220C includes an inlet and a large storage area to collect carbon from the system 100 (FIG. 1). As illustrated in FIG. 22A, the carbon collection system 2220A can include a removable storage bin that can be periodically emptied and/or replaced. As illustrated in FIG. 22B, the carbon collection system 2220B can include a funnel leading to a lower opening that can allow carbon to be removed from the carbon collection system 2220B continuously and/or periodically. For example, a user can empty the carbon collection system 2220B through the opening once every week. As illustrated in FIG. 22C, the carbon collection system 2220C can include disposable storage tanks. For example, a user can periodically remove one (or both) of the storage tanks and replace them with empty storage tanks. The full storage tanks can then be taken elsewhere to be swapped for empty storage tanks and/or disposed.

Figure 24:
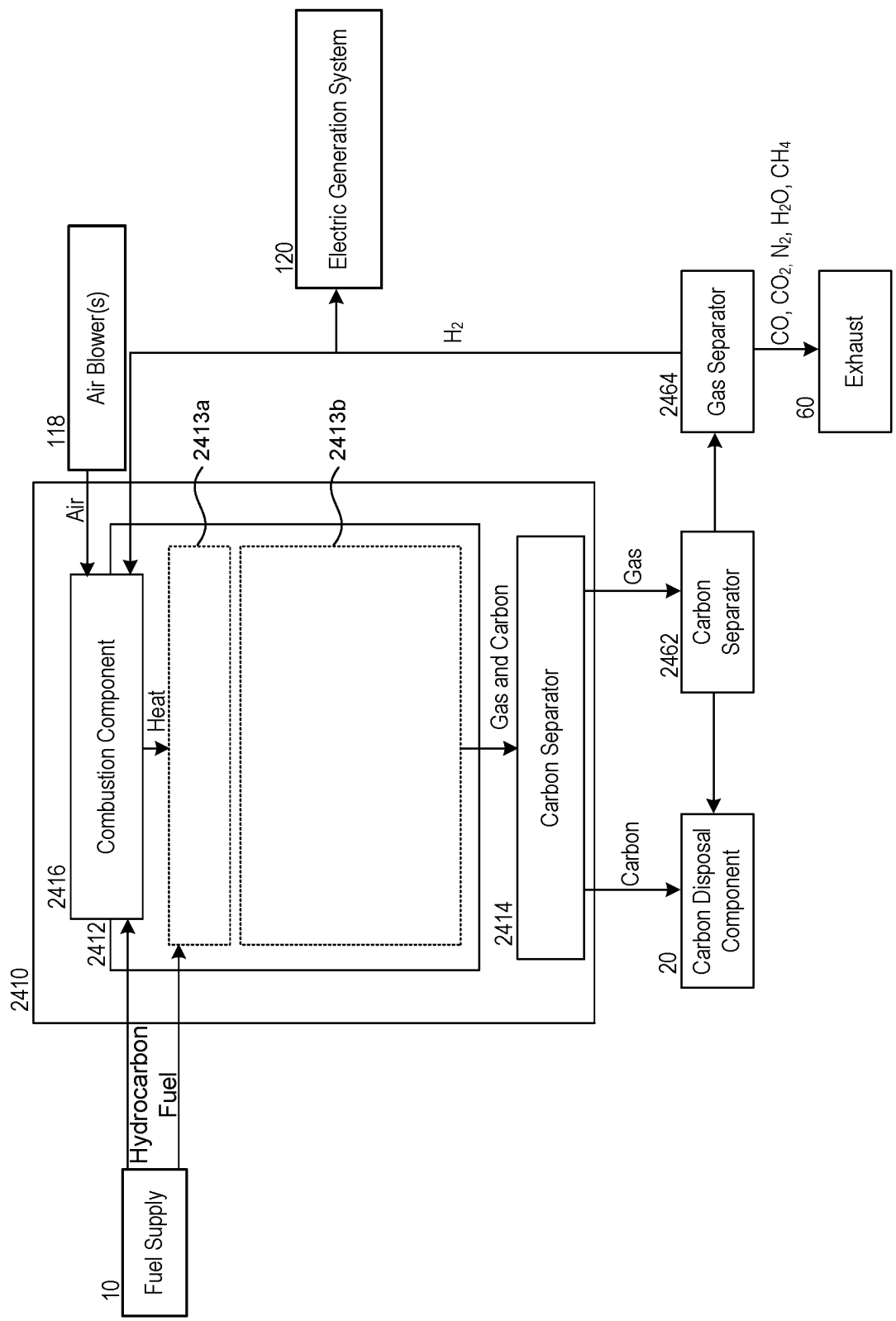
FIG. 24 is a block diagram of an autothermal reactor system for producing hydrogen gas in accordance with some embodiments of the present technology.

FIG. 24 is a block diagram of an autothermal reactor system 2410 for producing hydrogen gas in accordance with further embodiments of the present technology. In the illustrated embodiment, the autothermal reactor system 2410 includes an autothermal reactor 2412 ("autothermal reactor 2412"), a first carbon separator 2414, and a combustion component 2416 that includes one or more burners. The combustion component 2416 is operably coupled to the autothermal reactor 2412 within the autothermal reactor system 2410 to directly heat the autothermal reactor 2412. For example, as discussed in more detail below, the combustion process carried out by the combustion component 2416 can be thermally coupled to a heating region 2413a of the autothermal reactor 2412. In a specific, non-limiting example, the combustion component 2416 is open and/or directly exposed to the heating region 2413a of the autothermal reactor 2412 such that flue gas from the combustion reaction is directed through the reactor 2412 along with the output of the pyrolysis reaction. During operation, a first portion of a hydrocarbon fuel (e.g., natural gas, methane, and other suitable hydrocarbons) can flow into the combustion component 2416 from a fuel supply 10 (e.g., a residential gas meter connected to a natural gas line). The combustion component 2416 combusts the hydrocarbon fuel and direct heat directly into the heating region 2413a of the autothermal reactor 2412. Meanwhile, a second portion of the hydrocarbon fuel from the fuel supply 10 can flow into the heating region 2413a, to be heated up to (or above) the reaction point. The heated hydrocarbon fuel then flows into a precipitation region 2413b (also referred to herein as a "reaction region"). As the heated hydrocarbon flows through the precipitation region 2413b, a pyrolysis reaction occurs to break down the hydrocarbon fuel into solid carbon and hydrogen gas (e.g., the breakdown of methane into hydrogen gas and solid carbon discussed above). The input flow of the hydrocarbon fuel, the heat and gas flow from the combustion reaction in the combustion component 2416, and the weight of the solid carbon that is produced all drive the products of the pyrolysis reaction through the precipitation region 2413b and into the first carbon separator 2414.

The first carbon separator 2414 (also referred to herein as a "primary carbon separator") can include one or more filters that collect the solid carbon product while allowing the product gases to flow out of the autothermal reactor system 2410. In various embodiments discussed in more detail below, the first carbon separator 2414 can include one or more mechanical and/or non-mechanical features for automatically pushing, directing, and/or otherwise moving the solid carbon toward the carbon disposal component 20.

In the illustrated embodiment, the autothermal reactor system 2410 is fluidly coupled to an optional second carbon separator 2462 as well as an optional gas separator 2464. After filtering the product gas through the first carbon separator 2414, the autothermal reactor system 2410 can direct the product gas toward the second carbon separator 2462. In some embodiments, the second carbon separator 2462 is a duplicate of the first carbon separator 2414 (e.g., thereby double-filtering the product gas). In some embodiments, the second carbon separator 2462 includes a different separation method (e.g., a bag house filter followed by a fine-mesh filter). As illustrated in FIG. 24, the second carbon separator 2462 can then direct any solid carbon collected at the second carbon separator 2462 to the carbon disposal component 20.

Further, after filtering the product gas, the second carbon separator 2462 (or, more generally, the autothermal reactor system 2410 in embodiments that omit the second carbon separator 2462) can direct the product gas toward the gas separator 2464. The gas separator 2464 can remove one or more gases from the product gas stream and/or can fully isolate the $H_2$ from the product gas to help improve the quality of the gases delivered elsewhere in the system 100 (FIG. 1). For example, as discussed in more detail below, the autothermal reactor system 2410 can introduce one or more compounds that cause secondary reactions within the autothermal reactor 2412. The gas separator 2464 can then remove at least a portion of the products from the secondary reactions.

In the illustrated embodiment, the combustion component 2416 is coupled to one or more air blowers 118 that supply oxygen to combust with the hydrocarbon fuel. In a specific, non-limiting example, the combustion reaction can be in the form of:

$$CH_4(gas) + 2O_2(gas) \rightarrow CO_2(gas) + 2H_2O(gas) + heat.$$

Since the combustion component 2416 is directly coupled and/or exposed to the heating region 2413a of the autothermal reactor 2412, the combustion component 2416 introduces $CO_2$ and $H_2O$ gas into the autothermal reactor 2412. Further, while the autothermal reactor system 2410 can be configured to combust the hydrocarbon fuel at approximately a stoichiometric ratio (e.g., within about 30 percent, or within about 10 percent of the stoichiometric ratio), some $O_2$ gas will be introduced into the autothermal reactor 2412. Each of the $CO_2$, $H_2O$, and $O_2$ gases are then present in the product gas stream and/or can react with the hydrocarbon fuel in the heating region 2413a and/or the precipitation region 2416 before the pyrolysis reaction occurs to create various byproducts and/or to further generate hydrogen gas. Purely by way of example, the $CO_2$ gas can react with methane according to:

$$CH_4 + CO_2 \rightarrow 2CO + 2H_2,$$

the $H_2O$ gas can react with methane according to:

$$CH_4 + H_2O \rightarrow CO + 3H_2,$$

while the $O_2$ can combust with methane according to the reaction described above. As a result, the product gas can include a mixture of $H_2$, $CO$, $CO_2$, and/or $H_2O$ gases in addition to non-reacted and/or non-combusted $CH_4$. Further, in some embodiments, the air blowers 118 are configured to direct ambient air into the combustion component 2416 (e.g., as opposed to pure oxygen), resulting in the introduction of N2 gas, among other gases, into the autothermal reactor 2412.

The gas separator 2464 can extract at least a portion of the non-$H_2$ gases from the product gases. Once the separation process is complete, the gas separator 2464 can direct the filtered product gases (with a higher concentration of $H_2$) toward the combustion component 2416 to supplement and/or replace the hydrocarbon fuel and/or direct the filtered product gases toward the electric generation system 120 to generate power. The gas separator 2464 can direct the filtered byproducts toward the exhaust 60 and/or a collection system (not shown). In various embodiments, for example, the hydrogen gas can make up between 1 percent and 5 percent of the product gas before the gas separator 2464. In various such embodiments, the hydrogen gas can be between about 20 percent and about 100 percent, between about 25 percent and about 50 percent, or about 30 percent of the product gas after the gas separator 2464.

In various embodiments, the combustion component 2416 and/or the air blowers 118 can control the amount of oxygen that is available during the combustion reaction. For example, the combustion component 2416 and/or the air blowers 118 can provide oxygen at approximately the stoichiometric ratio for the combustion to reduce (or minimize) the amount of $O_2$ gas that is introduced into the autothermal reactor 2412. Reducing the amount of $O_2$ gas that is introduced into the autothermal reactor 2412 can help increase (or maximize) the amount of the hydrocarbon that is converted by the pyrolysis reaction within the autothermal reactor 2412, as opposed to further combustion with the oxygen. To help control the oxygen levels, the combustion component 2416 and/or the air blowers 118 can include a flow meter and/or an oxygen meter that measures the amount of oxygen being supplied to the combustion component. If the amount of oxygen departs from the amount necessary for the stoichiometric ratio, the combustion component 2416 and/or the air blowers 118 can adjust operation accordingly (e.g., increase the amount of oxygen being introduced and/or decrease the amount of oxygen being introduced).

Additional details of a specific example of the autothermal reactor system 2410 and various embodiments of the first carbon separator 2414 are discussed below with reference to FIGS. 25-30. In FIGS. 25-30, the autothermal reactor system 2410 uses methane as both an input to the combustion component 2416 and an input combustion fuel for the pyrolysis reaction, in accordance with some embodiments of the present technology. However, it will be understood that, in other embodiments, another combustion fuel can be combusted by the combustion component 2416 (e.g., a hydrogen gas), and/or the reactant can be any other suitable hydrocarbon fuel. Further, although the combustion component 2416 is illustrated as receiving air to combust with the input methane, it will be understood that the combustion component 2416 can be coupled to an alternative source of oxygen, such as an oxygen tank.

Figure 25:
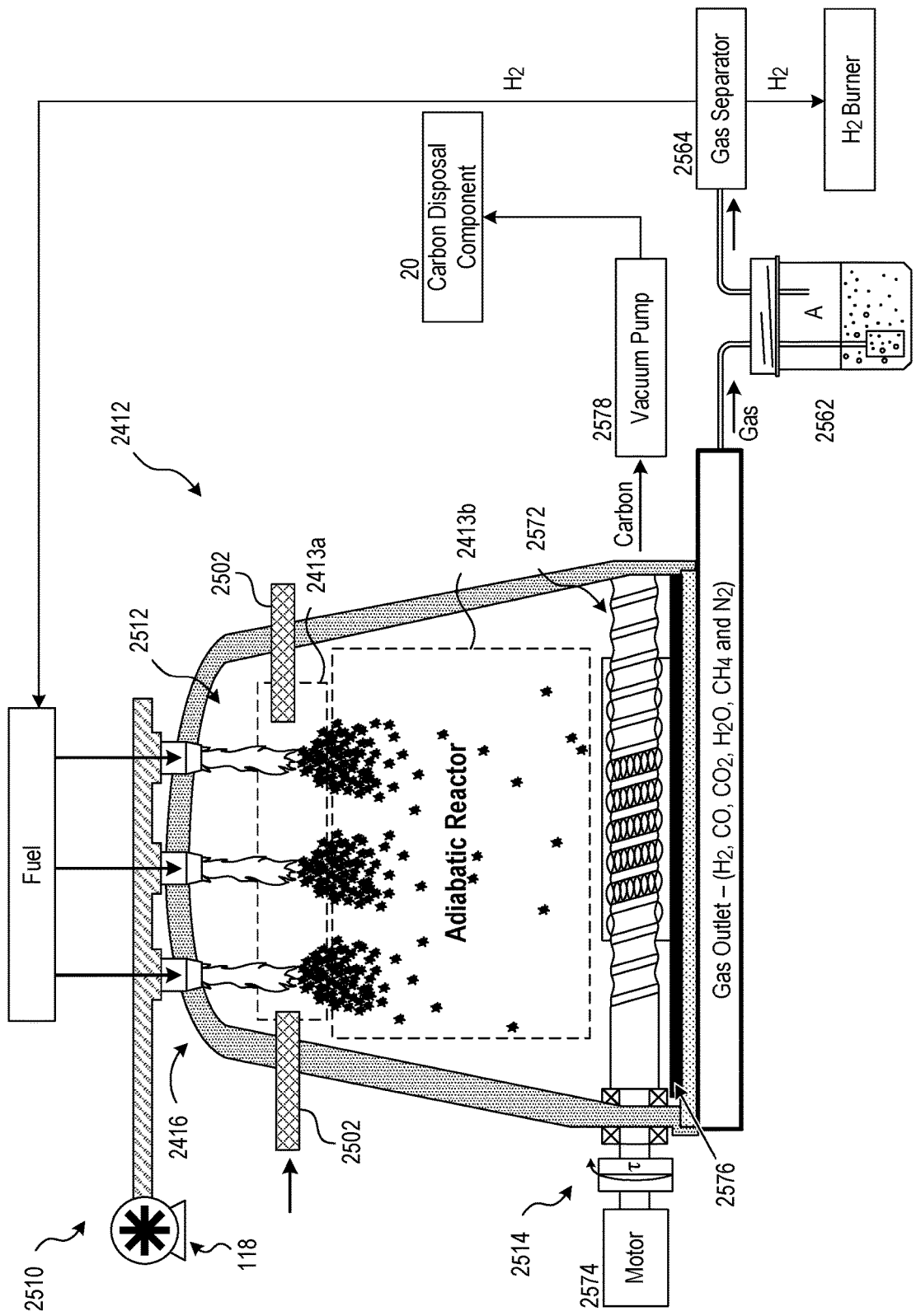
FIG. 25 is a partially schematic illustration of an autothermal reactor system with various features for filtering the product gas in accordance with representative embodiments of the present technology.

FIG. 25 is a partially schematic illustration of an autothermal reactor system 2510 having various components for filtering the product gas in accordance with some embodiments of the present technology. As illustrated in FIG. 25, the autothermal reactor system 2510 is generally similar to the autothermal reactor system 2410 discussed above with respect to FIG. 24. For example, the autothermal reactor system 2510 includes the autothermal reactor 2412, a carbon removal system 2514, and the combustion component 2416 that includes one or more burners (three shown).

In the illustrated embodiment, the autothermal reactor 2412 includes a reaction chamber 2512 that includes the heating region 2413a and the precipitation region 2413b. There is no barrier between the heating region 2413a and the precipitation region 2413b, thereby allowing an incoming reactant to flow freely through the heating region 2413a and directly into the precipitation region 2413b. Additionally, the lack of a barrier between the heating region 2413a and the precipitation region 2413b allows unabsorbed heat to flow into the precipitation region to continue to heat the reactant and/or heat the ambient environment (e.g., via heat carried by the flue gases from the combustion reaction). Further, in the illustrated embodiment, the reaction chamber 2512 has a columnar and/or conical shape that can help facilitate the flow of the reactant and/or flue gases from the combustion component 2416 through the reaction chamber 2512. However, it will be understood that the reaction chamber 2512 can have various other shapes, for example to aid in retrofitting the reaction chamber into an existing appliance footprint and/or an available space in a home. In the illustrated embodiment, the combustion component 2416 is coupled to a top end of the reaction chamber 2512 of the autothermal reactor 2412 and is positioned to direct heat from a combustion reaction into the heating region 2413a while the carbon removal system 2514 is coupled to a bottom end of the autothermal reactor 2412 and positioned to receive the output from the pyrolysis reaction from the precipitation region 2413b. The combustion component 2416 receives a combustion fuel (e.g., methane and/or $H_2$ gas in the illustrated embodiment) from various fuel sources, along with oxygen from the air blower 118. The combustion component 2416 then combusts the combustion fuel with the oxygen. In the illustrated embodiment, the combustion component 2416 is positioned to direct the flame from the combustion reaction into the heating region 2413a of the autothermal reactor 2412.

The autothermal reactor 2412 receives a hydrocarbon fuel from the fuel supply 10 of FIG. 1 (e.g., natural gas and/or methane received from a residential gas meter connected to a natural gas line) and directs the hydrocarbon fuel along input lines 2502 through and/or adjacent the flame (or adjacent) from combustion in the combustion component 2416. By directing the hydrocarbon fuel directly through the flame, the autothermal reactor 2412 can increase (or maximize) the heat from the combustion reaction that is transferred into the hydrocarbon fuel, ensuring that the hydrocarbon fuel is heated above the reaction temperature (e.g., above the enthalpy point for methane pyrolysis discussed above). Further, because the combustion component 2416 and/or the air blowers 118 control the amount of oxygen available during the combustion reaction, most (or all) of the oxygen from the air blower 118 is consumed in the combustion reaction. As a result, the hydrocarbon fuel that is directed directly through (or adjacent) the flame in the autothermal reactor 2412 does not itself combust as the temperature increases. Instead, the hydrocarbon fuel is heated above the reaction temperature by the combustion reaction and directed (e.g., by a continuing input gas flow and/or the combustion reaction) toward the precipitation region 2413b and the bottom of the autothermal reactor 2412. While traveling through the precipitation region 2413b, the heated hydrocarbon fuel decomposes into hydrogen gas and solid carbon particles. The hydrocarbon and/or resulting hydrogen gas can also undergo one or more secondary reactions (e.g., any of the reactions discussed above with reference to FIG. 24). The carbon particles and the product gas (e.g., the hydrogen gas and/or any other byproduct gases) then impinge on, flow through, or otherwise contact the carbon removal system 2514 at the bottom of the autothermal reactor 2412.

In the illustrated embodiment, the carbon removal system 2514 has a rotary kiln type construction that includes a rotating body 2572 (e.g., an auger), a drive motor 2574 operably coupled to the rotating body 2572, a filter 2576 beneath the rotating body 2572, and an air mover (illustrated as a vacuum pump 2578). The reaction products from the autothermal reactor 2412 (e.g., the solid carbon and product gases) contact the rotating body 2572 and the filter 2576. The filter 2576 allows the product gases (e.g., $H_2$, CO, $CO_2$, $H_2O$, $N_2$, and/or non-reacted $CH_4$) to pass through while blocking the solid carbon. The solid carbon then collects around and is driven toward vacuum pump 2578 by the rotating body 2572. For example, as illustrated in FIG. 25, the rotating body 2572 can have a screw-type shape. As the drive motor 2574 rotates the rotating body 2572, the ridges of the rotating body 2572 push the solid carbon toward the vacuum pump 2578. The vacuum pump 2578 then pulls the solid carbon out of the autothermal reactor system 2510 and directs the carbon toward the carbon disposal component 20. In some embodiments, the filter 2576 can be operably coupled to a vibrating component to help avoid carbon from adhering or collecting on a surface of the filter 2576, thereby reducing the frequency of needed maintenance.

In the illustrated embodiment, the autothermal reactor system 2510 is fluidly coupled to a liquid column 2562 (e.g., a secondary carbon separator) and a gas separator 2564. The liquid column 2562 receives the product gas from the autothermal reactor system 2510 and passes the product gas through liquid. In the liquid column 2562, the product gases rise out of the liquid while the carbon particles remain, thereby removing fine carbon particles that were not captured by the filter 2576. In some embodiments, the liquid column 2562 is fluidly coupled to a cycling fluid source and/or a fluid filter to continuously cycle and/or clean the fluid in the liquid column 2562, allowing for continuous use with minimal maintenance. In some embodiments, the liquid column 2562 requires a user to maintain the column periodically (e.g., swap and/or clean the fluid in the liquid column 2562). As illustrated in FIG. 25, the liquid column directs the filtered product gas toward the gas separator 2564.

The gas separator 2564 receives the product gas and removes at least a portion (or all) of the non-hydrogen gases from the product gas. Purely by way of example, the gas separator 2564 can include a polymer membrane that prevents gases other than a desired gas from passing through. That is, an aromatic polyimide can be selected to prevent gases other than hydrogen gas from permeating through the membrane. The hydrogen gas will then pass through while the CO, $CO_2$, $H_2O$, $N_2$, and/or non-reacted $CH_4$ are retained. As a result, the gas separator 2564 can remove at least a portion (or all) of the non-hydrogen gases from the product gas. The gas separator 2564 can then direct the filtered product gas back to the combustion component 2416, to an $H_2$ burner in the electric generation system 120 (FIGS. 1 and 24), and/or to a hydrogen storage component. The gas separator 2564 can direct the gases filtered out pf the product gas to an exhaust 60 (FIG. 24) and/or a storage component for safe disposal.

FIGS. 26-30 are partially schematic illustrations of autothermal reactor systems having various carbon removal systems in accordance with further embodiments of the present technology. In the illustrated embodiments, each of the autothermal reaction systems is generally similar to the autothermal reactor system 2510 discussed above with reference to FIG. 25. For example, each of the illustrated embodiments includes an autothermal reactor 2412, a combustion component 2416 with one or more burners, and a carbon separator. Accordingly, many of the details discussed above with respect to FIG. 25 are omitted from the discussion below to avoid repetition. Instead, the discussion of each of these embodiments is focused on the features of the illustrated carbon removal systems. Further, several of the additional components (e.g., the secondary carbon filter and/or the gas separator) that can be coupled to the autothermal reactor system 2510 are omitted from the discussion below. However, one of skill in the art will understand that any of these features can also be used in conjunction with the embodiments illustrated in FIGS. 26-30.

Figure 26:
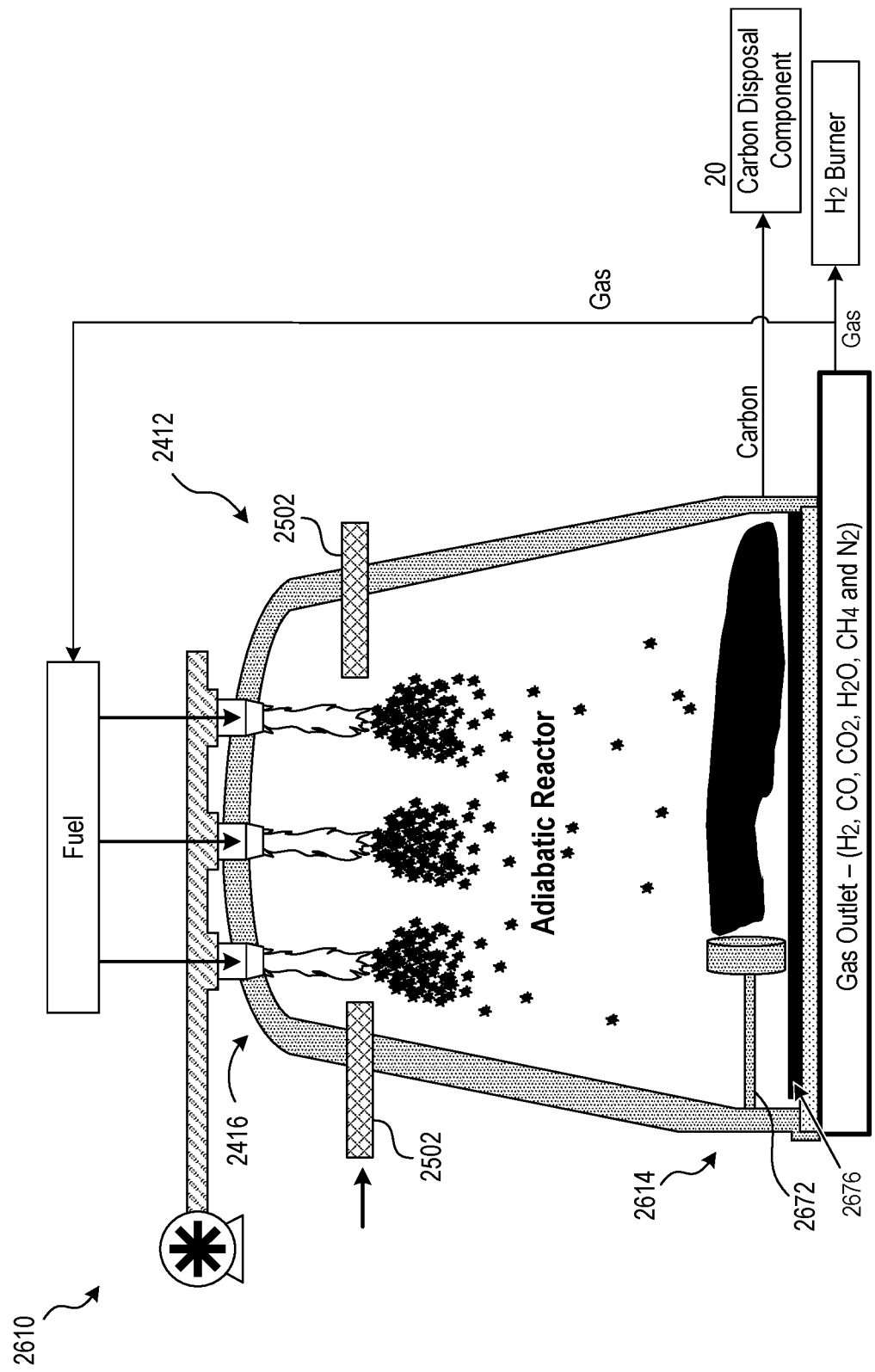
FIGS. 26-29 are partially schematic illustrations of autothermal reactor systems with various mechanical carbon removal systems in accordance with further embodiments of the present technology.

FIG. 26 is a partially schematic illustration of an autothermal reactor system 2610 having a mechanical carbon removal system 2614 in accordance with some embodiments of the present technology. In the illustrated embodiment, the carbon removal system 2614 includes an actuatable pushing component 2672 (e.g., a plunger, bar, push-rod, piston, and/or the like) that is positioned above a surface of a filter 2676. The filter 2676 allows the product gas from the autothermal reactor 2412 to pass through while collecting the solid carbon. The pushing component 2672 then physically directs the collected carbon toward an exit in the autothermal reactor system 2610 and toward the carbon disposal component 20.

In some embodiments, the pushing component 2672 operates continuously to reduce (or prevent) carbon from building up at the bottom of the autothermal reactor 2412. In some embodiments, the pushing component 2672 operates periodically to clear the collected carbon while reducing the energy necessary to operate the autothermal reactor system 2610. In some embodiments, the autothermal reactor system 2610 includes one or more sensors (e.g., weight sensors, flow sensors, and/or the like; not shown) that can allow the autothermal reactor system 2610 (or a controller connected thereto) to monitor the amount of collected carbon and determine when to actuate the pushing component 2672. Purely by way of example, the pushing component 2672 can be actuated when a predetermined weight of carbon is collected and/or when the collected carbon begins to reduce the flow rate through the filter 2676.

Figure 27:
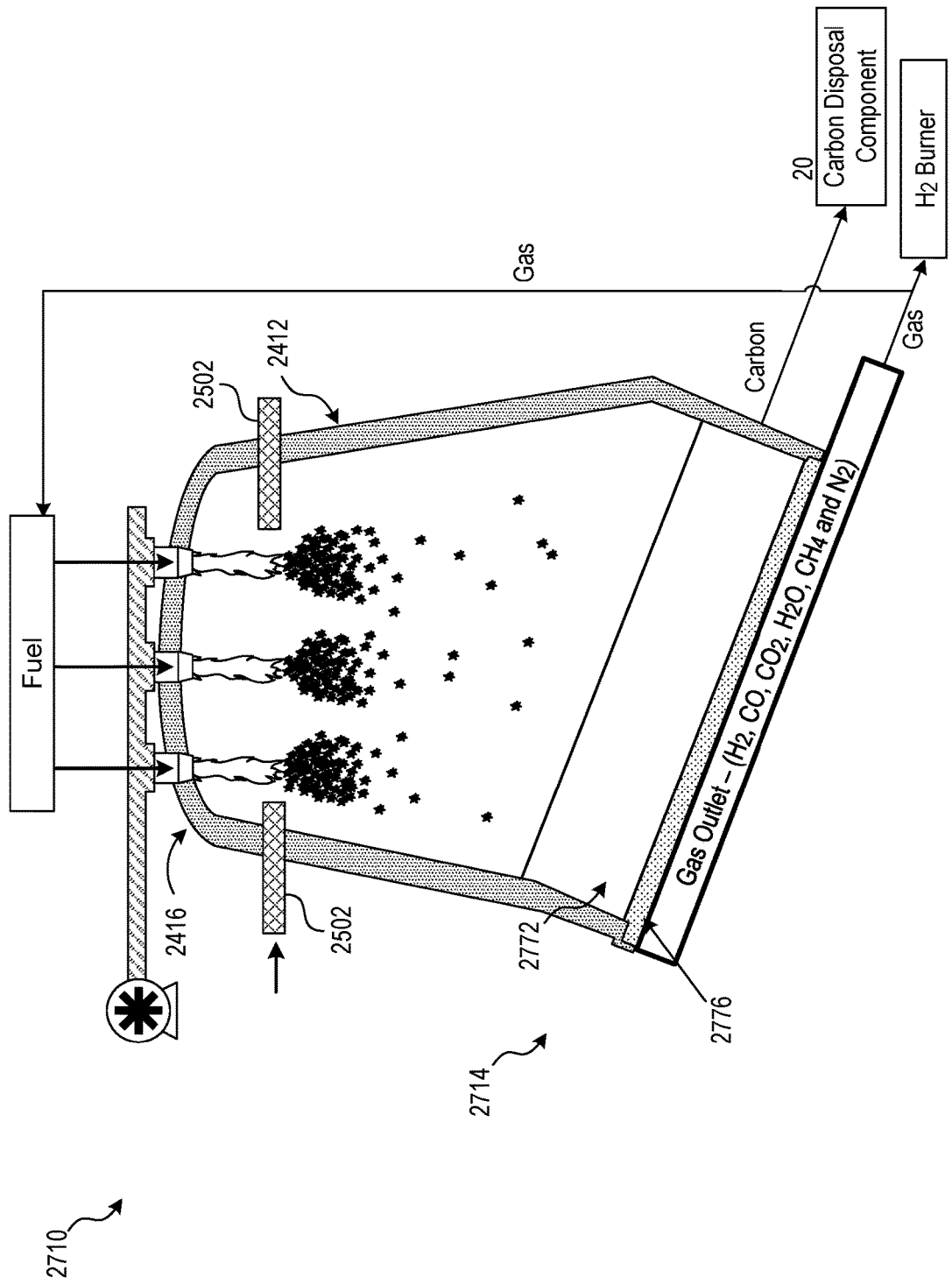

FIG. 27 is a partially schematic illustration of an autothermal reactor system 2710 configured in accordance with further embodiments of the present technology. In the illustrated embodiment, the autothermal reactor 2412 has a sloped lower surface and a carbon removal system 2714 positioned over the sloped lower surface. The carbon removal system 2714 includes a mechanical removal system 2772 and a filter 2776 beneath the mechanical removal system 2772. As illustrated in FIG. 27, the sloped lower surface takes advantage of gravity to passively direct the solid carbon collected by the filter toward the carbon disposal component 20. The mechanical removal system 2772 can include a rotary kiln, a ball mill, a rotary kiln with a ball mill, a conveyor belt system, a pushing component, a screw-type extruder, and/or any other suitable mechanical removal system. By utilizing the sloped lower surface of the autothermal reactor 2412 and gravity, the carbon removal system 2714 can reduce the energy needed to remove carbon from the autothermal reactor system 2710 and help avoid carbon build-up within the carbon removal system 2714.

Figure 28:
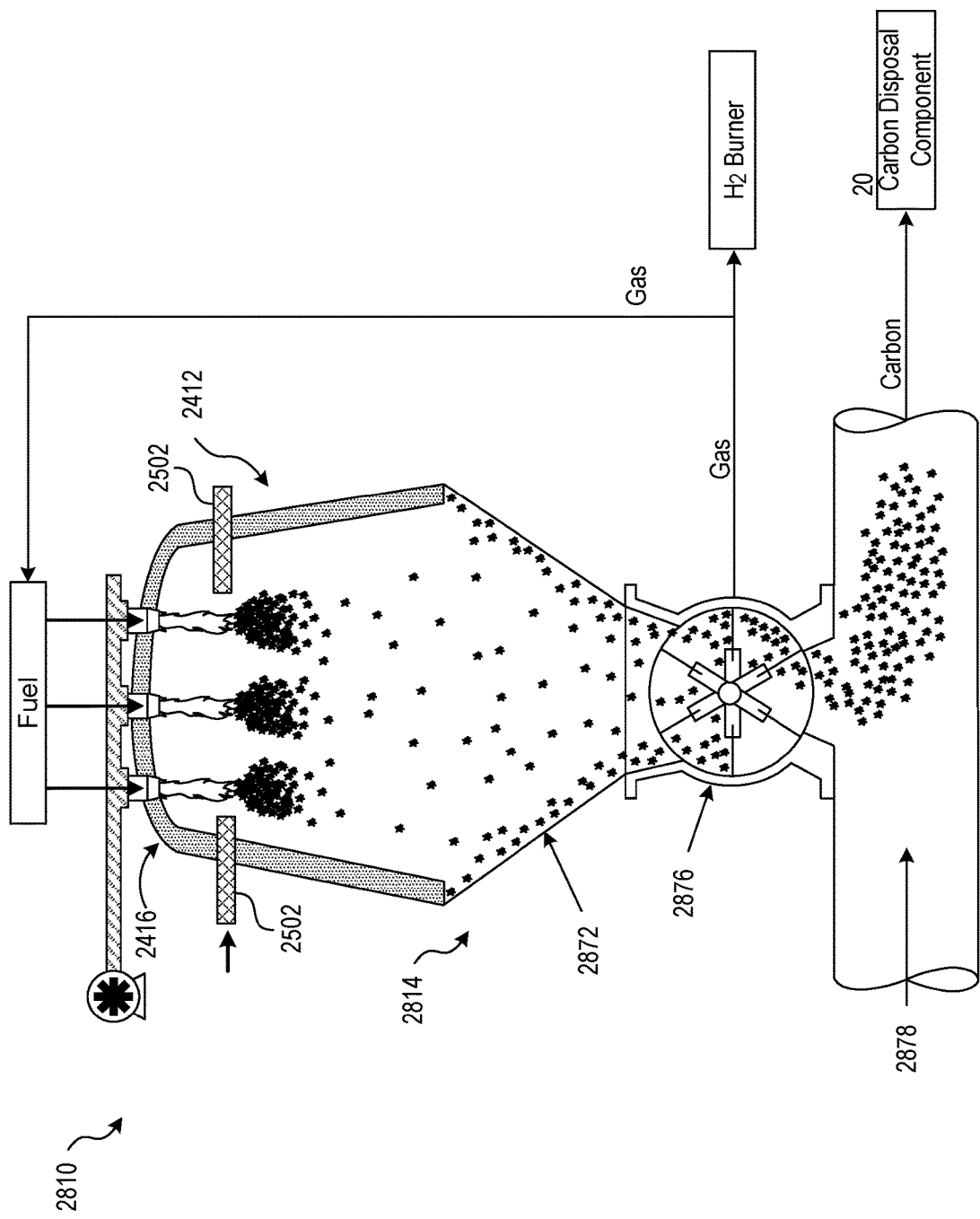

FIG. 28 is a partially schematic illustration of an autothermal reactor system 2810 having a mechanical carbon removal system 2814 configured in accordance with further embodiments of the present technology. In the illustrated embodiment, the carbon removal system 2814 includes a lock hopper that operates similarly to a baghouse filter to remove solid carbon from the product gas stream. Accordingly, a hopper 2872 funnels the carbon and the product gas toward a rotatable air lock 2876. The rotatable air lock 2876 separates the product gas from the carbon. While the product gas is then directed out of the autothermal reactor system 2810, the rotatable air lock 2876 drops the carbon into fluid passageway 2878 (e.g., an airflow passageway) that uses a pneumatic flow to carry the carbon out of the autothermal reactor system 2810 and toward the carbon disposal component 20. While the mechanical carbon removal system 2814 can impose more demands on energy that a few of the other carbon removal systems discussed herein, the mechanical carbon removal system 2814 can effectively separate the carbon and product gas and/or readily deliver the separated carbon to the carbon disposal component 20 with low amounts of required maintenance.

Figure 29:
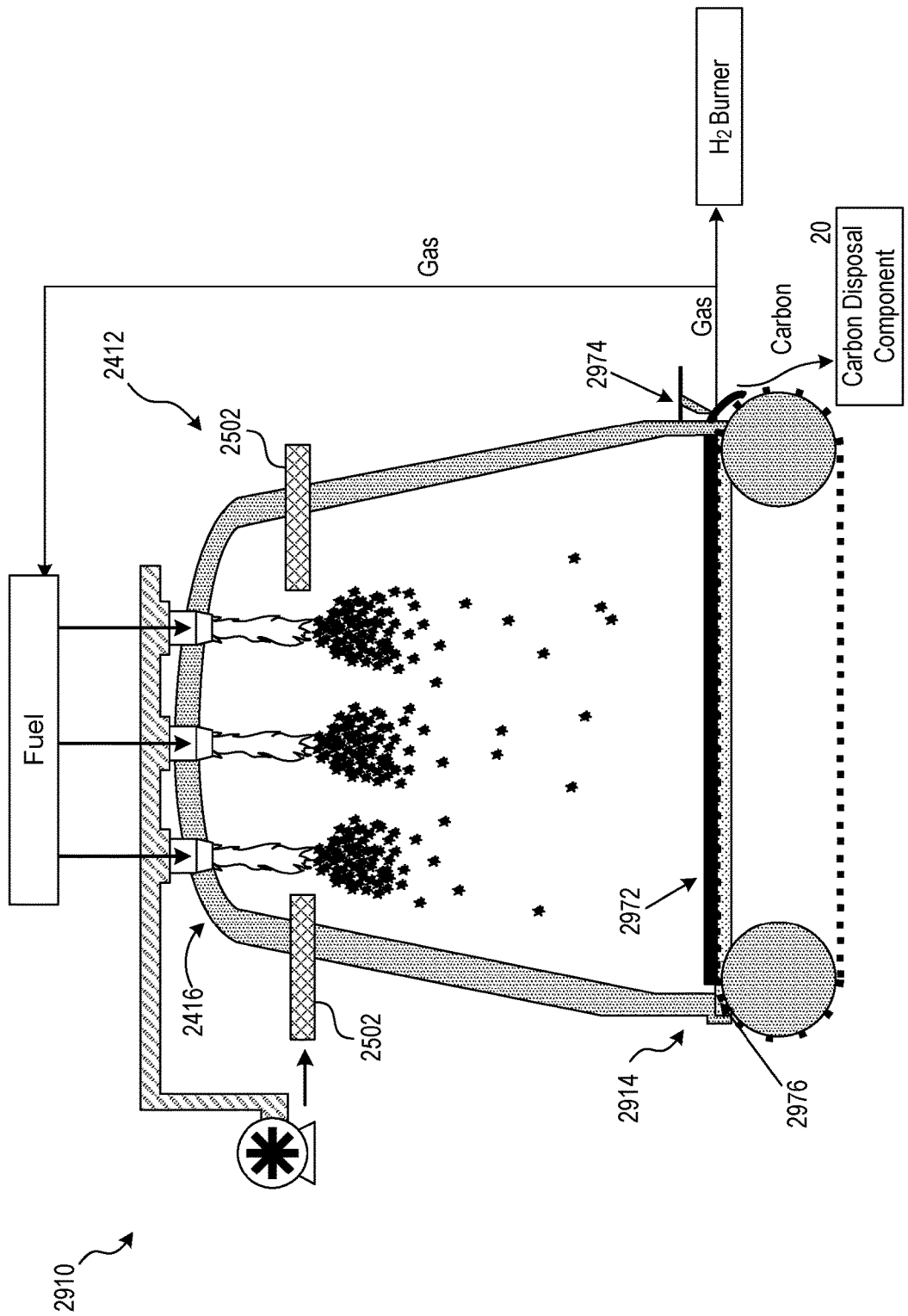

FIG. 29 is a partially schematic illustration of an autothermal reactor system 2910 having a mechanical carbon removal system 2914 configured in accordance with still further embodiments of the present technology. The carbon removal system 2914 includes a conveyor belt system 2972 with a moveable filter 2976. The conveyor belt system 2972 includes one or more driving wheels that continuously drive the moveable filter 2976 to carry collected carbon out of the autothermal reactor system 2910 and toward the carbon disposal component 20. As the solid carbon reaches a distal end of the conveyor belt system 2972, it falls off the moveable filter 2976 and out of the autothermal reactor system 2910. In some embodiments, the moveable filter 2976 can be chemically treated and/or can be coated with a catalyst and/or an adhesive to temporarily bind to the carbon during removal. The treatment can help ensure, for example, that the carbon moves along with the moveable filter 2976 rather than tumbling on the surface and remaining in place.

In the illustrated embodiment, the carbon removal system 2914 also includes an optional scraping component 2974 positioned at the distal end of the conveyor belt system 2972. The scraping component 2974 can contact a surface of the moveable filter 2976 to scrape the surface and help ensure that carbon particles do not stick to the moveable filter 2976 instead of falling toward to the carbon disposal component 20.

Figure 30:
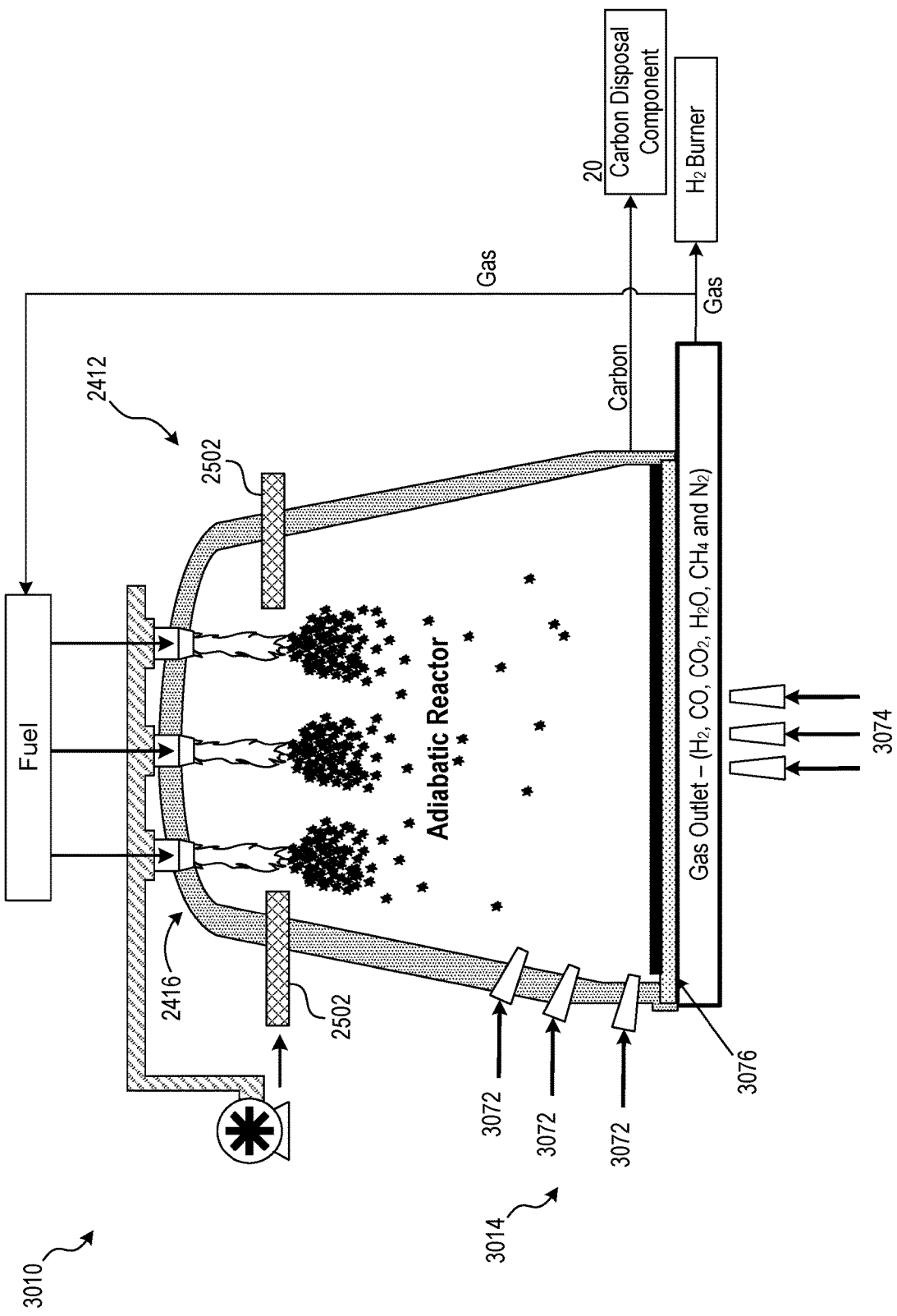
FIG. 30 is a partially schematic illustration of an autothermal reactor system having a representative fluidic carbon removal system in accordance with embodiments of the present technology.

FIG. 30 is a partially schematic illustration of an autothermal reactor system 3010 having a non-mechanical carbon removal system 3014 in accordance with some embodiments of the present technology. The carbon removal system 3014 includes one or more first gas jets 3072 (three shown), one or more second gas jets 3074 (three shown), and a filter 3076. Similar to the carbon removal systems discussed above, the filter 3076 collects the solid carbon product from the reaction while allowing the product gas to pass through. As the carbon collects, the first and second gas jets 3072, 3074 operate to remove the collected carbon from the autothermal reactor system 3010 and/or direct the carbon toward the carbon disposal component 20. In the illustrated embodiment, for example, the first gas jets 3072 are positioned along a side of the autothermal reactor system 3010 and are directed across the upper surface of the filter 3076. Accordingly, the first gas jets 3072 can direct a gaseous flow to push the carbon across the filter 3076 and out of the autothermal reactor system 3010. The second gas jets 3074 are positioned beneath and directed at a lower surface of the filter 3076. The gas from the second gas jets 3074 can pass through the filter to help dislodge carbon stuck to the upper surface and/or counter downward pressure from the first gas jets 3072 to help carbon travel across the upper surface (e.g., thereby 'fluidizing' the solid carbon). The first and second gas jets 3072, 3074 can be operated periodically to clear a surface of the filter 3076 while minimizing the disruption to the downward flow of the product gases. In some embodiments, the first and second gas jets 3072, 3074 are operated only during an inactive period for the autothermal reactor 2412 (e.g., during periods of low demand). In various embodiments, the gases ejected from the first and second gas jets 3072, 3074 can include methane, air, nitrogen gas, flue gas recycled from the autothermal reactor 2412, hydrogen gas, and/or any other suitable gas.

As discussed above, the embodiments of the autothermal reactor system and their carbon removal systems are examples only. In various embodiments, the autothermal reactor system can include various other mechanical and/or non-mechanical carbon removal systems. Examples of fluidic systems include sedimentation or storage tanks, cyclone separators, electrostatic precipitators, and/or vacuum pumps. Examples of other non-mechanical systems (e.g., electromagnetic and/or chemical systems) include electromagnetic fields; sonication or sound energy removal systems; lasers; radiofrequency-based physical drivers; secondary chemical reactions (e.g., oxidizing the carbon); a system to bombard the carbon using ultraviolet light to cause secondary reactions and/or separation from gas flow; and/or a plasma to functionalize the carbon particulates (e.g., using O2, N2, S, and/or any other suitable compound). Further, in various other embodiments, the autothermal reactor system include any combination of the carbon removal systems discussed above.

Figure 31:
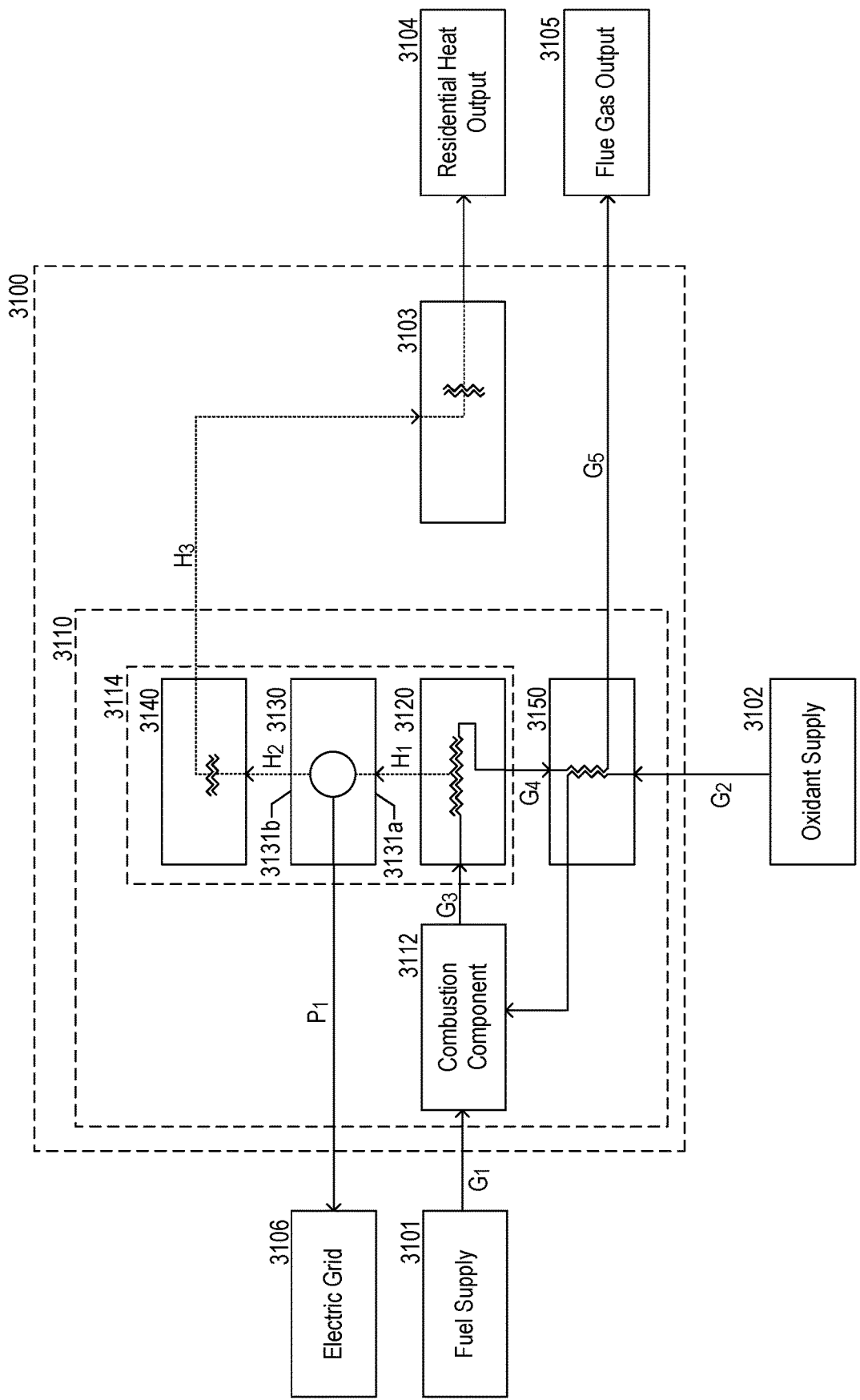
FIG. 31 is a block diagram of a combined heat and power system configured for use with a residential heating appliance in accordance with some embodiments of the present technology.

FIG. 31 is a block diagram of a combined heat and power system 3110 configured for use with a residential heating appliance 3100 in accordance with some embodiments of the present technology. In the illustrated embodiment, the combined heat and power system 3110 ("CHP system 3110," sometimes also referred to herein as a "co-generation system") includes a combustion component 3112 and a power cell 3114 (sometimes also referred to herein as a "heat cell," and/or a "power generation module"). The power cell 3114 includes a first heat exchanger 3120 (e.g., a hot-side heat exchanger) that is thermally coupled to the combustion component 3112, a second heat exchanger 3140 (e.g., a cold-side heat exchanger), and an electricity generation component 3130 thermally coupled to the first and second heat exchangers 3120, 3140, as indicated in dashed lines by first and second heat paths H1, H2.

As illustrated in FIG. 31 the combustion component 3112 (e.g., a burner, burner system, plurality of burners, reactor, ignitor, and/or the like) is operably coupleable to a fuel supply 3101 (e.g., the fuel supply 10 of FIG. 1, a residential gas meter, a hydrogen gas input (e.g., hydrogen gas in the output from the reactor system), and/or the like) via a first gas flow path G1 (shown by a solid line) and an oxidant supply 3102 (e.g., from a blower (e.g., the blowers 118 of FIG. 1), an air pump input, oxygen tank input, and/or the like) via a second gas flow path G2. In various embodiments, the fuel can be any of a variety of suitable hydrocarbon gases or fluids, such as natural gas, methane gas, fuel oil, coal, liquefied petroleum gas, and/or the like, and/or a pure hydrogen gas. In a specific, non-limiting example, the fuel can be the hydrogen gas in the output from the autothermal reactor 2412 (FIG. 24). The oxidant can be any suitable oxygen-carrying agent such as air, compressed air, oxygen gas, and/or any other suitable oxygen-carrying compound. The combustion component 3112, or a separate mixer (not shown), receives and mixes the fuel and the oxidant. In some embodiments, the mixture includes a stoichiometric ratio (e.g., a theoretical ideal ratio for complete, efficient combustion) of the fuel with the oxygen carried by the oxidant. Purely by way of example, the stoichiometric ratio, by mass, of oxygen to hydrogen is about 34 to 1 (e.g., requiring about 34 kg of air to completely and efficiently burn 1 kg of natural gas). In some embodiments, the mixture is within about 10 percent of the stoichiometric ratio, within about 5 percent of the stoichiometric ratio, within about 1 percent of the stoichiometric ratio, or within about 0.1 of the stoichiometric ratio. Purely by way of another example, for a mixture within about ten percent of the stoichiometric ratio of air to natural gas, the mixture can have an actual ratio of air to natural gas of between about 30.6 to 1 and about 37.4 to 1.

The combustion component 3112 can then combust the mixture, resulting in a flue gas that is directed to the power cell 3114 via a third flow path G3. Heat from the flue gas can be transferred to the power cell 3114 via the first heat exchanger 3120 by conduction (e.g., based on contact between the flue gas and the first heat exchanger 3120) and/or radiation (e.g., through heat radiation from an intermediate substrate adjacent the first heat exchanger 3120). The flue gas then flows out of the power cell 3114 along a fourth flow path G4 while heat flows out of the first heat exchanger 3120 and into the electricity generation component 3130 along a first heat path H1.

In some embodiments, the combustion component 3112 replaces the burner previously used in the residential heating appliance 3100 to increase the combustion temperature, while consuming the same type of fuel (e.g., by (1) increasing a pressure of the fuel and oxidant before combustion, (2) altering a ratio of the fuel to the oxygen in the oxidant, and/or (3) increasing the amount of fuel consumed in the combustion reaction. For example, in some embodiments, the combustion temperature in the combustion component 3112 can be between about 1200 degrees Celsius (° C.) and about 2500° C., or about 2000° C. The increase in combustion temperature allows the electricity generation component 3130, discussed in more detail below, to more efficiently generate an electrical output. Further, the increase in combustion temperature can help ensure that the CHP system 3110 outputs enough unused heat to the residential heating appliance 3100 to meet heating demands.

The electricity generation component 3130 has a first portion 3131$a$ thermally coupled to the first heat exchanger 3120 to receive the heat via the first heat path H1 and a second portion 3131$b$ coupled to the second heat exchanger 3140 via a second heat path H2. As the first heat exchanger 3120 receives heat from the combustion reaction via the flue gas, the first heat exchanger 3120 rises in temperature. As the first heat exchanger 3120 rises in temperature, the first portion 3131$a$ of the electricity generation component 3130 rises in temperature as well, thereby creating a temperature difference between the first portion 3131$a$ and the second portion 3131$b$. The electricity generation component 3130 can then use the temperature difference to generate an electrical output as heat flows from the first portion to the second portion. As illustrated in FIG. 31, the electricity generation component 3130 then directs the electrical output along a power line P1 into an electric grid 3106 external and/or coupled to the CHP system 3110 (e.g., into the electric grid 40 of FIG. 1). In various embodiments, the electric grid 3106 includes a battery connected to the CHP system 3110 and/or the residential heating appliance 3100, a local power grid (e.g., a residential power grid, an apartment power grid, a neighborhood power grid, a commercial power grid, and/or the like), and/or a broader power grid (e.g., a city-wide grid, county-wide grid, state-wide grid, and/or the like). In embodiments in which power is output from the CHP system 3110 into a broader power grid, the hydrogen gas is still generated and consumed locally (e.g., in a distributed manner). By consuming the hydrogen locally, the CHP system 3110 (e.g., in conjunction with the reactor system 110 (FIG. 1)) can avoid problems associated with long distance transportation of hydrogen while providing additional power into the broader grid. As a result, the CHP system 3110 (e.g., in conjunction with the reactor system 110 (FIG. 1)) can help offset energy consumption for a broader grid without requiring significant infrastructure investments and/or some of the risks associated with long distance transportation of hydrogen.

In various embodiments, the electricity generation component 3130 can include thermionic energy converters, thermoelectric energy converters (sometimes also called thermoelectric energy cells), thermoacoustic energy converters, and/or alkali metal thermal-to-electricity converters. In such embodiments, the electricity generation component 3130 generates electricity without any moving physical components, thereby requiring little (or no) maintenance, even when operating continuously (or nearly continuously).

The electrical output from the electricity generation component 3130 can be between about 0.01 kilowatts (kW) and about 50 kW, between about 0.05 kW and about 5 kW, between about 0.1 kW and about 1 kW, or about 0.5 kW. In a specific, non-limiting example, the electrical output from the electricity generation component 3130 can be between about 0.09 kW and about 0.3 kW to ensure that the CHP system 3110 can fully power a furnace (e.g., the residential heating appliance 3100) as well as the electrical components (e.g., a thermostat, gas pumps, and the like) required to power the system. In various embodiments, the electric grid 3106 can use the electrical output from the electricity generation component 3130 to at least partially power (1) one or more devices related to the fuel and oxidant supply 3101, 3102 (e.g., pumps, meters, and/or the like); (2) various components of the residential heating appliance 3100 (e.g., a controller, processor, pumps, fans, vents, valves, and/or the like); and/or (3) various components of the CHP system 3110 (e.g., to start combustion within the combustion component 3112). Additionally, or alternatively, the electric grid 3106 can use the electrical output from the electricity generation component 3130 to offset power consumption on a local power grid (e.g., within a residential unit), and/or to export power into a broader power grid.

In a particular example, the electrical output is sufficient to power the residential heating appliance 3100, the CHP system 3110, and any related devices, thereby allowing the residential heating appliance 3100 and the CHP system 3110 to be self-sufficient. In such embodiments, the electrical output from electricity generation component 3130 allows the residential heating appliance 3100 and the CHP system 3110 to be operated even when external electrical power is reduced and/or unavailable (e.g., during a blackout). Additionally, or alternatively, the electrical output is sufficient to power various other home appliances (e.g., a refrigerator, other heating appliance, entertainment devices, and/or the like). In such embodiments, the electrical output from electricity generation component 3130 allows other appliances to be operated even when external electrical power is reduced and/or unavailable (e.g., during a blackout).

As further illustrated in FIG. 31, the unused heat from the electricity generation component 3130 (sometimes also referred herein to as "waste heat" and/or "excess heat") flows out of the electricity generation component 3130 and into the second heat exchanger 3140 via the second heat path H2. In turn, the second heat exchanger 3140 can be thermally coupled to a third heat exchanger 3103 of the residential heating appliance 3100 to direct heat to the third heat exchanger 3103 along a third heat flow path H3. As a result, heat that the power cell 3114 does not convert into electricity can be used for residential heating purposes, such as boiling water, heating water, heating air within a furnace, and/or the like. Purely by way of example, as discussed in more detail below, the third heat exchanger 3103 can include the water coils of a coiled tube boiler that are in thermal communication with the second heat exchanger 3140 (e.g., through contact, one or more thermal connections, convection channels, thermal radiation, and/or the like). The heat transferred into the third heat exchanger 3103 is then used by the residential heating appliance 3100 and directed into a residential heat output 3104 (e.g., hot water pipes, air duct system, and/or the like).

It will be understood by one of skill in the art that, in some embodiments, one or more of the heat exchangers described above can be combined into a single heat exchanger. By way of example only, the second and third heat exchanges 3140, 3103 described above can be combined in a single heat exchanger that transfers heat from the cold side of the energy converter directly to a fluid used in the residential heating appliance 3100 (e.g., air (in the case of a furnace) and/or water (in the case of a boiler)).

It will also be understood that although the CHP system 3110 illustrated in FIG. 31 is incorporated into a residential heating appliance 3100, a CHP system with similar components can be incorporated into a commercial-scale heating appliance (e.g., a furnace for a multi-family dwelling, a commercial building, and/or a datacenter; a water boiler for a multi-family dwelling, a commercial building, and/or a datacenter; and the like).

As discussed above, the combustion component 3112 of the CHP system 3110 combusts the fuel with the oxygen at a relatively high temperature compared to a typical operating temperature for the residential heating appliance 3100. As discussed above, to increase the combustion temperature, the combustion component 3112 can increase the pressure of the fuel and oxidant before the combustion reaction, alter the ratio of the fuel to the oxygen that is combusted, and/or increase the amount of fuel consumed in the combustion reaction. As a result, the unused heat flowing out of the power cell 3114 and into the third heat exchanger 3103 can be sufficient (or more than sufficient) to operate the residential heating appliance 3100. In addition, as discussed above, the CHP system 3110 can use the same inputs as the residential heating appliance 3100. That is, the CHP system 3110 can rely on the same inputs as a previous heating system (or rely on a connection to a hydrogen gas source) while both generating an electrical output and providing an operable level of input heat to the residential heating appliance 3100. Accordingly, the CHP system 3110 can reduce the carbon footprint of a residential unit, reduce power consumption in the residential unit, and protect against losses of power, all while requiring minimal modifications to an existing residential heating system.

As further illustrated in FIG. 31, the CHP system 3110 can also include a recuperator 3150 positioned to receive the flue gas downstream from the first heat exchanger 3120. For example, after transferring heat at the first heat exchanger 3120, the flue gas can flow out of the power cell 3114 via the fourth flow path G4 and into the recuperator 3150. As the flue gas flows through the recuperator 3150, a portion of unused heat (e.g., heat that was not given up at the first heat exchanger 3120) is transferred to oxidant entering the combustion component 3112. For example, as illustrated in FIG. 31, the recuperator 3150 can be operably coupled between the combustion component 3112 and the oxidant supply 3102 via the second input line G2. As the oxidant passes through the recuperator 3150, it receives the unused heat received from the flue gas. That is, the recuperator 3150 can recycle a portion of the unused heat to pre-heat the oxidant flowing into the combustion component 3112. As a result, the preheated oxidant requires less input energy to combust with the fuel, thereby improving the efficiency of the combustion component 3112. As a further result, by recycling the unused heat from the power cell 3114, the recuperator 3150 can increase the efficiency of the CHP system 3110 overall. After transferring heat to the oxidant, the flue gas can flow out of the recuperator 3150 and out of the CHP system 3110 along a fifth flow path G5 to a flue gas output 3105 (e.g., a duct system, chimney, and/or the like).

It will be understood that although a specific example of the CHP system 3110 using the power cell 3114 is discussed above with respect to FIG. 31, any of the other power generation components discussed herein can also be implemented into the CHP system 3110. Purely by way of example, the CHP system 3110 can include a gas combustion engine and/or a gas turbine that converts a first portion of the heat from a combustion into an electrical output and directs a second portion of the heat from the combustion into the residential heating appliance 3100.

EXAMPLES

Several examples of aspects of the present technology are described as numbered examples (1, 2, 3, etc.) below for convenience. These are provided as examples and do not limit the present technology. It is noted that any of the dependent examples can be combined in any suitable manner, and placed into a respective independent example. The other examples can be presented in a similar manner.
1. A system for producing hydrogen gas for local distribution, consumption, and/or storage, the system comprising:
   a pyrolysis reactor system including:
   at least one combustion component;
   an autothermal pyrolysis reactor coupleable to a supply of reaction material that includes a hydrocarbon, wherein the autothermal pyrolysis reactor includes a heating region thermally coupled to the at least one combustion component to transfer heat to the reaction material to convert the hydrocarbon into an output that includes hydrogen gas and carbon particulates, and wherein the autothermal pyrolysis reactor is sized to receive the reaction material at a rate between 500 and 165,000,000 standard cubic centimeters per minute;
   a carbon separation system operably coupled to the autothermal pyrolysis reactor to at least partially separate the hydrogen gas and the carbon particulates in the output; and
   a power generation component locally coupleable to the pyrolysis reactor system to receive at least a portion of the output and convert the output into electrical power and/or heat.
2. The system of example 1 wherein the carbon separation system includes a mechanical device for removing carbon from the output.
3. The system of example 2 wherein the mechanical device includes at least one of: an actuatable mechanical plunger; an actuatable physical arm; a screw-type extruder; a conveyor belt; a conveyor bucket; a lock hopper; and a rotary kiln.
4. The system of example 2 wherein the mechanical device includes at least one of: a mechanical plunger, a screw type extruder, and a lock hopper.
5. The system of any of examples 1-4 wherein the carbon separation system includes a fluidic device for removing carbon from the output.
6. The system of example 5 wherein the fluidic device includes at least one of: one or more sedimentation or storage tanks; one or more baghouse filters; one or more cyclone separators; one or more liquid columns with a bubbler; one or more vacuum pumps; and one or more air jets.
7. The system of example 5 the fluidic device includes at least one of: one or more sedimentation tanks, one or more storage tanks, one or more baghouse filters, and one or more vacuum pumps.
8. The system of any of examples 1-7 wherein the carbon separation system includes an electrostatic precipitator.
9. The system of any of examples 1-8 wherein the autothermal pyrolysis reactor includes a sloped lower surface, and wherein the carbon separation system is positioned at least partially along the sloped lower surface.
10. The system of any of examples 1-9 wherein the at least one combustion component is positioned in an upper portion of the autothermal pyrolysis reactor and oriented to direct heat from combustion of a fuel gas downward through the autothermal pyrolysis reactor.
11. The system of any of examples 1-10 wherein the carbon separation system is a first carbon separation system, and wherein the system further comprises a second carbon separation system operably coupled to the first carbon separation system to further separate the hydrogen gas and the carbon particulates in the output.
12. The system of any of examples 1-11, further comprising a heat recuperator thermally coupled to the pyrolysis reactor system to receive heat from the output, wherein the recuperator is positioned to transfer at least a portion of the heat from the output into air entering the combustion component and/or the hydrocarbon entering the pyrolysis reactor system.
13. The system of any of examples 1-12 wherein the output further includes one or more byproduct gases, and wherein the system further comprises a gas separator fluidly coupled to the carbon separation system to receive and filter the output downstream of the carbon separation system to remove at least a portion the byproduct gases from the output.
14. The system of any of examples 1-13 wherein the power generation component includes at least one of: a thermionic converter, an alkali metal thermal to electric converter, a thermophotovoltaic converter, a thermoelectric converter, a gas turbine, a fuel cell, a microturbine, an internal combustion engine, a steam turbine, or a Stirling engine.
15. The system of any of examples 1-13 wherein the power generation component includes a thermionic converter, and wherein the thermionic converter is positioned to consume the hydrogen gas at a rate between 4,000 standard cubic centimeters per minute (sccm) and 18,000 sccm.
16. The system of any of examples 1-15, further comprising a heating component and/or a cooling component, wherein the heating component and/or the cooling component is operably coupled to the power generation component to receive a portion of the electrical power.
17. The system of any of examples 1-15, further comprising a heating component in thermal communication with the autothermal pyrolysis reactor system and/or the power generation component to receive excess heat, the heating component including at least one of: a furnace, a forced air distribution system, a boiler, a radiator distribution system, a heat pump, a hybrid heating system, or a hydronic heating system.

18. The system of any of examples 1-17, further comprising a thermionic converter in thermal communication with the autothermal pyrolysis reactor system and/or the power generation component to receive excess heat, and wherein the thermionic converter is positioned to consume about 13,920 standard cubic centimeters of the hydrogen gas per minute.

19. The system of any of examples 1-18, further comprising a boiler in thermal communication with the autothermal pyrolysis reactor system and/or the power generation component to receive excess heat.

20. A pyrolysis reactor system for converting a hydrocarbon fuel into an output that includes hydrogen gas and carbon particulates, the pyrolysis reactor system comprising:

an autothermal pyrolysis reactor having a reaction chamber that includes a heating region and a precipitation region beneath the heating region, wherein the heating region is coupleable to a supply of the hydrocarbon fuel, and wherein the autothermal pyrolysis reactor is sized to receive the hydrocarbon fuel at a rate between 500 and 165,000,000 standard cubic centimeters per minute;

a combustion component thermally coupleable to a supply of a combustion fuel and positioned to direct heat from combustion of the combustion fuel into the hydrocarbon fuel in the heating region of the autothermal pyrolysis reactor to cause a pyrolysis reaction in the precipitation region; and a carbon separation component operably coupled to the precipitation region of the autothermal pyrolysis reactor to receive the output at least partially remove the carbon particulates from the output.

21. The pyrolysis reactor system of example 20 wherein the combustion component is open to the heating region to combust the combustion fuel within the heating region, wherein the autothermal pyrolysis reactor includes an input line operably coupled to the hydrocarbon fuel, and wherein the input line is positioned to direct the hydrocarbon fuel through a flame produced by the combustion of the combustion fuel.

22. The pyrolysis reactor system of any of examples 20 and 21, further comprising an air supply fluidly coupled to the combustion component to control a supply of oxygen to the combustion of the combustion fuel.

23. The pyrolysis reactor system of any of examples 20-22 wherein the output further includes one or more byproduct gases, and wherein the pyrolysis reactor system further comprises a gas separator fluidly coupled to the carbon separation system to receive the output downstream of the carbon separation system to remove at least a portion the byproduct gases from the output.

24. The pyrolysis reactor system of any of examples 20-23 wherein the combustion fuel includes hydrogen gas from a previous pyrolysis reaction in the autothermal pyrolysis reactor.

25. A method for generating hydrogen gas for local distribution, consumption, and/or storage, the method comprising:

directing a reactant through a heating region of an autothermal pyrolysis reactor, wherein the heating region is in thermal communication with a combustion component, wherein the fuel includes a hydrocarbon, and wherein the reactant is directed at a flow rate of from 500 to 165,000,000 standard cubic centimeters per minute;

combusting, in the combustion component, a combustion fuel to heat the reactant in the heating region of the autothermal pyrolysis reactor above a reaction temperature, wherein, at the reaction temperature, at least a portion of the hydrocarbon in the reactant converts into an output that includes hydrogen gas and carbon particulates; and separating at least a portion of the carbon particulates from the hydrogen gas in the output.

26. The method of example 25, further comprising directing at least a portion of the hydrogen gas in the output to at least one of:

a power generation component to generate electricity from a combustion of the at least a portion of the hydrogen gas; and the combustion component to direct heat from a combustion of the at least a portion of the hydrogen gas into the heating region of the autothermal pyrolysis reactor.

27. The method of any of examples 25 and 26 wherein the output further includes one or more byproduct gases, and wherein the method further comprises removing at least a portion of the one or more byproduct gases from the hydrogen gas in the output.

28. The method of any of examples 25-27 wherein the reactant is natural gas, and wherein the method further comprises receiving the natural gas through a gas meter.

29. The method of any of examples 25-28, further comprising directing at least a portion of the hydrogen gas in the output to a residential and/or commercial heating unit.

30. The method of any of examples 25-29, further comprising directing at least a portion of the hydrogen gas in the output to a residential and/or commercial boiler.

31. The method of any of examples 25-30 wherein separating at least a portion of the carbon particulates from the hydrogen gas in the output includes removing the carbon particulates from the output through a mechanical carbon separation device.

32. The method of any of examples 25-31 wherein separating at least a portion of the carbon particulates from the hydrogen gas in the output includes removing the carbon particulates from the output through a fluidic carbon separation device.

33. The method of any of examples 25-32, further comprising directing, through a point-to-point connection, at least a portion of the hydrogen gas in the output to a power generation component.

34. A system for locally producing and consuming hydrogen gas, the system comprising:

a pyrolysis reactor system including:
 a first combustion component;
 a pyrolysis reactor coupleable to a supply of reaction material that includes a hydrocarbon, wherein the pyrolysis reactor includes a heating region thermally coupled to the first combustion component to transfer heat to the reaction material to convert the hydrocarbon into an output that includes hydrogen gas and carbon particulates;
 a carbon separation system operably coupled to the autothermal pyrolysis reactor to at least partially separate the hydrogen gas and the carbon particulates in the output; and a combined heat and power device in fluid communication with the pyrolysis reactor system downstream of the carbon separation system to receive at least a portion of the hydrogen gas in the output, wherein the combined heat and power device includes:
  a second combustion component;
  a power generation component coupled to the second combustion component to convert a first portion of heat from combustion at the second combustion component into electricity; and
  a heating appliance, the heating appliance thermally coupled to the power generation component to receive a second portion of the heat from combustion at the second combustion component that was not converted into electricity.

35. The system of example 34 wherein:
the power generation component includes:
  a first heat exchanger thermally coupled to the second combustion component to receive the first and second portions of the heat from the combustion at the second combustion component;
  a second heat exchanger spaced apart from the first heat exchanger; and
  an electricity generation component having a first end thermally coupled to the first heat exchanger and a second end thermally coupled to the second heat exchanger, wherein the electricity generation component is positioned to generate an electrical output using the first portion of the heat received at the first heat exchanger and communicate the second portion of the heat to the second heat exchanger; and
the heating appliance includes a third heat exchanger thermally coupled to the second heat exchanger to receive the second portion of the heat.

36. The system of example 34 wherein second combustion component and the power generation component are integrated in a gas combustion engine, and wherein the heating component is thermally coupled to the power generation component to receive the second portion of the heat from the combustion at the second combustion component.

37. The system of example 34 wherein the power generation component includes a gas turbine, and wherein the heating component is thermally coupled to the power generation component to receive the second portion of the heat from the combustion at the second combustion component.

38. A system for producing hydrogen gas for local distribution, consumption, and/or storage, the system comprising:
a pyrolysis reactor system including:
  at least one combustion component;
  a pyrolysis reactor coupleable to a supply of reaction material that includes a hydrocarbon, wherein the pyrolysis reactor includes a heating region thermally coupleable to the at least one combustion component to transfer heat to the reaction material to convert the hydrocarbon into an output that includes hydrogen gas and carbon particulates;
  a carbon separation system operably coupled to the autothermal pyrolysis reactor to at least partially separate the hydrogen gas and the carbon particulates in the output; and
a power generation component locally coupleable to the pyrolysis reactor system to receive at least a portion of the output and convert the output into electrical power and heat.

39. The system of example 38 wherein the carbon separation system includes a mechanical device positioned at least partially within the reactor for removing carbon from the output, wherein the mechanical device includes at least one of a mechanical plunger, a screw type extruder, and a lock hopper.

40. The system of example 38 wherein the carbon separation system includes a fluidic device in fluid communication with the reactor to remove carbon from the output, wherein the fluidic device includes at least one of sedimentation tanks, storage tanks, baghouse filters, and one or more vacuum pumps.

41. A system for producing hydrogen gas for local distribution, consumption, and/or storage, the system comprising:
a pyrolysis reactor coupleable to a supply of reaction material that includes a hydrocarbon, wherein the pyrolysis reactor includes one or more flow channels positioned to transfer heat to the reaction material to convert the hydrocarbon into an output that includes hydrogen gas, carbon particulates, and heat, and wherein the pyrolysis reactor is sized to receive the reaction material at a rate between 100 and 3,750,000 standard cubic centimeters per minute;
a carbon separation system operably coupled to the pyrolysis reactor to separate the hydrogen gas the carbon particulates in the output; and
a power generation component locally coupleable to the pyrolysis reactor to receive at least a portion of the output and convert the output into electrical power and/or heat.

42. The system of example 41, further comprising a heating component and/or a cooling component, wherein the heating component and/or the cooling component is operably coupled to the pyrolysis reactor and/or the power generation component to receive heat and/or a portion of the electrical power.

43. The system of any of examples 41 and 42 wherein the power generation component includes at least one of: a thermionic converter, an alkali metal thermal to electric converter, a thermophotovoltaic converter, a thermoelectric converter, a gas turbine, a fuel cell, a microturbine, an internal combustion engine, a steam turbine, or a Stirling engine.

44. The system of any of examples 41-43, further comprising a burner operably coupled to the pyrolysis reactor through one or more flow pathways to receive and burn at least a portion of the output, and a thermal communication path coupled between the burner and the pyrolysis reactor and positioned to direct heat from the burner to the pyrolysis reactor.

45. The system of any of examples 41-44, further comprising a heating component in thermal communication with the pyrolysis reactor, the heating component including at least one of: a furnace, a forced air distribution system, a boiler, a radiator distribution system, a heat pump, a hybrid heating system, or a hydronic heating system.

46. The system of any of examples 41-45, further comprising a cooling component operably coupled to the pyrolysis reactor and/or the power generation component, the cooling component including at least one of: an absorption chiller, a compression air conditioner, or a heat pump.

47. The system of any of examples 41-46 wherein the reaction material includes a hydrocarbon gas, and wherein the pyrolysis reactor includes:

at least one vertical column of molten salt having a lower end and an upper end;
an input valve positioned toward the lower end and in fluid communication with the input supply; and
an output valve positioned toward the upper end.

48. The system of example 47 wherein the pyrolysis reactor further includes an electric heating coil thermally coupled to the at least one vertical column.

49. The system of any of examples 47 and 48 wherein at least a portion of the carbon separation system is integrated with the at least one vertical column of the pyrolysis reactor.

50. The system of any of examples 47-49 wherein the at least one vertical column of molten salt includes two or more vertical columns of molten salt, and wherein the pyrolysis reactor includes one or more valves positioned to control a supply of the reaction material to each of the vertical columns independently according to a target output from the pyrolysis reactor.

51. The system of any of examples 41-46 wherein the output is a first output, wherein the pyrolysis reactor includes a first reaction chamber, a second reaction chamber, one or more burners, and one or more valves operably coupled to the input supply, the first reaction chamber, the second reaction chamber, and the one or more burners, and wherein:
in a first configuration, the one or more valves:
establish fluid communication between the input supply and the first reaction chamber, wherein the first reaction chamber converts at least a first portion of the hydrocarbon in the reaction material into the first output;
establish fluid communication between the first reaction chamber and the one or more burners, wherein the one or more burners combust at least part of the hydrogen gas in the first output to generate a second output that includes hot flue gas; and
establish fluid communication between the one or more burners and the second reaction chamber, wherein the second reaction chamber receives at least part of the second output to absorb heat from the hot flue gas of the second output, and wherein the absorbed heat is at least partially stored in the second reaction chamber; and
in a second configuration, the one or more valves:
establish fluid communication between the input supply and the second reaction chamber, wherein the second reaction chamber converts at least a second portion of the hydrocarbon in the reaction material into a third output that includes hydrogen gas, carbon particulates, and heat;
establish fluid communication between the second reaction chamber and the one or more burners, wherein the one or more burners combust at least part of the hydrogen gas in the third output to generate a fourth output that includes hot flue gas; and
establish fluid communication between the one or more burners and the first reaction chamber, wherein the first reaction chamber receives at least part of the fourth output to absorb heat from the hot flue gas of the fourth output, and wherein the absorbed heat is at least partially stored in the first reaction chamber.

52. The system of example 51, further comprising a controller communicably coupled to the valves and storing instructions that when executed cause the controller to:
at a first time, position the one or more valves in the first configuration;
at a second time, position the one or more valves in the second configuration; and
at a third time, reposition the one or more valves in the first configuration.

53. The system of example 51, further comprising one or more temperature sensors operably coupled to the controller and positioned to measure a first temperature of the first reaction chamber and a second temperature of the second reaction chamber, wherein the instructions, when executed, further cause the controller to position the one or more valves in the second configuration when the first temperature of the first reaction chamber falls below a predetermined threshold.

54. The system of example 51, further comprising one or more pressure sensors operably coupled to the controller and positioned to measure a first pressure drop across the first reaction chamber and a first pressure drop across the second reaction chamber, wherein the instructions, when executed, further cause the controller to position the one or more valves in the second configuration when the first pressure drop across the first reaction chamber reaches a predetermined threshold.

55. The system of any of examples 51-54 wherein each of the first and second reaction chambers include a plurality of flow channels extending along a corresponding longitudinal axis and wherein a cross-section of the first and second reaction chambers transverse to the corresponding axis has a channel density of between 1 and 10 channels per square inch.

56. The system of any of examples 51-55 wherein at least a portion of the carbon separation system is integrated with the pyrolysis reactor between the first reaction chamber and the second reaction chamber.

57. The system of any of examples 51-56 wherein the one or more valves divert at least a portion of the hydrogen gas in the first output away from the pyrolysis reactor along a flow path before the first output is combusted.

58. The system of any of examples 51-57, further comprising at least a third reaction chamber operably coupled to the one or more valves to receive at least one of the reaction material and the second output.

59. The system of any of examples 41-58 wherein the pyrolysis reactor is a first pyrolysis reactor, and wherein the system further comprises a second pyrolysis reactor coupleable to the supply of reaction material that includes the hydrocarbon.

60. A method for generating hydrogen gas for local distribution, consumption, and/or storage, the method comprising:
receiving, at a pyrolysis reactor, a fuel gas having a hydrocarbon at a flow rate of from 500 to 340,000,000 standard cubic centimeters per minute;
heating the fuel gas within the pyrolysis reactor to a reaction temperature, wherein, at the reaction temperature, at least a portion of the hydrocarbon in the fuel gas converts into hydrogen gas and carbon particulates;
separating and capturing the hydrogen gas and carbon particulates; and
converting at least a portion of the captured hydrogen gas into electricity using a power generation component, wherein the power generation component is locally coupled to the pyrolysis reactor.

61. The method of example 60, further comprising combusting at least a portion of the captured hydrogen gas to heat to the pyrolysis reactor.
62. The method of any of examples 60 and 61 wherein the power generation component includes at least one of: a thermionic converter, an alkali metal thermal to electric converter, a thermophotovoltaic converter, a thermoelectric converter, a turbine, a fuel cell, a microturbine, an internal combustion engine, a steam turbine, or a Stirling engine.
63. The method of any of examples 60-62 wherein heating the fuel gas within the pyrolysis reactor includes passing the reaction material through a chamber of molten fluid.
64. The method of any of examples 60-62 wherein the heating the fuel gas within the pyrolysis reactor includes passing the fuel gas through a preheated first reaction chamber, and wherein the method further comprises combusting at least a portion of the captured hydrogen gas to heat a second reaction chamber.
65. The method of example 64, further comprising, after passing the fuel gas through the preheated first reaction chamber for a period of time, passing the fuel gas through the second reaction chamber, wherein combusting the at least a portion of the captured hydrogen gas heats the first reaction chamber.
66. The method of any of examples 60-62 wherein the heating the fuel gas within the pyrolysis reactor includes passing the fuel gas through an open flame from a combustion component within the pyrolysis reactor.
67. The method of example 66, further comprising controlling a supply of oxygen to the combustion component to reduce an amount of the fuel gas that is combusted when passing through the flame from the combustion component.
68. The method of any of examples 60-67, further comprising using (a) at least a portion of the captured hydrogen gas and/or (b) the generated electricity, at (i) a heating component and/or (ii) a cooling component.
69. The method of any of examples 60-68, further comprising combusting at least a portion of the captured hydrogen gas within a heating component, the heating component including at least one of: a furnace, a forced air distribution system, a boiler, a radiator distribution system, a heat pump, a hybrid heating system, or a hydronic heating system.
70. The method of any of examples 60-69, further comprising using at least a portion of the generated electricity within a cooling component, the cooling component including at least one of: an absorption chiller, a compression air conditioner, or a heat pump.

Conclusion

Embodiments of the present disclosure may be implemented as computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Computer-executable instructions may be stored in memory, such as RAM, ROM, flash memory, or the like, or a combination of such components. Computer-executable instructions may also be stored in one or more storage devices, such as magnetic or optical-based disks, flash memory devices, or any other type of nonvolatile storage medium or non-transitory medium for data. Computer-executable instructions may include one or more program modules, which include routines, programs, objects, components, data structures, and so on that perform particular tasks or implement particular abstract data types.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately" and "about" are used herein to mean within at least within 10 percent of a given value or limit. Purely by way of example, an approximate ratio means within 10 percent of the given ratio.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

To the extent any materials incorporated here by reference conflict with the present disclosure, the present disclosure controls.

We claim:

1. A pyrolysis reactor system for generating hydrogen gas for local distribution, consumption, and/or storage, the pyrolysis reactor system comprising:
   an autothermal pyrolysis reactor having a heating region, wherein a reactant is directed through the heating region, wherein the heating region is in thermal communication with a combustion component, and wherein the reactant includes a hydrocarbon;

a combustion component thermally coupleable to a supply of a combustion fuel and configured to combust, in the combustion component, the combustion fuel to indirectly heat the reactant in the heating region of the autothermal pyrolysis reactor above a reaction temperature, wherein, at the reaction temperature, at least a portion of the hydrocarbon in the reactant converts into an output that includes hydrogen gas and carbon particulates; and a carbon separation component configured to separate at least a portion of the carbon particulates from the hydrogen gas in the output.

2. The pyrolysis reactor system of claim 1 wherein the combustion component comprises a downfired burner system.

3. The pyrolysis reactor system of claim 1, further comprising an air supply fluidly coupled to the combustion component to control a supply of oxygen to the combustion of the combustion fuel.

4. The pyrolysis reactor system of claim 1 wherein the output further includes one or more byproduct gases, and wherein the pyrolysis reactor system further comprises a gas separator fluidly coupled to the carbon separation system to receive the output downstream of the carbon separation system to remove at least a portion the byproduct gases from the hydrogen gas in the output.

5. The pyrolysis reactor system of claim 1 wherein the combustion fuel includes hydrogen gas from a previous pyrolysis reaction in the autothermal pyrolysis reactor.

6. A method for generating hydrogen gas for local distribution, consumption, and/or storage, the method comprising:

directing a reactant through a heating region of an autothermal pyrolysis reactor, wherein the heating region is in thermal communication with a combustion component, wherein reactant includes a hydrocarbon;

combusting, in the combustion component, a combustion fuel to indirectly heat the reactant in the heating region of the autothermal pyrolysis reactor above a reaction temperature, wherein, at the reaction temperature, at least a portion of the hydrocarbon in the reactant converts into an output that includes hydrogen gas and carbon particulates; and separating at least a portion of the carbon particulates from the hydrogen gas in the output.

7. The method of claim 6, further comprising directing at least a portion of the hydrogen gas in the output to at least one of:

a power generation component to generate electricity from a combustion of the at least a portion of the hydrogen gas; and the combustion component to direct heat from a combustion of the at least a portion of the hydrogen gas into the heating region of the autothermal pyrolysis reactor.

8. The method of claim 6 wherein the output further includes one or more byproduct gases, and wherein the method further comprises removing at least a portion of the one or more byproduct gases from the hydrogen gas in the output.

9. The method of claim 6 wherein the reactant is natural gas, and wherein the method further comprises receiving the natural gas through a gas meter.

10. The method of claim 6, further comprising directing at least a portion of the hydrogen gas in the output to a residential and/or commercial heating unit.

11. The method of claim 6, further comprising directing at least a portion of the hydrogen gas in the output to a residential and/or commercial boiler.

12. The method of claim 6 wherein separating at least a portion of the carbon particulates from the hydrogen gas in the output includes removing the carbon particulates from the output through a mechanical carbon separation device.

13. The method of claim 6 wherein separating at least a portion of the carbon particulates from the hydrogen gas in the output includes removing the carbon particulates from the output through a fluidic carbon separation device.

14. The method of claim 6, further comprising directing, through a point-to-point connection, at least a portion of the hydrogen gas in the output to a power generation component.

15. The method of claim 6 wherein the combustion fuel comprises hydrogen gas, and wherein the method further comprises directing a portion of the hydrogen gas in the output to the combustion component.

16. The method of claim 15 wherein the portion of the hydrogen gas fully fuels the combustion component.

17. The method of claim 6, further comprising recuperating heat from the output to preheat oxygen upstream from the combustion component.

18. The method of claim 6, wherein the combustion component comprises a downfired burner system.

19. The method of claim 6, further comprising actuating a carbon removal component within the autothermal pyrolysis reactor to remove a portion of the carbon particulates from the output.

20. The method of claim 6, further comprising driving a rotatable body within the autothermal pyrolysis reactor to remove a portion of the carbon particulates from the output.

21. The method of claim 6, wherein the reactant is directed at a flow rate of from 500 to 165,000,000 standard cubic centimeters per minute.

* * * * *